(12) United States Patent
Hayashi et al.

(10) Patent No.: US 7,634,141 B2
(45) Date of Patent: Dec. 15, 2009

(54) INFORMATION PROCESSING APPARATUS, METHOD AND PROGRAM

(75) Inventors: Masakazu Hayashi, Tokyo (JP); Kensaku Ishizuka, Tokyo (JP); Mitsuo Okumura, Tokyo (JP)

(73) Assignee: Sony Corporation, Tokyo (JP)

( * ) Notice: Subject to any disclaimer, the term of this patent is extended or adjusted under 35 U.S.C. 154(b) by 641 days.

(21) Appl. No.: 10/876,467

(22) Filed: Jun. 28, 2004

(65) Prior Publication Data

US 2005/0024513 A1 Feb. 3, 2005

(30) Foreign Application Priority Data

Jul. 11, 2003 (JP) ............... 2003-273466

(51) Int. Cl.
*H04N 5/222* (2006.01)
(52) U.S. Cl. ............ 382/224; 348/333.01; 707/E17.026
(58) Field of Classification Search .................. 382/224; 348/333.01
See application file for complete search history.

(56) References Cited

U.S. PATENT DOCUMENTS

| 6,784,925 | B1* | 8/2004 | Tomat et al. | ............ 348/207.11 |
| 7,113,628 | B1* | 9/2006 | Obara et al. | ................ 382/149 |
| 2002/0075322 | A1* | 6/2002 | Rosenzweig et al. | ........ 345/835 |
| 2003/0007663 | A1* | 1/2003 | Wixson et al. | .............. 382/100 |

FOREIGN PATENT DOCUMENTS

| JP | 11-95781 | 4/1999 |
| JP | 11-212991 | 8/1999 |
| JP | 11-215457 | 8/1999 |
| JP | 11-313229 | 11/1999 |
| JP | 2000-067057 | 3/2000 |
| JP | 2001-313895 | 11/2001 |
| JP | 2004-260710 | 9/2004 |

OTHER PUBLICATIONS

Timothy J. Mills, et al., "Shoebox: A Digital Photo Management System", Retrieved from the Internet, XP-001157753, 2000, pp. 1-8.

* cited by examiner

*Primary Examiner*—Charles Kim
*Assistant Examiner*—Stephen R Koziol
(74) *Attorney, Agent, or Firm*—Oblon, Spivak, McClelland, Maier & Neustadt, L.L.P.

(57) ABSTRACT

An information processing apparatus is provided. The apparatus includes a classifying section for classifying a plurality of images by a predetermined time unit based on time information attached to the images, a display control section for displaying the images classified into the time units by the classifying section in display regions divided for the corresponding time units, and a selection section for selecting a plurality of images classified into the same time unit for displaying each of the plurality of images one by one in the corresponding display region if the plurality of images are classified into the same time unit by the classifying section.

25 Claims, 44 Drawing Sheets

FIG.36

| CATEGORIES | IMAGE FILE |
|---|---|
| EVENT | 001.jpg;016.jpg;017.jpg;020.jpg;101.jpg;102.jpg |
| SAMPLE | 002.jpg;003.jpg;004.jpg;015.jpg;016.jpg;017.jpg;018.jpg |
| PEOPLE | 051.jpg;052.jpg;053.jpg;101.jpg;102.jpg |

FIG.37

| PHOTOGRAPH DATE AND TIME | | | IMAGE FILE |
|---|---|---|---|
| YEAR 2003 | JANUARY | DAY 1 | 201.jpg;202.jpg; ··· |
| | | DAY 2 | 231.jpg;232.jpg;245.jpg ··· |
| | | DAY 3 | · · · · |
| | | DAY 4 | · · · · |
| | | ⋮ | · · · · |
| | | DAY 31 | · · · · |
| | FEBRUARY | DAY 1 | · · · · |
| | | DAY 2 | · · · · |
| | | DAY 3 | · · · · |

FIG.38

| FILE NAME | SAVE DIRECTORY | PHOTOGRAPH DATE AND TIME | CATEGORY |
|---|---|---|---|
| 001.jpg | ¥MY PICTURE¥PICTURE | 10:48 ON JULY 29, 2001 | SAMPLE; EVENT |
| 002.jpg | ¥ | | |

| DATE | IMAGE FILE |
|---|---|
| DAY 2 | A1,A2,A3,····,A11 |
| DAY 3 | B1,B2,B3,····,B24 |
| DAY 6 | C1,C2,C3 |
| DAY 7 | D1 |
| DAY 9 | E1,E2,E3,E4,E5,E6 |
| DAY 10 | F1,F2,F3,····,F14 |

INFORMATION PROCESSING APPARATUS, METHOD AND PROGRAM

CROSS REFERENCES TO RELATED APPLICATIONS

The present invention claims priority to its priority document No. 2003-273466 filed in the Japanese Patent Office on Jul. 11, 2003, the entire contents of which being incorporated by reference herein.

BACKGROUND OF THE INVENTION

1. Field of the Invention

The present invention relates to an information processing apparatus, a method and a program, and more particularly to an information processing apparatus, a method and a program, which make it possible to browse a plurality of image files more easily.

2. Description of the Related Art

In a field of related art, there is software for importing and managing image files generated by photographing with a digital still camera or the like into a personal computer. By means of such software, a user can relatively easily arrange many image files.

Moreover, there is a method for displaying photographed images in a list format by days in which photographs are taken, or by months (see, for example, Japanese Patent Application Publication No. H11-215457).

Moreover, there is an apparatus for recording and managing broadcasted programs by classifying still images representing recorded images per date based on record dates and displaying them in a calendar form for showing AV contents with record date classification in a easily recognizable form at a glance (see, for example, Japanese Patent No. 3284543).

SUMMARY OF THE PRESENT INVENTION

However, in the related art, if a plurality of image files exist on the same date (i.e. a plurality of image files are photographed on the same day) and the image files are displayed in a calendar form, there is a drawback such that it is difficult to display images that have not selected as a representative image because only single representative image is displayed among the plurality of image files for each date. Consequently, there is a drawback such that a user cannot browse all of the images even if the user browses such a calendar display.

According to an embodiment of the present invention, there is provided an information processing apparatus. The information processing apparatus includes classifying means for classifying a plurality of images by a predetermined time unit based on time information attached to the images, display control means for displaying the images classified into the time units by the classifying means in display regions divided for the corresponding time units, and selection means for selecting a plurality of images classified into the same time unit for displaying each of the plurality of images one by one in the corresponding display region if the plurality of images are classified into the same time unit by the classifying means.

The selection means may be configured to judge whether the image to be displayed in the display region is switched or not, and to select an image different from the image displayed in the display region as the image to be displayed in the display region if the selection means judges to switch the image to be displayed in the display region.

Furthermore, the selection means may determine, at a predetermined time interval, whether the image to be displayed in the display region is switched or not.

According to an embodiment of the present invention, there is provided an information processing method. The information processing method includes a classifying step of classifying a plurality of images by a predetermined time unit based on time information attached to the images, a display control step of displaying the images classified into the time units by the process of the classifying step in display regions divided for the corresponding time unit, and a selection step of selecting a plurality of images classified into the same time unit for displaying each of the plurality of images one by one in the corresponding display region if the plurality of images are classified into the same time unit by the classifying step.

According to an embodiment of the present invention, there is provided a program. The program causes a computer to execute a classifying step of classifying a plurality of images by a predetermined time unit based on time information attached to the images, a display control step of displaying the images classified into the time units by the process of the classifying step in display regions divided for the corresponding time unit, and a selection step of selecting a plurality of images classified into the same time unit for displaying each of the plurality of images one by one in the corresponding display region if the plurality of images are classified into the same time unit by the classifying step.

According to an embodiment of the present invention, there is provided an information processing apparatus. The information processing apparatus includes a classifying section for classifying a plurality of images by a predetermined time unit based on time information attached to the images, a display control section for displaying the images classified into the time units by the classifying section in display regions divided for the corresponding time section, and a selection section for selecting a plurality of images classified into the same time unit for displaying each of the plurality of images one by one in the corresponding display region if the plurality of images are classified into the same time unit by the classifying section.

In the information processing apparatus, the method and the program according to the embodiments of the present invention, the plurality of images are classified by the predetermined time unit based on the time information attached to the images, and the images classified into the time units are displayed in the display regions divided for the corresponding time unit, and further, if a plurality of images is classified in the same time unit, the plurality of images classified in the same time unit is selected for displaying the images one by one in the corresponding display region.

According to the embodiments of the present invention, many image files can be displayed in a list form. More specifically, even if there is a plurality of images to be displayed in one display region, all of the images can be browsed by a user.

BRIEF DESCRIPTION OF THE DRAWINGS

The above and other objects, features and advantages of the present invention will become more apparent from the following description of the presently preferred exemplary embodiment of the invention taken in conjunction with the accompanying drawing, in which:

FIG. 36 is a view showing an example of a category database;

FIG. 37 is another view showing an example of a category database;

FIG. 38 is a view showing an example of an attribute information database;

FIG. 47 is a view for illustrating changes of images displayed by a month in accordance with a calendar display process;

FIG. 48 is another view for illustrating changes of images displayed by month in accordance with calendar display process;

FIG. 49 is a further other view for illustrating changes of images displayed by month in accordance with calendar display process; and FIG. 50 is a view for illustrating changes of images displayed by month in accordance with calendar display process.

DETAILED DESCRIPTION OF THE EMBODIMENTS

Below, embodiments for implementing the present invention are described. Corresponding relationships between constituent elements described in claims and examples in the embodiments for implementing the present invention are exemplified as follows. The following description is provided for confirming that the examples supporting the present invention as described in the claims are described in the embodiments for implementing the present invention. Consequently, even if there is an example which is not described as one corresponding to an constituent element herein, though which is described in the embodiments for implementing the present invention, it does not mean that the example does not correspond to the constituent element. On the other hand, even if an example is described herein as one corresponding to a constituent element, it does not mean that the example does not correspond to another constituent element different from the constituent element.

Moreover, this description does not means that every aspects of the present invention corresponding to embodiments described below for implementing the present invention are described in claims. In other words, the description does not deny the existence of an invention which corresponds to an example described in the embodiments for implementing the invention and is not described in the claims of the present application, or the existence of an invention which will be filed as a division application or be added by amendment in future.

Figure 31:
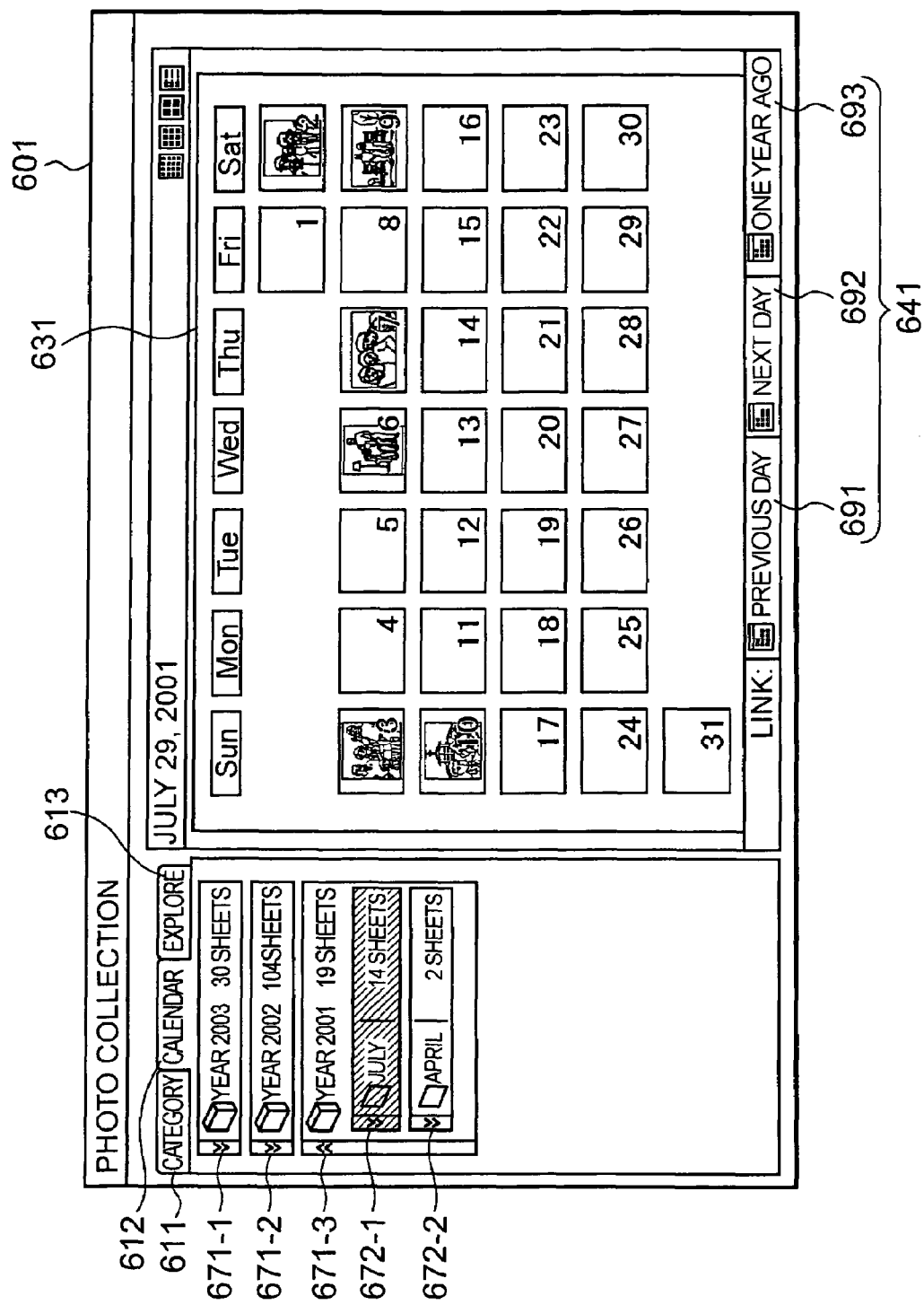
FIG. 31 is a further other view showing a display example of a photo collection window.

An information processing apparatus (for example, a personal computer 1 of FIG. 1) according to a first aspect of the present invention is characterized by including classifying means (for example, an image file classifying unit 801 of FIG. 35) for classifying a plurality of images by a predetermined time unit (for example, a date) based on time information (for example, a photograph date and time) attached to the images, display control means (for example, a display screen generation unit 805 of FIG. 35) for displaying the images classified into time units by the classifying means in display regions (for example, square area for each date in an image display area 631 of FIG. 31) divided for the corresponding time units, and selection means (for example, slide display control unit 806 of FIG. 35) for selecting a plurality of images classified into the same time unit for displaying each of the plurality of images one by one in the corresponding display region if the plurality of images are classified into the same time unit by the classifying means.

In an information processing apparatus according to a second aspect of the present invention, the selection means may be configured to judge whether the images to be displayed in the display regions are switched or not (for example, the process at a step S602 of FIG. 46), and to select images different from the images displayed in the display regions as the images to be displayed in the display regions if the selection means judges to switch the images to be displayed in the display regions.

An information processing method according to a third embodiment of the present invention is characterized by including a classifying step (for example, a step S403 of FIG. 39) of classifying a plurality of images by a predetermined time unit (for example, a date) based on time information (for example, a photograph date and time) attached to the images, a display control step (for example, a step S523 of FIG. 42) of displaying the images classified into time units by the process of the classifying step in display regions (for example, square area for each date in the image display area 631 of FIG. 31) divided for the corresponding time units, and a selection step (for example, a step S604 of FIG. 46) of selecting a plurality of images classified into the same time unit for displaying each of the plurality of images one by one in the corresponding display region if the plurality of images are classified into the same time unit by the classifying step.

A program according to a fourth embodiment of the present invention is characterized by including the like constituent elements as that the information processing method according to the third embodiment of the present invention, and accordingly the description of the constituent elements is omitted.

Figure 1:
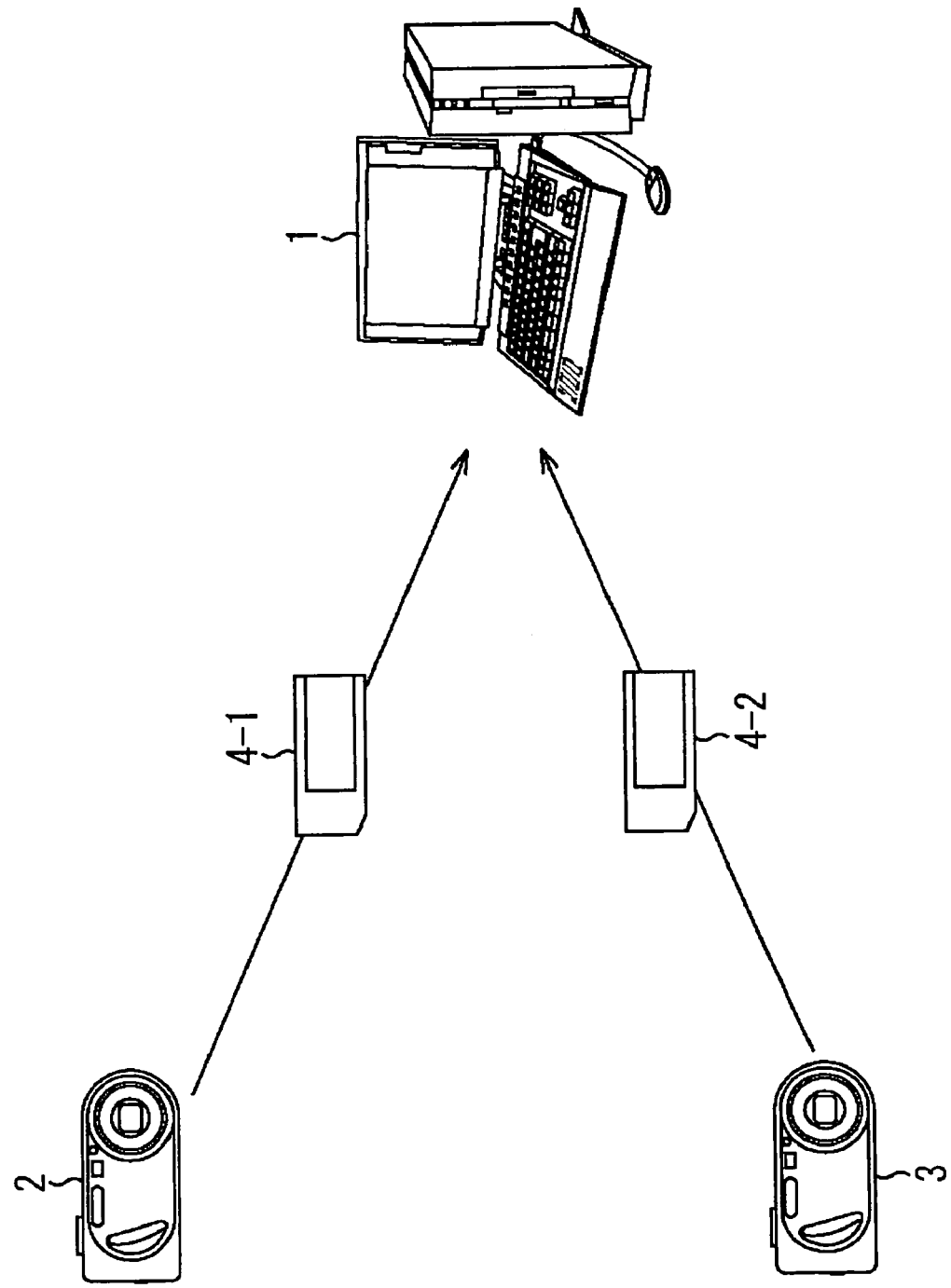
FIG. 1 is a view showing a configuration example of a information processing system to which an embodiment of the present invention is applied.

FIG. 1 shows a configuration example of an embodiment of an information processing system to which an embodiment of the present invention is applied.

In FIG. 1, a digital still camera 2 (hereinafter briefly referred to as DSC 2) photographs a subject at the timing when a user operates a shutter button, generates an image file and record the image file in a memory card 4-1. The DSC 2 attaches a file name including a serial number "001" to an image file which has been created first after the memory card 4-1 has been mounted. The DSC 2 attaches a file name including a serial number "002" to an image file which has been created next. Similarly, the DSC 2 attaches file names including serial numbers to be incremented by one like "003", "004", "005", . . . for the third image file and thereafter, respectively. If the memory card 4-1 has been demounted and then the memory card 4-1 has been mounted again for photographing, the DSC 2 again attaches file names including serial numbers starting from "000" to "002", "003", "004", "005", . . . in the order of image files, respectively.

A digital still camera 3 (hereinafter briefly referred to as DSC 3) photographs a subject at the timing when a user operates a shutter button, generates an image file and record the image file in a memory card 4-2. The DSC 3 attaches a file name including a serial number "001" to an image file which has been created first after the memory card 4-2 has been mounted. The DSC 3 attaches a file name including a serial number "002" to an image file which has been created next. Similarly, the DSC 3 attaches file names including serial numbers to be incremented by one like "003", "004", "005", . . . for the third image file and thereafter, respectively. If the memory card 4-2 has been demounted and then the memory card 4-2 has been mounted again to take a photograph, the DSC 3 attaches serial numbers following to the serial number attached to the image file immediately before the last demounting of the memory card 4-2 to image files, respectively. Consequently, for example, if five image files have been created after the memory card 4-2 has been once mounted on the DSC 3, image files including serial numbers of from "000" through "005" are created. After that, if the memory card 4-2 has been demounted, the DSC 3 stores in a nonvolatile memory a serial number "006" produced by adding one to the serial number "005" of the image file which has been created before the memory card 4-2 has been demounted. Then, if the memory card 4-2 is mounted back on the DSC 3, the DSC 3 attaches a file name including the serial number "006" to an image file photographed and generated.

For example, a memory stick (registered trademark), which has been developed by Sony Corporation, the applicant of the present application, may be used as the memory cards 4-1 and 4-2. The memory cards 4-1 and 4-2 severally include a flash memory device housed in a plastic case having a small and thin shape. The flash memory device is a kind of electrically erasable and programmable read only memories (EEPROM's) as nonvolatile memories the contents of which can be rewritten or deleted electrically. Various kinds of data such as images, sounds and music can be written into or read from the memory cards 4-1 and 4-2. It is needless to say that, in the present embodiment, instead of the memory stick, a flash memory card may be used as each of the memory cards 4-1 and 4-2. In the following description, if it is unnecessary to distinguish each of the memory cards 4-1 and 4-2 separately, they are called as a memory card 4 collectively. In the following sections, names of the other configurations are similarly called.

The memory card 4-1, in which an image file is recorded by a photographing process of the DSC 2, is demounted from the DSC 2 by a user and mounted on a personal computer 1 (hereinafter briefly referred to as "PC 1"). The PC 1 imports the image file from the mounted memory card 4-1, and makes a storage unit 210 (see FIG. 4) store the image file. Moreover, the memory card 4-2, in which an image file is recorded by a photographing process of the DSC 3, is demounted from the DSC 3 by a user and mounted on the PC 1. The PC 1 imports the image file from the mounted memory card 4-2, and makes the storage unit 210 (see FIG. 4) store the image file.

Figure 2:
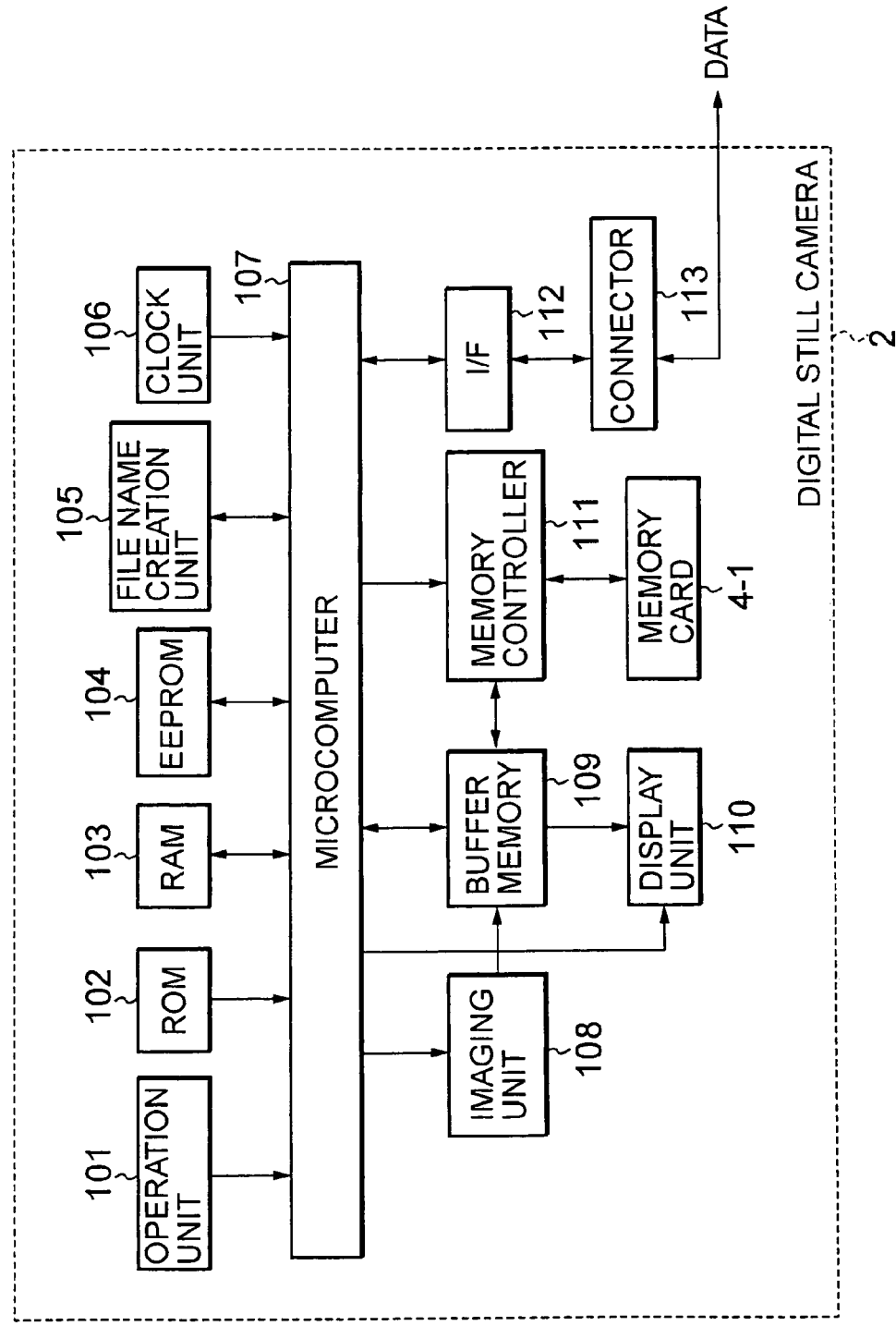
FIG. 2 is a block diagram showing an internal configuration example of a digital still camera 2 of FIG. 1.

Next, FIG. 2 is a block diagram showing an internal configuration example of the DSC 2.

In FIG. 2, an operation unit 101 includes a shutter button and various setting dials, buttons and the like, and informs a microcomputer 107 of an operation signal corresponding to an operation input by the user. A read only memory (ROM) 102 stores various programs such as an operating system and application programs to be executed by the microcomputer 107. A random access memory (RAM) 103 suitably stores information and the like necessary for the execution of a process by the microcomputer 107. An EEPROM 104 stores the value of a serial number included in the file name of an image file.

A file name creation unit 105 creates a file name based on a serial number stored in the EEPROM 104 at the time of the creation of an image file. A clock unit 106 outputs the present time (a year, a month, a day, an hour, a minute and a second) as the need arises. For example, if a photographing process is executed by the DSC 2, the microcomputer 107 obtains the present time output from the clock unit 106 as a photograph date and time.

The microcomputer 107 executes various programs such as the operating system and an application program, both stored in the ROM 102, to control the whole operation of the DSC 2.

An imaging unit 108 includes a lens, a charge coupled device (CCD) imaging device, an analogue-digital (A/D) conversion circuit, an image processing circuit and the like. A subject image which has entered through the lens is photoelectrically converted by the CCD imaging device. The photoelectrically converted analog signal of the subject image is converted into a digital signal by the A/D conversion circuit. The digital signal of the subject image is processed by the image processing circuit in accordance with various kinds of signal processing (image correction processing) such as a gamma correction and a white balance adjustment.

Image data created by the imaging unit 108 is stored in a buffer memory 109. Moreover, the image data stored in the buffer memory 109 is displayed on a display unit 110.

The display unit 110 includes, for example, a liquid crystal display (LCD), and displays an image corresponding to image data supplied from the buffer memory 109, a screen for various setting and the like.

The image data stored in the buffer memory 109 is compressed by a compressing/expanding circuit (not shown) in accordance with, for example, a Joint Photographic Expert Group (JPEG) system. Then, the information such as the file name created by the name creation unit 105, the photograph date and time output from the clock unit 106, and the like is attached to the compressed image data, and consequently an image file to be recorded in the memory card 4-1 is created. The created image file is recorded into the memory card 4-1 through a memory controller 111.

The memory card 4-1 is configured to be detachable to the DSC 2.

Moreover, the image file recorded in the memory card 4-1 is suitably read out through the memory controller 111, and is output to, for example, the PC 1 through an interface (I/F) 112 and a connector 113.

Figure 3:
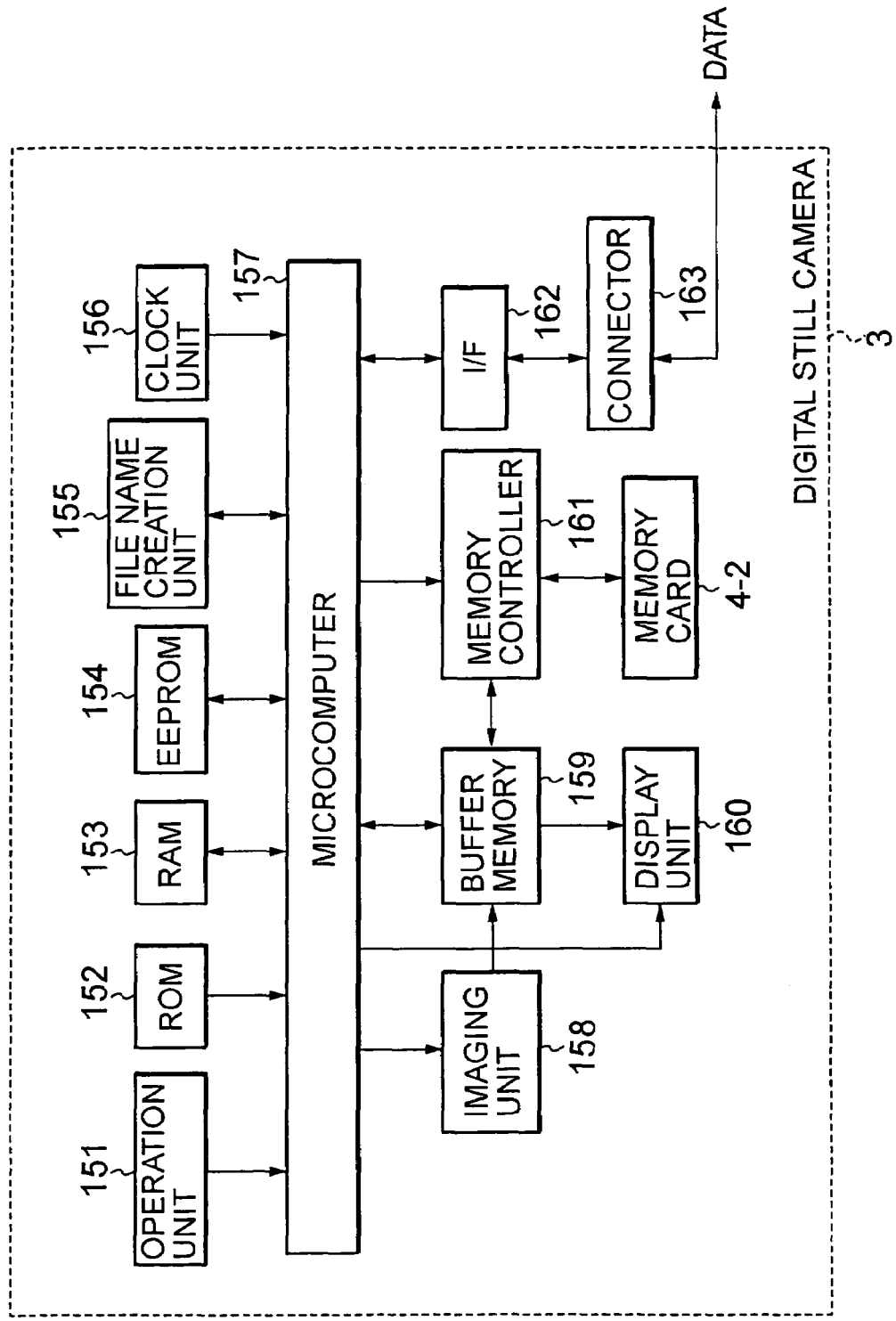
FIG. 3 is a block diagram showing an internal configuration example of a digital still camera 3 of FIG. 1.

Next, FIG. 3 is a block diagram showing an internal configuration example of the DSC 3. Components from an operation unit 151 to a connector 163, which constitute the DSC 3 of FIG. 3, basically have the same configurations as components from the operation unit 101 to the connector 113 of FIG. 2, respectively, and corresponding components having corresponding names have corresponding functions. Accordingly, their descriptions are omitted for avoiding a repetition.

Figure 4:
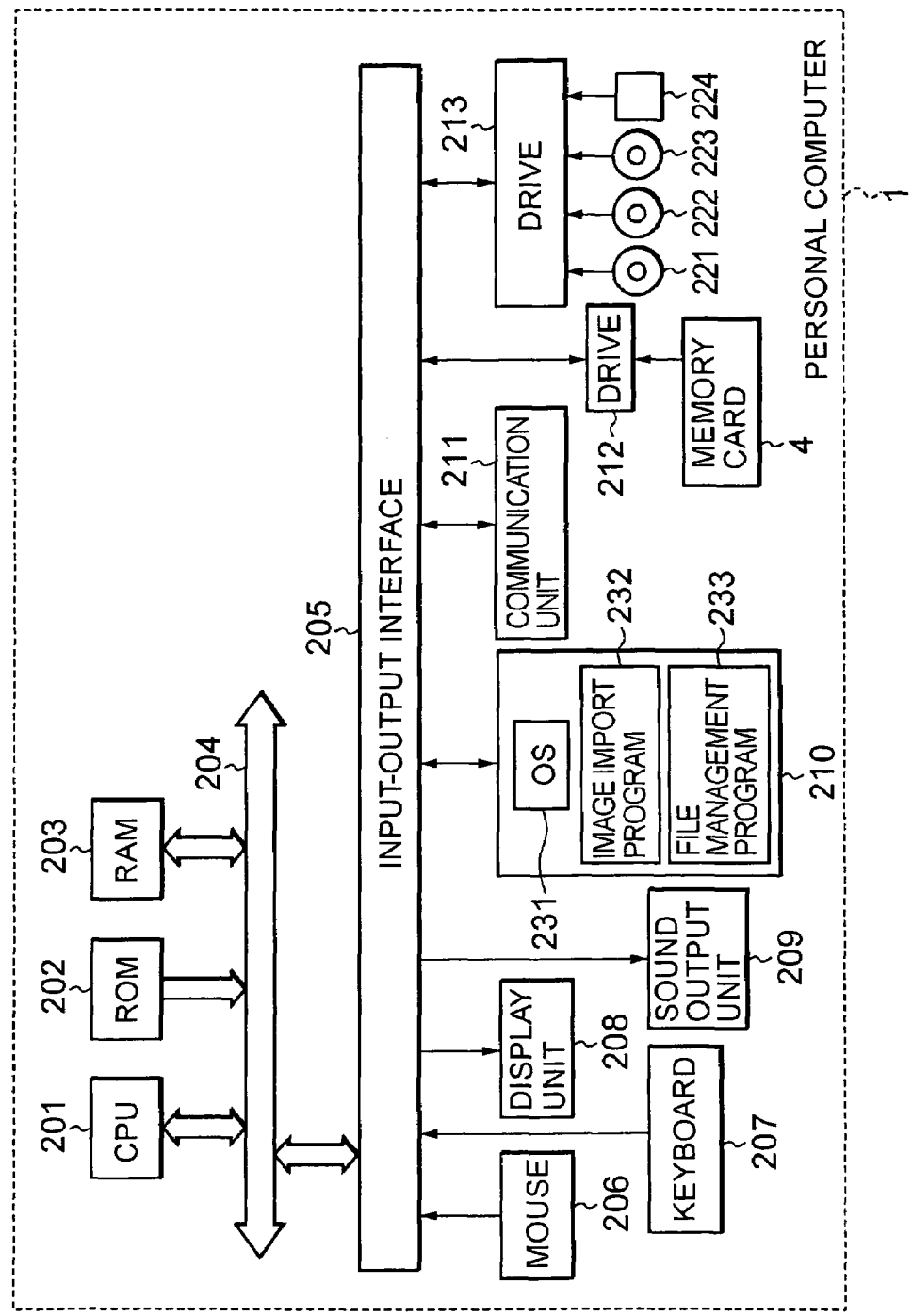
FIG. 4 is a block diagram showing an internal configuration example of a personal computer of FIG. 1.

Next, FIG. 4 is a block diagram showing an internal configuration example of the PC 1.

In FIG. 4, a central processing unit (CPU) 201 executes various processes in accordance with a program stored in a ROM 202, or a program loaded into a RAM 203 from the storage unit 210. The RAM 203 also suitably stores data or the like necessary for the CPU 201 to execute various processes.

The CPU 201, the ROM 202 and the RAM 203 are mutually connected through a bus 204. An input-output interface 205 is also connected to the bus 204.

A mouse 206, which serves as a pointing device, and a keyboard 207 are connected to the input-output interface 205 for receiving the inputs of operations from the user. Moreover, the input-output interface 205 is also connected to a display unit 208 including a cathode ray tube (CRT), a LCD or the like, a sound output unit 209 including a speaker or the like, the storage unit 210 including a hard disk or the like, and a communication unit 211 including a modem, a terminal adapter or the like. The storage unit 210 records a file such as an image file, data and the like besides various programs such as an operating system (OS), an image import program 232 and a file management program 233. The communication unit 211 performs a communication process through a network including an Internet.

The input-output interface 205 is also connected to a drive 212. The memory card 4 is mounted on the drive 212 to perform processes such as the import of the image data recorded on the memory card 4, the deletion of an image file recorded on the memory card 4, and the recording of an imported history file to the memory card 4.

Moreover, a drive 213 is connected to the input-output interface 205 as the need arises. A magnetic disk 221, an optical disk 222, an magneto-optical disk 223, a semiconductor memory 224 and the like are suitably mounted to the drive 213, and computer programs read from them are installed into the storage unit 210 as the need arises.

Figure 5:
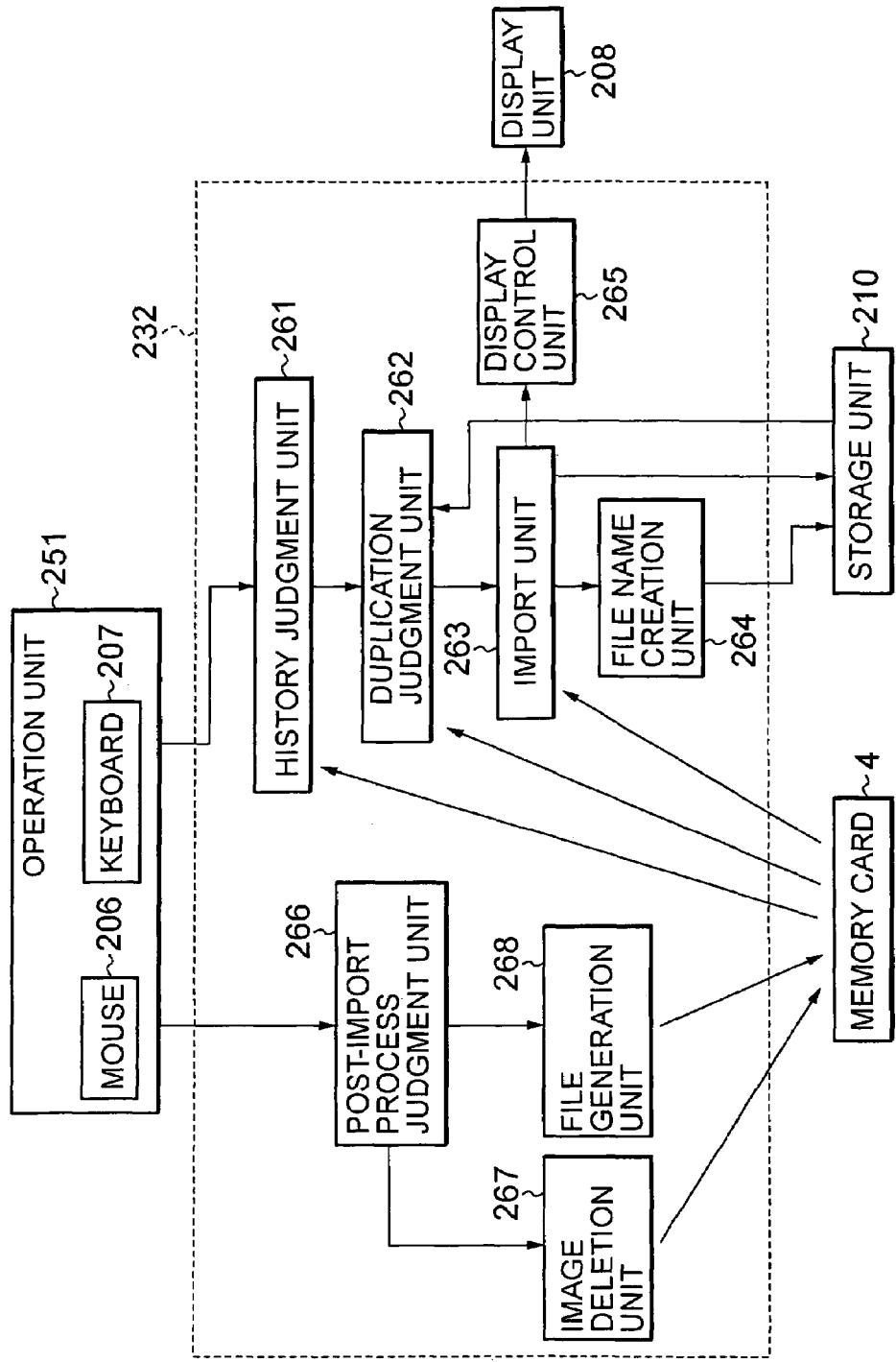
FIG. 5 is a block diagram showing a functional configuration example of an image import program of FIG. 4.

Next, FIG. 5 shows a functional configuration example of the image import program 232 of FIG. 4. The functional configuration shown in FIG. 5 is realized by the execution of the OS 231 and the image import program 232, both stored in the storage unit 210, by the CPU 201.

In FIG. 5, a history judgment unit 261 judges whether a history file is recorded in the memory card 4 or not and informs a duplication judgment unit 262 of the judgement result (the presence of the history file) if an instruction of the import of the image files recorded on the memory card 4 is input through an operation unit 251 including the mouse 206 and the keyboard 207.

The duplication judgment unit 262 obtains the file names of the image files recorded on the memory card 4 based on the information of a judgement result from the history judgment unit 261, and the file names of the image files (the image files which have been imported) stored in the storage unit 210. Then, the duplication judgment unit 262 compares these file names to judge whether the same file names exist or not in the file names of the image files recorded on the memory card 4 and the file names of the image files stored in the storage unit 210, and informs an import unit 263 of the judgement result (the presence of the duplication of the file names).

Moreover, the duplication judgment unit 262 suitably judges whether the same files exist or not in the image files recorded in the memory card 4 and the image files stored in the storage unit 210, and informs the import unit 263 of the judgement result.

The import unit 263 imports (reads) the image files recorded on the memory card 4 based on the judgment results informed by the duplication judgment unit 262, and suitably supplies the imported image files to a file name creation unit 264 or the storage unit 210. Moreover, if the import unit 263 has completed the import of the image files from the memory card 4, the import unit 263 transmits a signal indicating the completion of the import of the image files to a display control unit 265.

The file name creation unit 264 creates a new file name to be attached to an image file supplied from the import unit 263, an attaches the created file name to the image file supplied from the import unit 263. At this time, the file name creation unit 264 deletes the old file name originally attached to the image file. Accordingly, the file names of the image files imported into the PC 1 are changed. The file name creation unit 264 supplies the image files having the new file names to the storage unit 210 to be stored therein.

If a signal indicating the completion of the import of the image files is informed to the display control unit 265 from the import unit 263, the display control unit 265 makes the display unit 208 display a guidance urging the selection of the deletion of the image files recorded on the memory card 4.

A post-import process judgment unit 266 judges whether an instruction of the deletion of the image files recorded on the memory card 4 has been input, or whether an instruction instructing the leaving of the image files recorded on the memory card 4 without deleting them has been input, based on an operation signal from the operation unit 251 after the import of the image files from the memory card 4. Then, if the post-import process judgment unit 266 judges that the instruction of the deletion of the image files recorded on the memory card 4 has been input, the post-import process judgment unit 266 commands an image deletion unit 267 to delete the image files recorded on the memory card 4. Moreover, if the instruction indicating the leaving of the image files recorded on the memory card 4 without keeping them has been input, the post-import process judgment unit 266 commands a file generation unit 268 to record the history file into the memory card 4.

If the deletion of the image files recorded on the memory card 4 is commanded from the post-import process judgment unit 266, the image deletion unit 267 collectively deletes all of the image files recorded on the memory card 4. If any history file is recorded on memory card 4, the image deletion unit 267 also deletes the history file together with the image files.

If the file generation unit 268 is informed of the command of recording a history file into the memory card 4 from the post-import process judgment unit 266, the file generation unit 268 creates a history file indicating that the image files recorded on the memory card 4 has been already imported, and records the created history file on the memory card 4.

Next, an outline of the present invention is described with reference to FIGS. 6 to 14.

Figure 6:
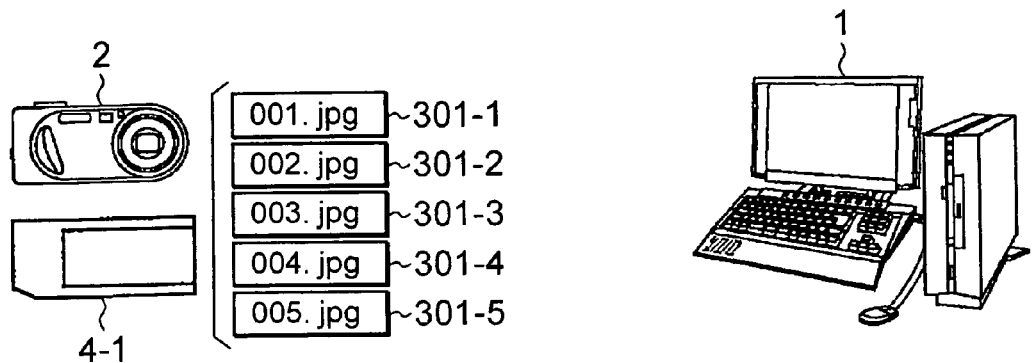
FIG. 6 is a view for illustrating the outline of an embodiment of the present invention.

In FIG. 6, the DSC 2 sequentially creates image files 301-1 to 301-5 by performing the photographing process five times, and records the image files into the memory card 4-1. The file name of the image file 301-1 is "001.jpg"; the file name of the image file 301-2 is "002.jpg"; the file name of the image file 301-3 is "003.jpg"; the file name of the image file 301-4 is "004.jpg"; the file name of the image file 301-5 is "005.jpg".

Figure 7:
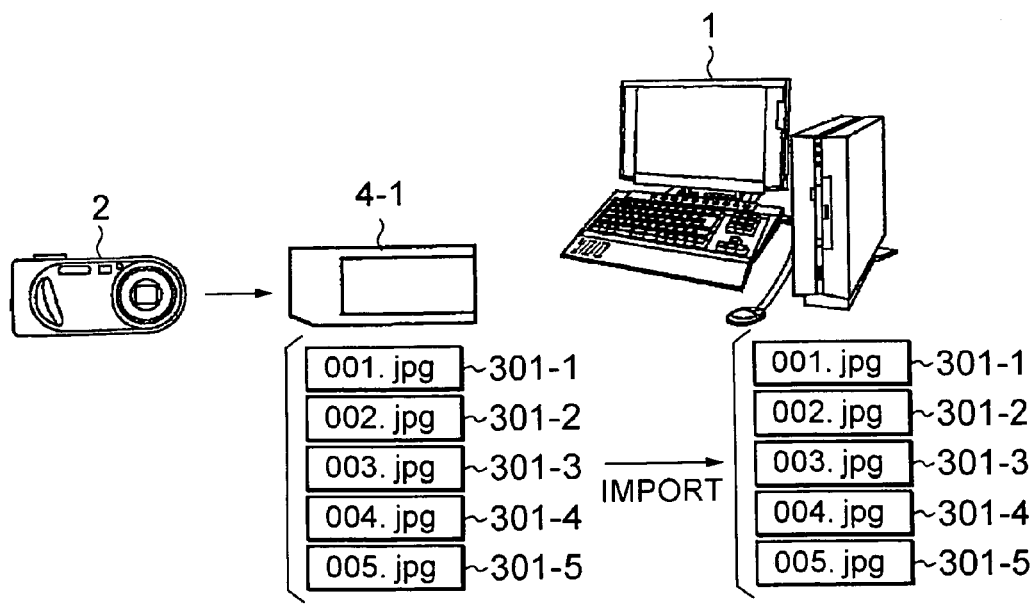
FIG. 7 is another view for illustrating the outline of an embodiment the present invention.
Figure 8:
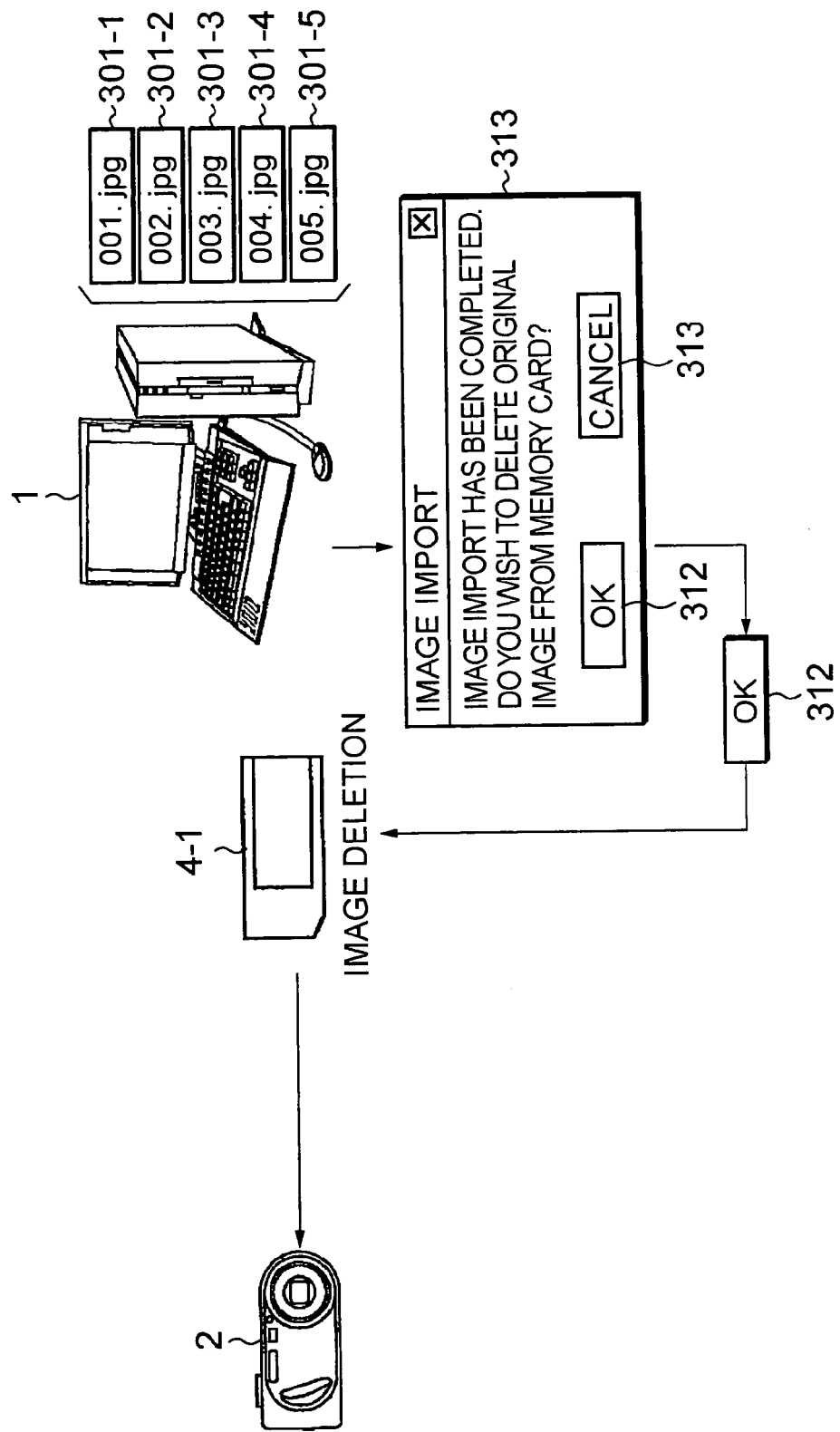
FIG. 8 is a further other view for illustrating the outline of an embodiment of the present invention.

In FIG. 7, the memory card 4-1 in which the image files 301-1 to 301-5 of FIG. 6 are recorded is demounted from the DSC 2, and is mounted on (the drive 212 of the) PC 1. The PC 1 imports the image files 301-1 to 301-5 recorded on the memory card 4-1, and makes the storage unit 210 store the image files 301-1 to 301-5. The PC 1 displays a guidance screen 311 as shown in FIG. 8 at the timing when the import of the image files 301-1 to 301-5 recorded on the memory card 4-1 has been completed.

The guidance screen 311 displays a guidance "IMAGE IMPORT HAS BEEN COMPLETED. DO YOU WISH TO DELETE ORIGINAL IMAGE FROM MEMORY CARD?" By the guidance, a user can know that the import of the image files from the memory card 4-1 has been completed, and that the user is urged to select whether to delete the image files recorded on the memory card 4-1 or not. In the guidance screen 311, an OK button 312 and a cancel button 313 are also displayed. The user can select the deletion of the image files recorded on the memory card 4-1 by selecting the OK button 312 with the mouse 206 or the like. The user can also select not to delete the image files recorded on the memory card 4-1 by selecting the cancel button 313.

If the OK button 312 is selected, the PC 1 deletes all of the image files recorded on the memory card 4-1. Moreover, if the cancel button 313 is selected, the PC 1 does not delete any of the image files recorded on the memory card 4-1, but records a history file (a file indicating that the image files have been imported) on the memory card 4-1. In the example of FIG. 8, all of the image files recorded on the memory card 4-1 are collectively deleted.

Figure 9:
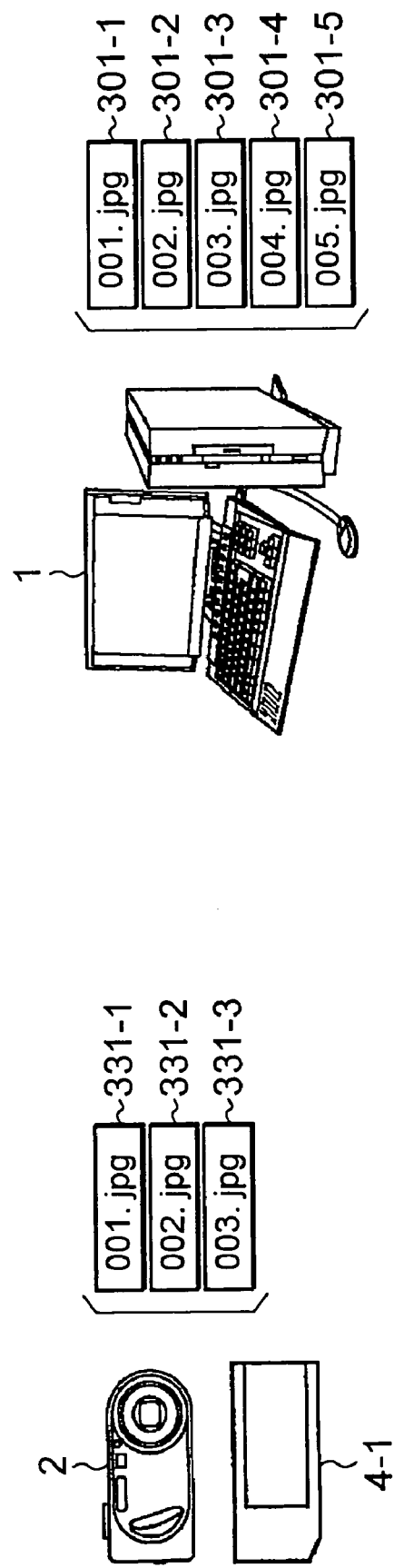
FIG. 9 is a view for illustrating the outline of an embodiment of the present invention.
Figure 10:
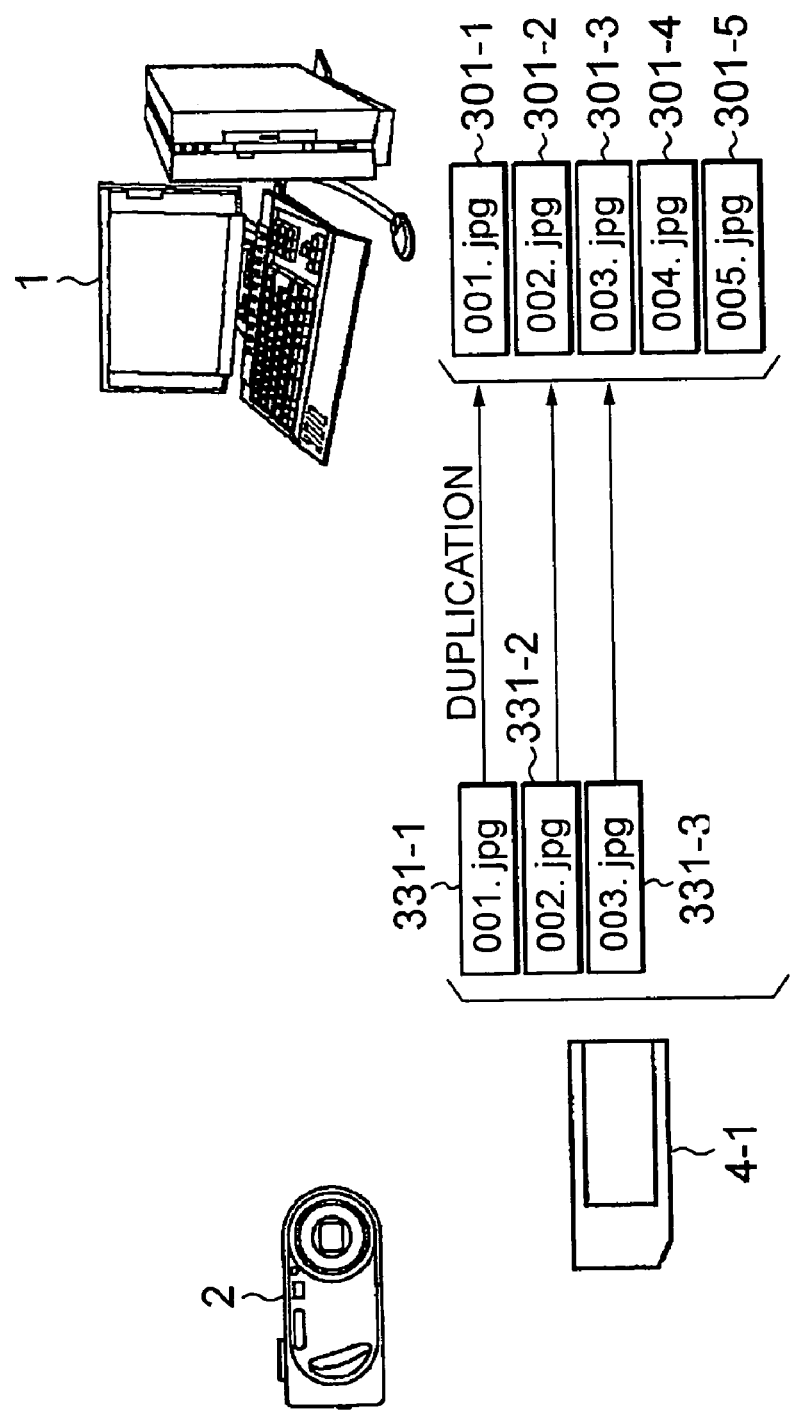
FIG. 10 is another view for illustrating the outline of an embodiment of the present invention.

If the memory card 4-1 is mounted again on the DSC 2 and a photograph is taken by the DSC 2 in the state in which the image files 301-1 to 301-5 are recorded in the PC 1 in the way described above, image files 331-1 to 331-3 generated by the DSC 2 are recorded on the memory card 4-1 as shown in FIG. 9. The file name of the image file 331-1 is "001.jpg"; the file name of the image file 331-2 is "002.jpg"; the file name of the image file 331-3 is "003.jpg". That is, if the memory card 4-1 has been once demounted and has been mounted again, the DSC 2 resets the serial numbers of the file names and again starts the serial number from "001". Consequently, the file names of the image files 331-1 to 331-3 recorded on the memory card 4-1 are the same as the file names of the image files 301-1 to 301-3, which have been imported in the PC 1, respectively. Hence, if the memory card 4-1 is demounted from the DSC 2 and is mounted in the PC 1 in order that the PC 1 may import the image files 331-1 to 331-3, the file names of the image files 331-1 to 331-3 are duplicated with those of the image files 301-1 to 301-3, which have been stored in the PC 1 already, as shown in FIG. 10.

Figure 11:
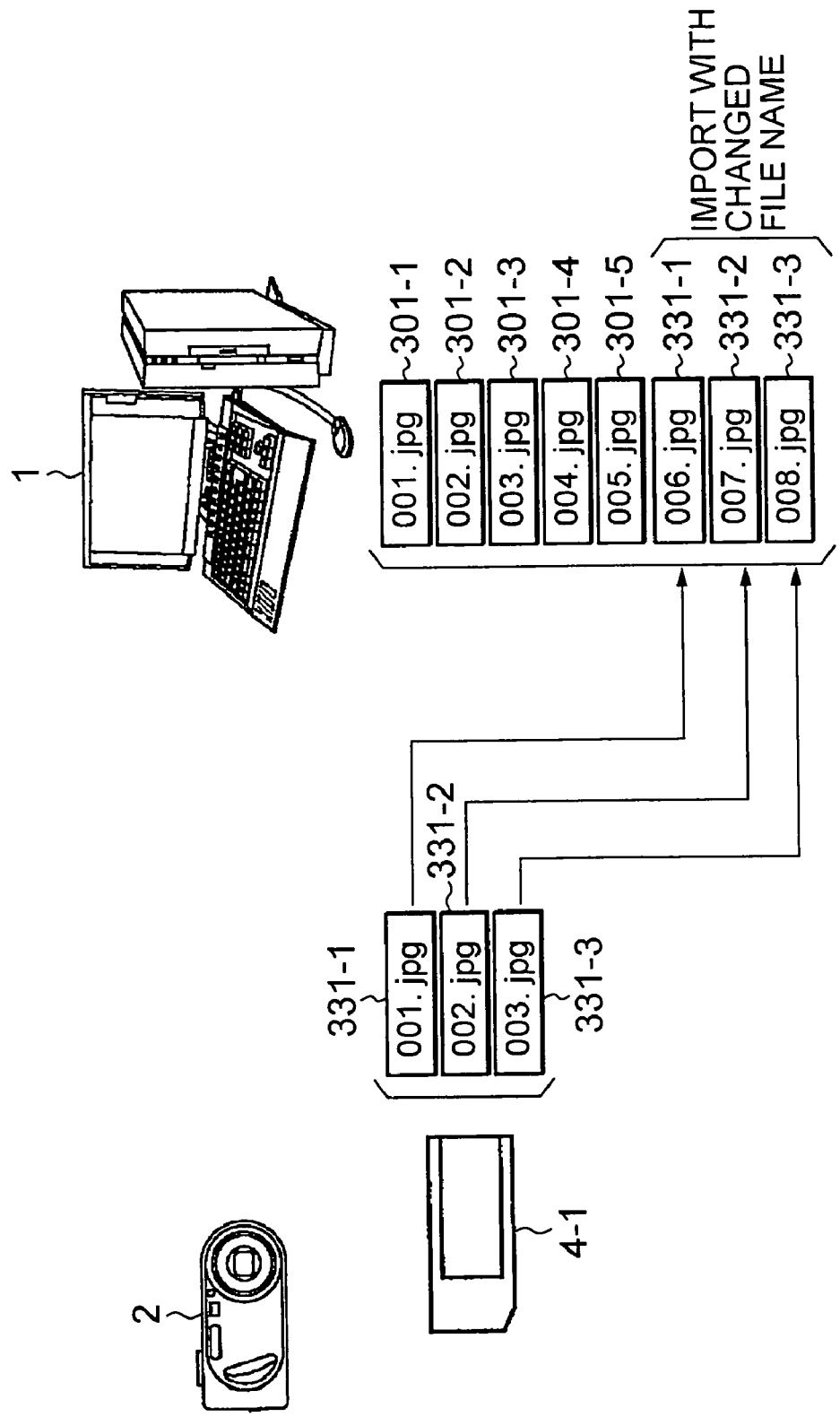
FIG. 11 is a further other view for illustrating the outline of an embodiment of the present invention.

Accordingly, in this case, as shown in FIG. 11, the PC 1 changes the file name of the image file 331-1 from "001.jpg" to "006.jpg", the file name of the image file 331-2 from "002.jpg" to "007.jpg", and the file name of the image file 331-3 from "003.jpg" to "008.jpg", and then the PC 1 stores the changed file names. That is, if there are image files having the same names among the image files recorded on the memory card 4-1 as the names of the image files which have already been stored in the PC 1, the PC 1 changes the file names of the image files to be imported so as not to duplicate with the file names which have already been stored in the PC 1.

If image files are imported without changing their file names as in a conventional way, there is the case where the image files (for example, the image file 331-1) imported from the memory card 4-1 are overwritten to be saved on the image files (for example, the image file 301-1) which have been stored in the PC 1 originally. Consequently, there is a drawback in which the image files which have been originally stored in the PC 1 are deleted. Moreover, there is also a drawback in which a user should change the file names of the image files to be imported from the memory card 4-1 one by one for avoiding such a trouble and such changes take a long time.

On the contrary, as shown in FIG. 11, if the image files having the same names as those of the image files stored in the PC 1 are recorded in the memory card 4-1, the file names of the image files stored in the memory card 4-1 are changed to be imported from the PC 1 in order not to duplicate with the file names, and Accordingly the erroneous deletion of the image files which have been originally stored in the PC 1 can be prevented and a user can avoid taking a needless time.

Figure 12:
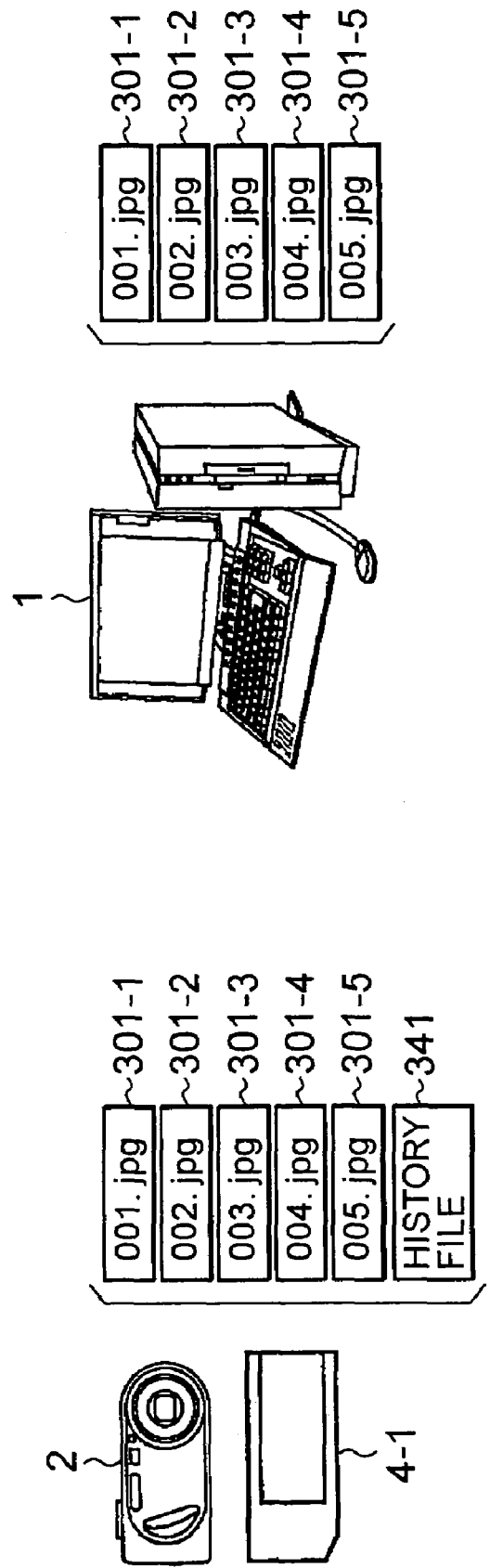
FIG. 12 is a view for illustrating the outline of an embodiment of the present invention.

Now, in FIG. 8, after the image files 301-1 to 301-5 have been imported from the memory card 4-1 into the PC 1, the image files 301-1 to 301-5 recorded on the memory card 4-1 are deleted. However, if the image files 301-1 to 301-5 are not deleted at this time, the state of the memory card 4-1 becomes one as shown in FIG. 12. In FIG. 12, the memory card 4-1 in which the image files 301-1 to 301-5 are still recorded is mounted on the DSC 2. The memory card 4-1 further records a history file 341 besides the image files 301-1 to 301-5. Moreover, the PC 1 stores the imported image files 301-1 to 301-5.

Figure 13:
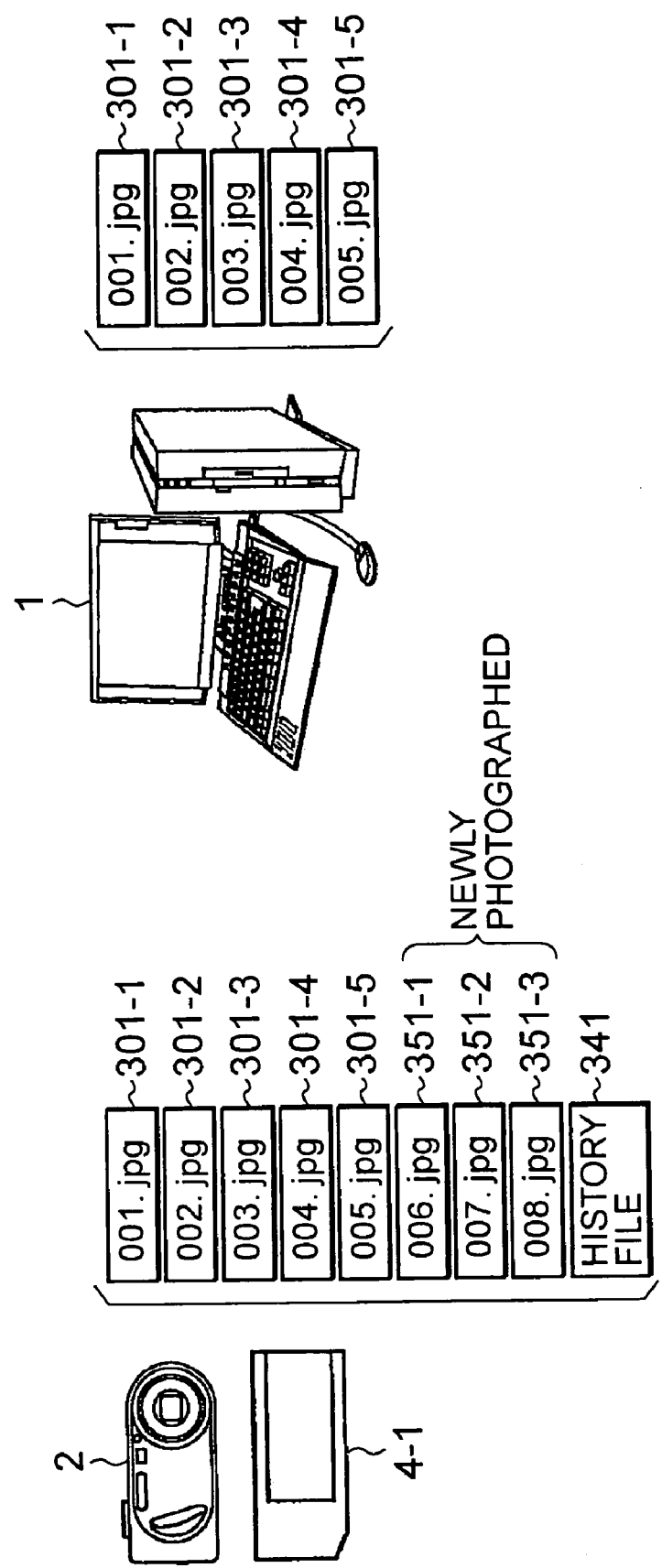
FIG. 13 is another view for illustrating the outline of an embodiment of the present invention.

In this state, if the DSC 2 further performs photographing process, further image files are generated as shown in FIG. 13 to be recorded in the memory card 4-1. In the example shown in FIG. 13, the photographing process has been executed three times, and three image files 351-1 to 351-3 are recorded on the memory card 4-1. A state in which the memory card 4-1 is demounted from the DSC 2 and is mounted on the PC 1 is shown in FIG. 14.

Figure 14:
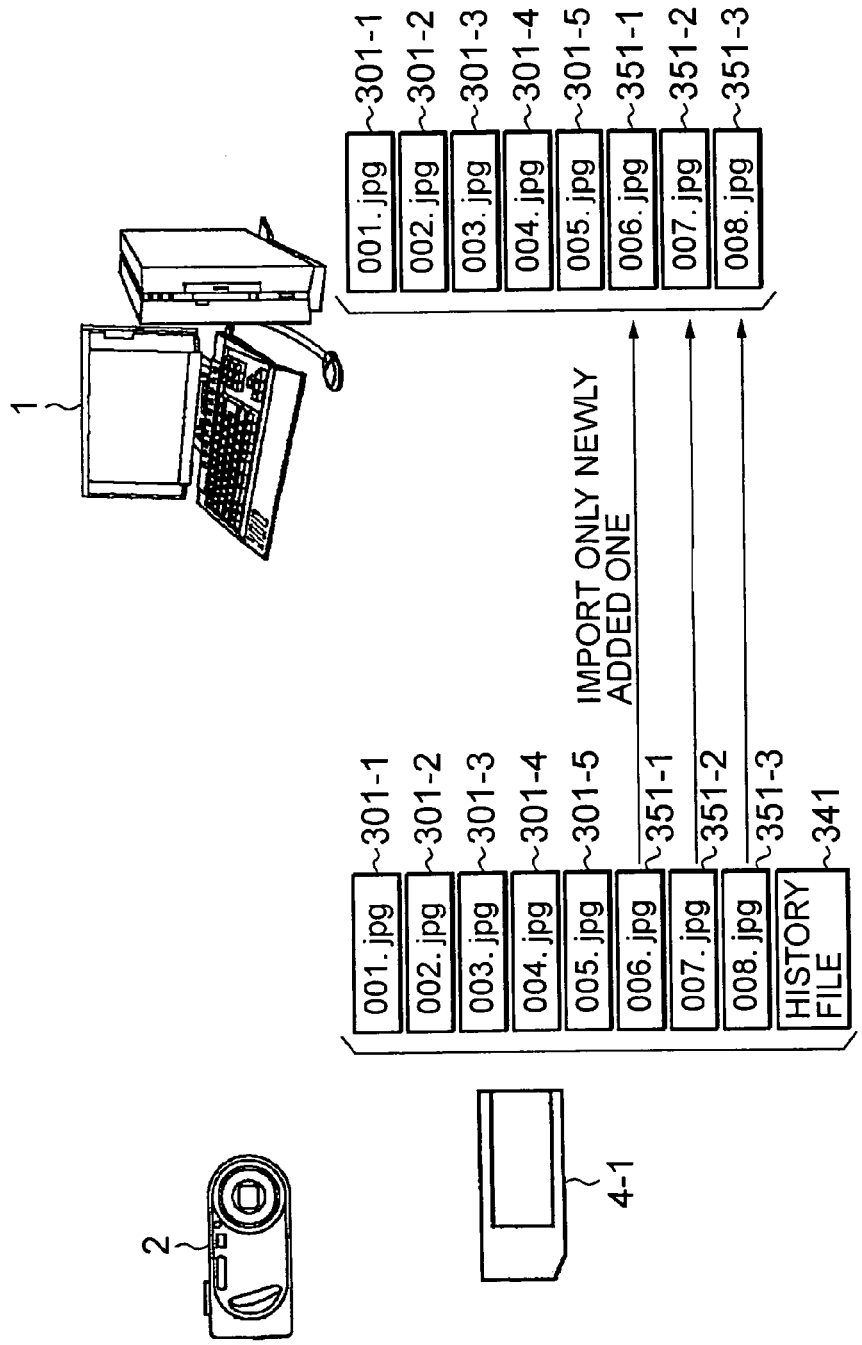
FIG. 14 is a further other view for illustrating the outline of an embodiment of the present invention.

In FIG. 14, the PC 1 first judges that the image files which have been already imported exist on the memory card 4-1 based on the fact that the history file 341 is recorded on the memory card 4-1. Then, the PC 1 does not import the image files 301-1 to 301-5, which has been already imported, but imports only the image files 351-1 to 351-3, which has been newly recorded onto the memory card 4-1. In such a way, if the same image files as the image files recorded on the memory card 4-1 have been already stored in the PC 1, the image files are not imported. Accordingly, it can be prevented to duplicate storage of the same image files into the PC 1. Moreover, the time required for the transfer of the image files from the memory card 4-1 to the PC 1 can be reduced.

Next, a photographing process of the DSC 2 is described with reference to a flowchart shown in FIG. 15.

Figure 15:
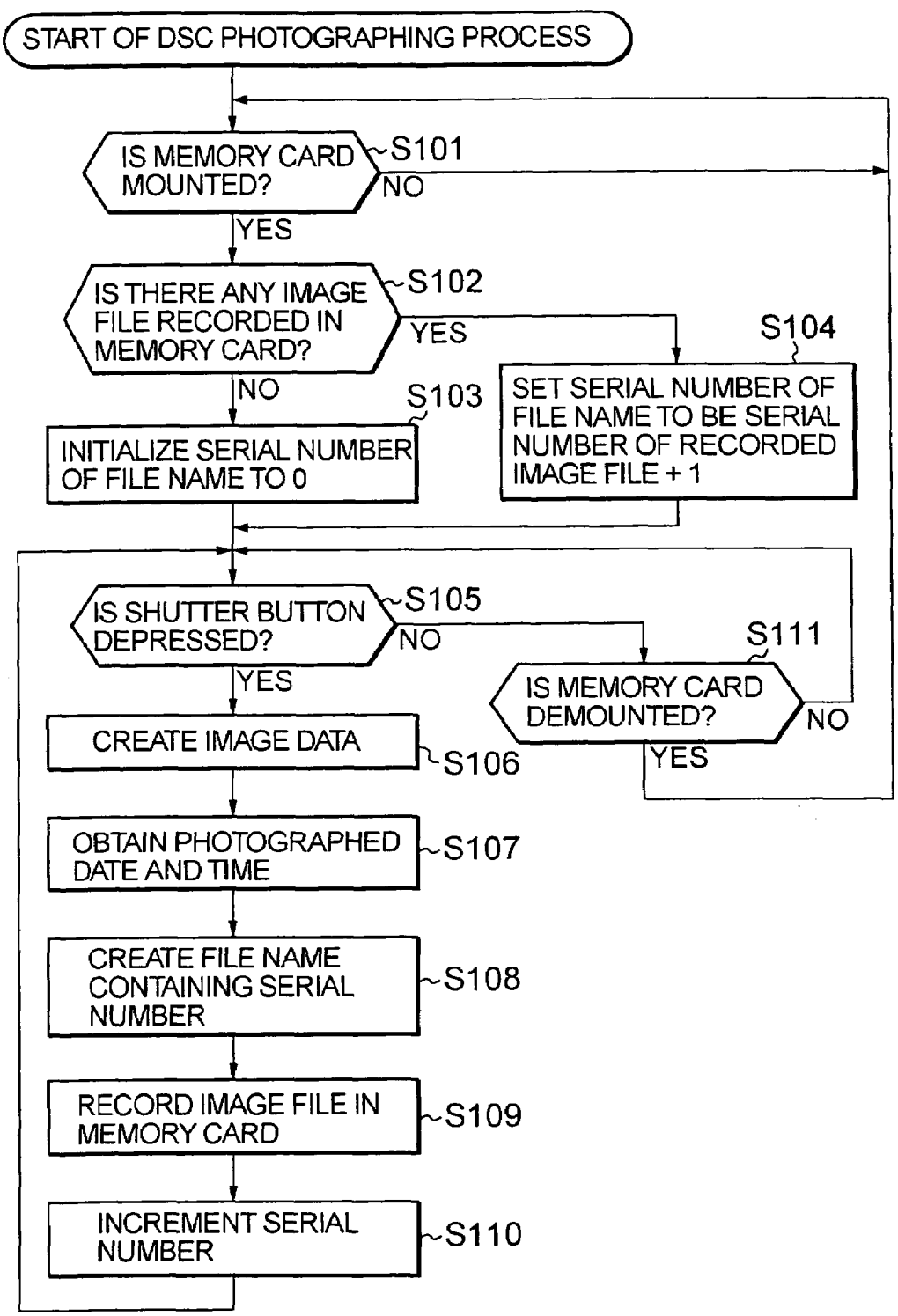
FIG. 15 is a flowchart for illustrating photographing process of a digital still camera 2.

At a step S101 of FIG. 15, the microcomputer 107 of the DSC 2 monitors the memory controller 111 to judge whether the memory card 4-1 is mounted or not, and waits until the memory card 4-1 is mounted. If the memory card 4-1 is mounted on the DSC 2, the process proceeds to a step S102.

At the step S102, the microcomputer 107 retrieves a file recorded on the memory card 4-1 with the memory controller 111. Then, the microcomputer 107 judges whether any image files have been already recorded on the memory card 4-1 or not. If no image files are recorded on the memory card 4-1, the process proceeds to a step S103.

At the step S103, the microcomputer 107 initializes the serial number of a file name to "001" to store the serial number into the EEPROM 104. After that, the process proceeds to a step S105.

If the microcomputer 107 judges that an image file is recorded on the memory card 4-1 at the step S102, the process proceeds to a step S104.

At the step S104, the microcomputer 107 sets the serial number of the file name to one of the serial number of the image file recorded on the memory card 4-1 added by one, and stores the added serial number into the EEPROM 104. If a plurality of image files are recorded on the memory card 4-1, the microcomputer 107 specifies the largest serial number among the file names of the plurality of image files, and stores a value obtained by the addition of one to the maximum serial number into the EEPROM 104. After that, the process proceeds to the step S105.

At the step S105, the microcomputer 107 judges whether the shutter button (the operation unit 101) is depressed or not. If the shutter button is depressed, the process proceeds to a step S106.

At the step S106, the microcomputer 107 commands the imaging unit 108 to generate image data. The imaging unit 108 generates the image data in accordance with the command, and stores the generated image data into the buffer memory 109.

At a step S107, the microcomputer 107 obtains the present time from the clock unit 106 as a photograph date and time.

At a step S108, the microcomputer 107 commands the file name creation unit 105 to create a file name. The file name creation unit 105 creates the file name in accordance with the command form the microcomputer 107. That is, the file name creation unit 105 first reads the serial number stored in the EEPROM 104, and adds a character string such as an extension to the read serial number to create a file name.

At a step S109, the microcomputer 107 adds the photograph date and time obtained at the step S107 and the file name created by the file name creation unit 105 at the step S108 to the image data stored in the buffer memory 109 at the step S106 to create an image file, and records the created image file into the memory card 4-1 with the memory controller 111.

At a step S110, the microcomputer 107 reads the serial number stored in the EEPROM 104, and increments the read serial number by one to set the incremented serial number as a new serial number. Then, the microcomputer 107 stores the new serial number into the EEPROM 104. The old serial number is deleted at this time.

After the step S110, the process returns to the step S105, and the above-mentioned processes on and after the step S105 are repeated.

Returning to the step S105, the process proceeds to a step S111 if the microcomputer 107 judges that the shutter button is not depressed.

At the step S111, the microcomputer 107 monitors the memory controller 111 to judge whether the memory card 4-1 is demounted from the DSC 2 or not. Then, if the memory card 4-1 is not demounted from the DSC 2, the process returns to the step S105, and the above-mentioned processes on and after the step S105 are repeated. Moreover, if the microcomputer 107 judges that the memory card 4-1 is demounted from the DSC 2 at the step S111, the process returns to the step S101, and the above-mentioned processes on and after the step S101 are repeated.

In the way described above, the photographing process of the DSC 2 is executed.

As described above, in the DSC 2, if the memory card 4-1 is mounted again (YES at the step S101) after the memory card 4-1 has once been demounted (YES at the step S111), the serial number of the file name is initialized to "001" (the step S103). Consequently, if the image file photographed by the DSC 2 is imported into the PC 1, the possibility of the existence of the image file having the same name in the PC 1 is high.

On the other hand, in the DSC 3, even if the memory card 4 has been demounted and the memory card 4 is mounted again, the serial number of a file name is not initialized.

Next, the photographing process of the DSC 3 is described with reference to the flowchart of FIG. 16. The processes similar to the photographing processes of the DSC 2 are described in brief.

Figure 16:
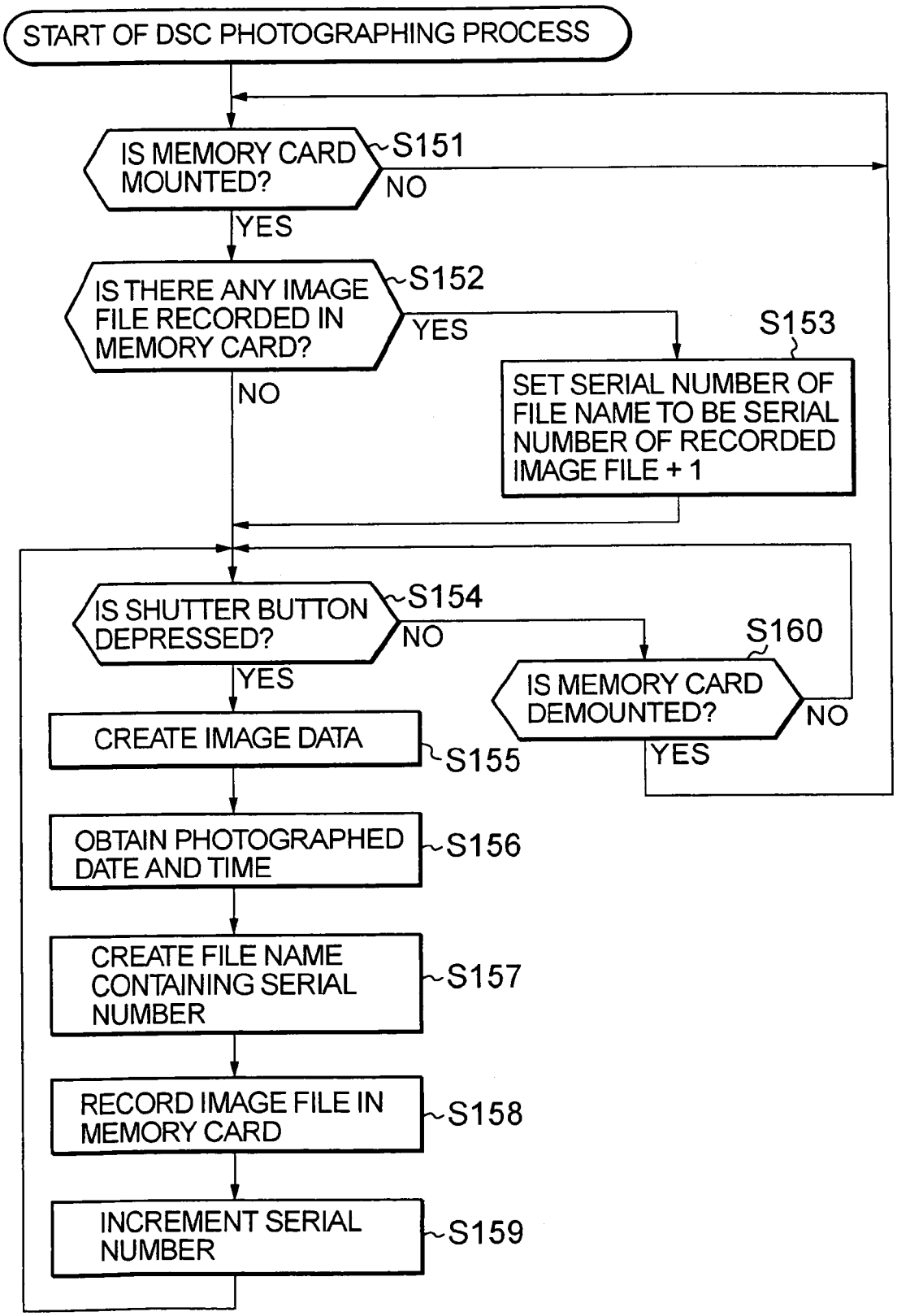
FIG. 16 is a flowchart for illustrating photographing process of a digital still camera 3.

At a step S151 of FIG. 16, a microcomputer 157 of the DSC 3 monitors a memory controller 161 to judge whether the memory card 4-2 is mounted or not. The microcomputer 157 waits until the memory card 4-2 is mounted. If the memory card 4-2 is mounted on the DSC 3, the process proceeds to a step S152. At the step S152, the microcomputer 157 judges whether any image file has been already recorded on the memory card 4-2 or not. If no image files are recorded on the memory card 4-2, the process proceeds to a step S154.

At the step S152, if the microcomputer 157 judges that an image file is recorded on the memory card 4-2, the process proceeds to a step S153. At the step S153, the microcomputer 107 sets the serial number of the file name to the serial number of the image file recorded on the memory card 4-2 added by one, and stores the added serial number into an EEPROM 154. After that, the process proceeds to the step S154.

At the step S154, the microcomputer 157 judges whether the shutter button (the operation unit 151) is depressed or not. If the shutter button is depressed, the process proceeds to a step S155. At the step S155, an imaging unit 158 generates image data in accordance with a command from the microcomputer 157 to store the generated image data into a buffer memory 159. At a step S156, the microcomputer 157 obtains the present time from a clock unit 156 as a photograph date and time.

At a step S157, a file name creation unit 155 creates a file name in accordance with a command from the microcomputer 157. That is, the file name creation unit 155 first reads the serial number stored in the EEPROM 154, and adds a character string such as an extension to the read serial number to create the file name.

At a step S158, the microcomputer 157 adds the photograph date and time obtained at the step S156 and the file name created by the file name creation unit 155 at the step S157 to the image data stored in the buffer memory 159 at the step S155 to create an image file, and records the created image file on the memory card 4-2 with the memory controller 161.

At a step S159, the microcomputer 157 reads the serial number stored in the EEPROM 154, and increments the read serial number by one to set the incremented serial number as a new serial number. Then, the microcomputer 157 stores the new serial number into the EEPROM 154. At this time, the old serial number is deleted. After the step S159, the process returns to the step S154, and the above-mentioned processes on and after the step S154 are repeated.

Returning to the step S154, if the microcomputer 157 judges that the shutter button is not depressed, the process proceeds to a step S160.

At the step S160, the microcomputer 157 monitors the memory controller 161 to judge whether the memory card 4-2 is demounted from the DSC 3 or not. If the memory card 4-2 is not demounted from the DSC 3, the process returns to the step S154, and the above-mentioned processes on and after the step S154 are repeated. Moreover, at the step S160, if the microcomputer 157 judges that the memory card 4-2 is demounted from the DSC 3, the process returns to the step S151, and the above-mentioned processes on and after the step S151 are repeated.

In the way described above, the photographing process of the DSC 3 is executed.

As described above, in the DSC 3, even if the memory card 4-2 is mounted again (YES at the step S151) after the memory card 4-2 has been once demounted from the DSC 3 (YES at the step S160), the serial number of the file name is not initialized because no step for initializing the serial number of a file exist.

If the image file recorded on the memory card 4-1 (or the memory card 4-2) is imported to the PC 1 after the photographing processes have been execute in the way described above, the memory card 4-1 (or the memory card 4-2) on which the image file is recorded is demounted from the DSC 2 (or the DSC 3) by a user, and mounted on the drive 212 of the PC 1.

Figure 17:
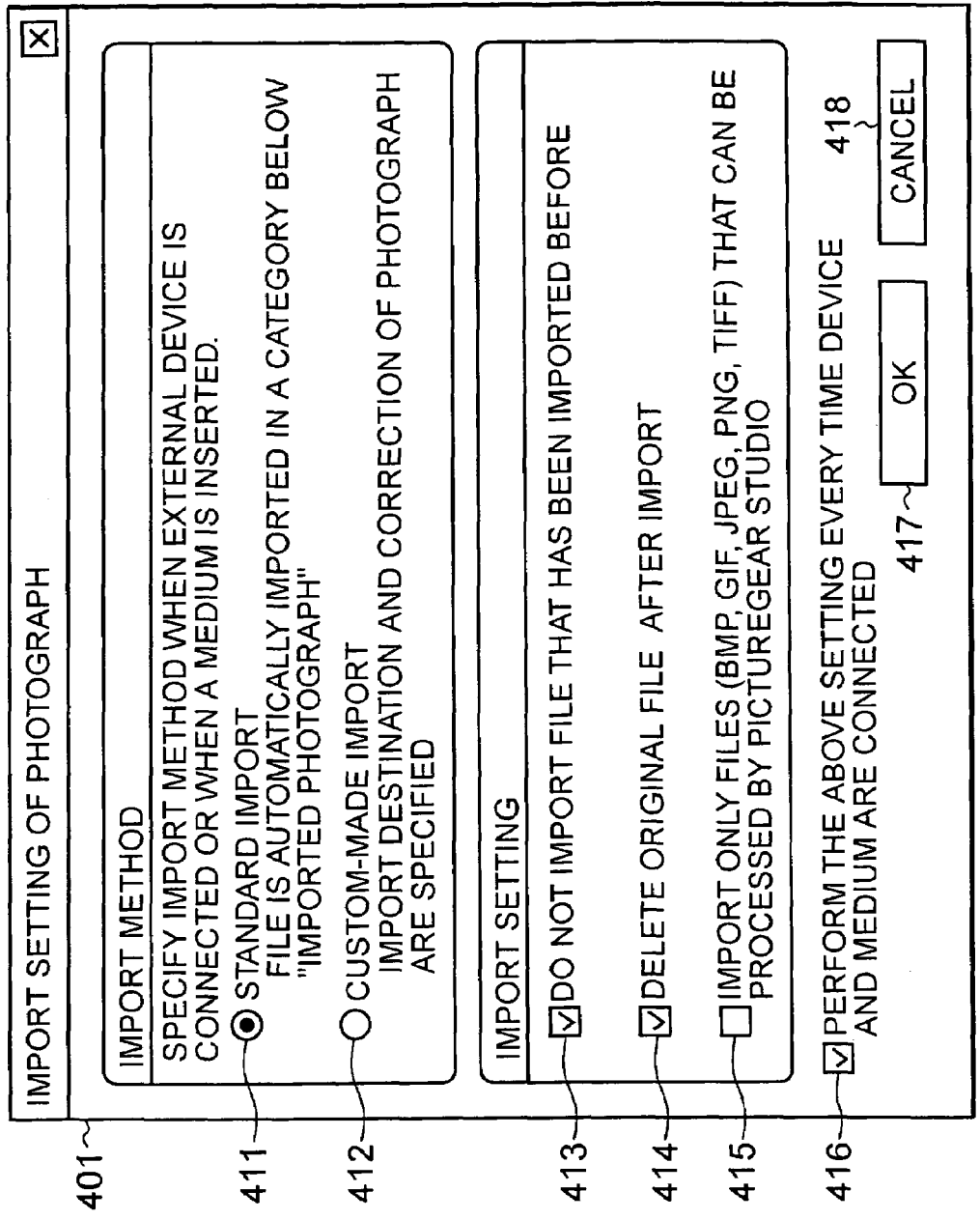
FIG. 17 is a view showing a display example of a display unit.

Here, before the import of the image data recorded on the memory card 4 into the PC 1, the user can previously set a process related to the import of the image file. FIG. 17 shows an import setting window 401 in which setting items related to the import of an image file are displayed.

In the import setting window 401 of FIG. 17, selection sections 411 and 412 for available import methods are displayed. The user can select one of the selection sections 411 and 412 with the mouse 206 or the like.

Moreover, in the import setting window 401, checking sections 413, 414 and 415 are displayed. If the user operates the mouse 206 or the like to check the checking section 413, the user can adopt the setting of not-importing a duplicated image file which has been once imported from the memory card 4. Moreover, if the user operates the mouse 206 or the like to check the checking section 414, the user can adopt the setting of deleting an image file recorded on the memory card 4 after the image file has been imported from the memory card 4. Moreover, if the user operates the mouse 206 or the like to check the checking section 415, the user can adopt the setting of importing only the image files that can be processed by an application program from the memory card 4.

Moreover, in the import setting window 401, the checking section 416 is also displayed. If the user operates the mouse 206 or the like to check the checking section 416, the user can adopt the setting of displaying the import setting window 401 ever mounting of the memory card 4 on the drive 212 of the PC 1.

Moreover, in the import setting window 401, an OK button 417 and a cancel button 418 are also displayed. If the user operates the mouse 206 or the like to select the OK button 417, the inputting setting into the import setting window 401 is settled. Moreover, if the user operates the mouse 206 or the like to select the cancel button 418, the inputting setting into the import setting window 401 is cancelled.

If the checking sections 413 and 414 shown in FIG. 17 are checked, the operation shown in FIGS. 8 and 14 is executed.

Figure 18:
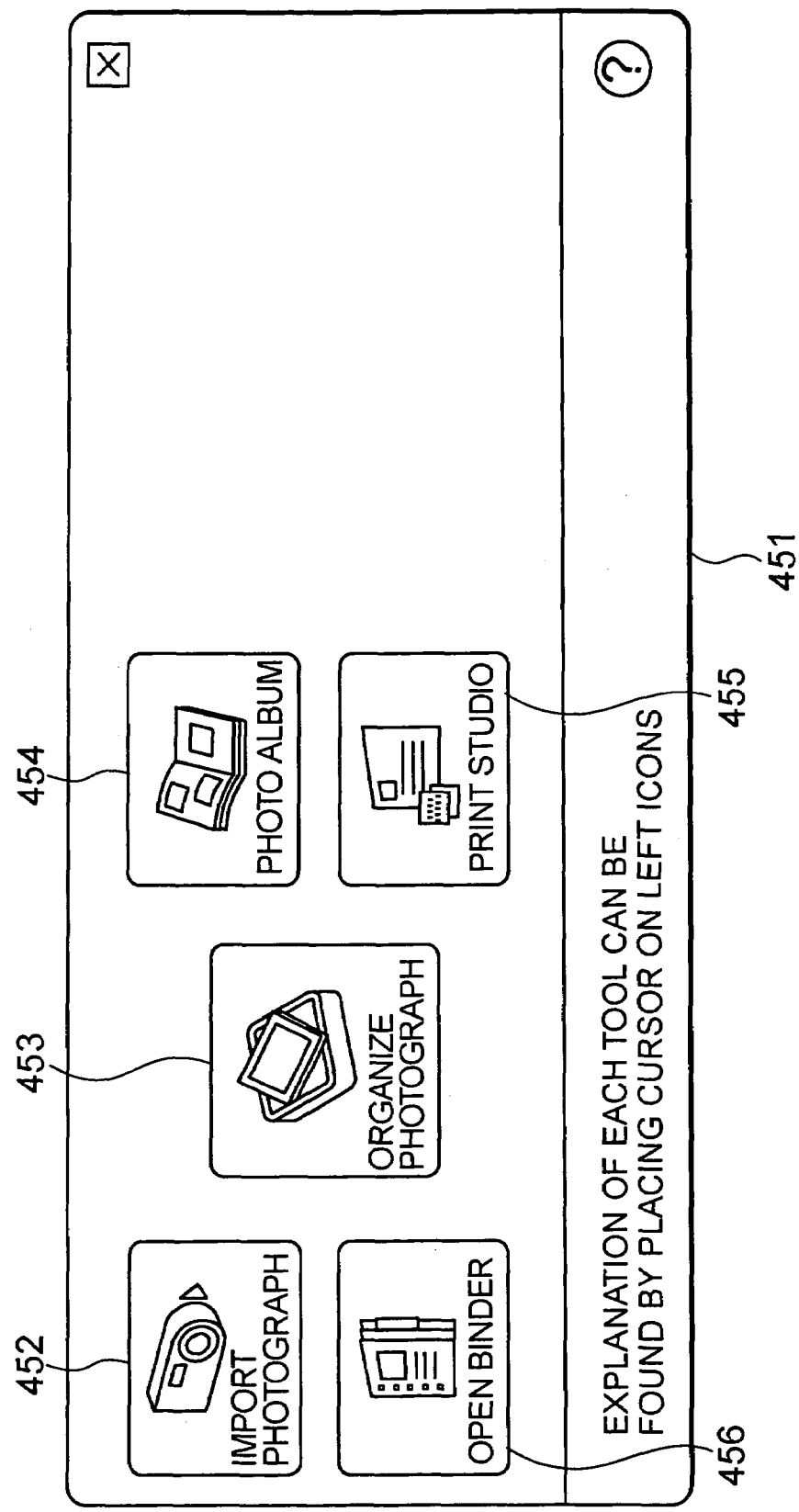
FIG. 18 is another view showing the display example of a display unit.

Next, FIG. 18 shows an example of an entrance window 451, which is first displayed at the time of the activation of an application program.

In the entrance window 451, icons 452 to 456 are displayed. The user can select a desired icon among the icons 452 to 456 by operating the mouse 206 or the like. If an icon is selected, a process corresponding to the selected icon is executed.

If an icon 452 is selected, the PC 1 executes the import of image files recorded on the memory card 4 into the PC 1. If an icon 453 is selected, the PC 1 executes a process of organizing the image files imported from the memory card 4 or the like by classifying the image files into various categories. If an icon 454 is selected, the PC 1 displays an album-like screen in which the image files are appeared to be pasted in a booklet. If an icon 455 is selected, the PC 1 executes a process related to the printing of an image. If an icon 456 is selected, the PC 1 executes a process of editing images and text data by disposing the images and the text data at positions which the user desires.

Next, an import process of the PC 1, namely the process of importing the image files recorded on the memory card 4 into the PC 1, is described with reference to the flowcharts of FIGS. 19 to 21.

Figure 19:
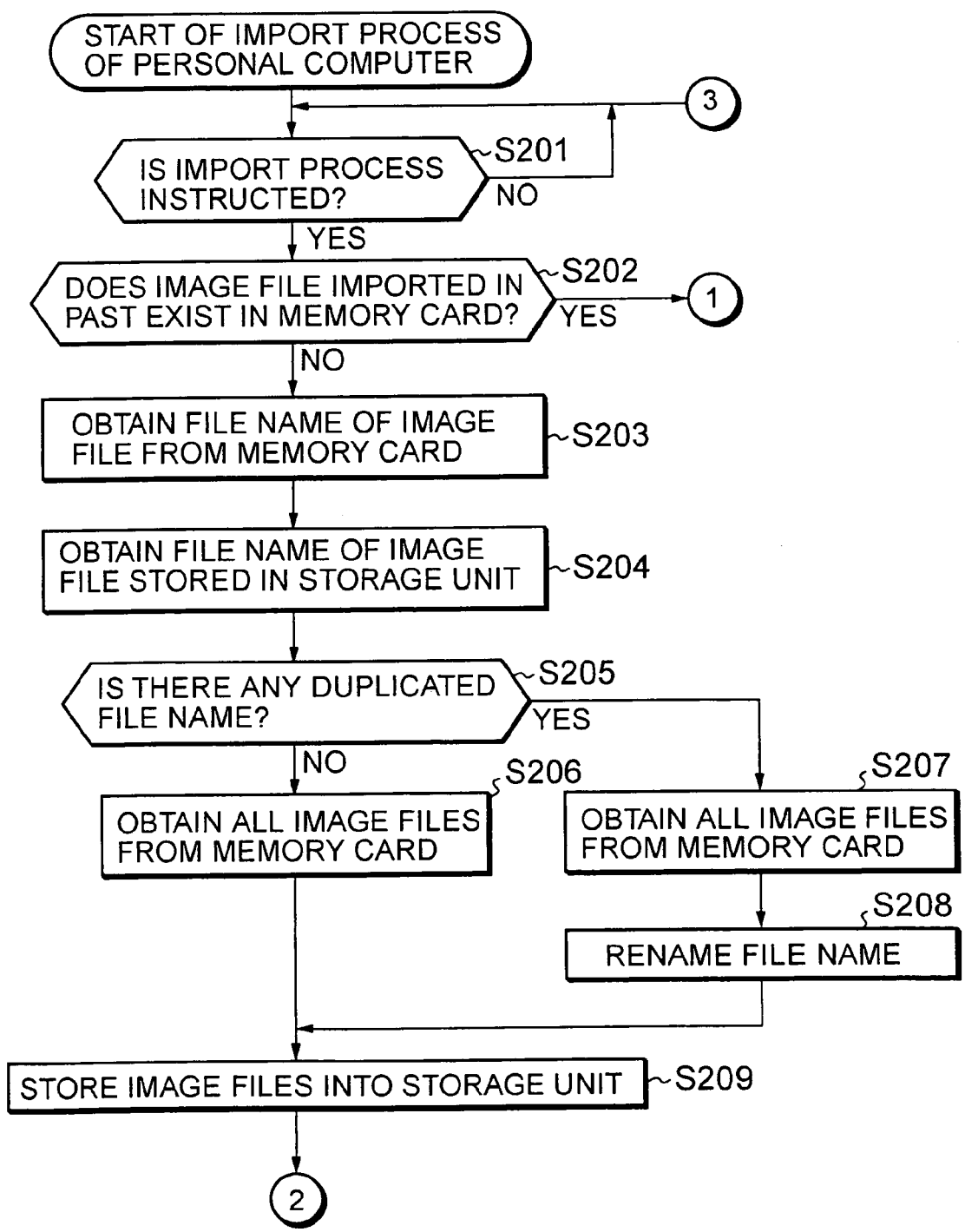
FIG. 19 is a flowchart for illustrating import process of a personal computer.

At a step S201 of FIG. 19, the history judgment unit 261 judges whether an instruction of the import of image files is input or not based on an operation signal from the operation unit 251, and waits until the instruction of the import of the image files is input. Then, if the icon 452 of FIG. 18 is selected, the history judgment unit 261 judges that the instruction of the import of the image files is input, and the process proceeds to a step S202.

At the step S202, the history judgment unit 261 retrieves the record contents of the memory card 4 through the drive 212. Then, the history judgment unit 261 judges whether a history file is recorded on the memory card 4 or not. Accordingly, the history judgment unit 261 judges whether any image file which has been imported in the past exists on the memory card 4 or not.

That is, in the case where image files which have been imported have not been deleted from the memory card 4 if the image files have been imported from the memory card 4, a history file indicating the completion of import is generated by the file generation unit 268 to be recorded on the memory card 4 (the process of a step S226, which will be described later). Consequently, if a history file exists on the memory card 4, the facts indicates that the image files which have been imported in the past are also recorded on the memory card 4. Consequently, it can be judged whether the image files recorded on the memory card 4 are the image files which has been already imported or not based on the presence of the history file.

Accordingly, at the step S202, the history judgment unit 261 judges whether the history file is recorded on the memory card 4 or not. If no history file is recorded on the memory card 4, the history judgement unit 261 judges that no image files which have been imported in the past exist on the memory card 4 (all image files recorded on the memory card 4 are new ones), and the history judgement unit 261 informs the duplication judgment unit 262 of the judgement result. After that, the process proceeds to a step S203. Since all of the access actions (such as retrieval, import and writing) to the memory card 4 are performed through the drive 212, the description indicating the operation of the drive 212 will be omitted in the following.

At the step S203, the duplication judgment unit 262 obtains the file names of all of the image files recorded on the memory card 4.

At a step S204, the duplication judgment unit 262 obtains the file names of all of the image files stored in the storage unit 210.

At a step S205, the duplication judgment unit 262 judges whether or not the same file names as those of the image files stored in the storage unit 210, which file names have been obtained at the step S204 exist among the file names of the image files recorded on the memory card 4, which file names have been obtained at the step S203. If the same file names as those of the image files stored in the storage unit 210 do not exist among the file names of the image files recorded on the memory card 4, the duplication judgment unit 262 informs the import unit 263 of the judgement result (indicating the nonexistence of the image files having the same names), and the process proceeds to a step S206.

At the step S206, the import unit 263 imports all of the image files recorded on the memory card 4. After the completion of the import of the image files, the import unit 263 informs the display control unit 265 of the completion of the import. After that, the process proceeds to a step S209.

At the step S205, if the duplication judgment unit 262 judges that the same file names as those of the image files stored in the storage unit 210 exist among the file names of the image files recorded on the memory card 4, the duplication judgment unit 262 informs the import unit 263 of the judgement result (indicating the existence of the image files having the same names), and the process proceeds to a step S207.

At the step S207, the import unit 263 imports all of the image files recorded on the memory card 4, and supplies the imported image files to the file name creation unit 264. After the completion of the import of the image files, the import unit 263 informs the display control unit 265 of the completion of the import. After that, the process proceeds to a step S208.

At the step S208, the file name creation unit 264 changes the file names of all of the files imported at the step S207 in order not to duplicate with the file names of the image files stored in the storage unit 210 (see, for example, FIG. 11). After that, the process proceeds to the step S209.

At the step S209, the import unit 263 (or the file name creation unit 264) supplies the image files to the storage unit 210 to store them therein. After that, the process proceeds to a step S222 of FIG. 21.

Returning to the step S202, if the history judgment unit 261 judges that the history file is recorded on the memory card 4, the history judgment unit 261 judges that the image files which have been imported in the past exist on the memory card 4, and informs the duplication judgment unit 262 of the judgement result (indicating the existence of the history file). After that, the process proceeds to a step S210 of FIG. 20.

At the step S210, the duplication judgment unit 262 obtains the file names, the photograph dates and time, and the file sizes of all of the image files recorded on the memory card 4.

At a step S211, the duplication judgment unit 262 obtains the file names, the photograph dates and time, and the file sizes of all of the image files stored in the storage unit 210.

At a step S212, the duplication judgment unit 262 judges whether or not the same file names as those of the image files stored in the storage unit 210, which file names have been obtained at the step S211, exist among the file names of the image files recorded on the memory card 4, which file names have been obtained at the step S210. If the same file names as those of the image files stored in the storage unit 210 do not exist among the file names of the image files recorded on the memory card 4, the duplication judgment unit 262 informs the import unit 263 of the judgement result (indicating the nonexistence of the image files having the same names), and the process proceeds to a step S213.

At the step S213, the import unit 263 imports all of the image files recorded on the memory card 4. After the completion of the import of the image files, the import unit 263 informs the display control unit 265 of the completion of the import. After that, the process proceeds to a step S221.

At the step S212, if the duplication judgment unit 262 judges that the same file names as those of the image files stored in the storage unit 210 exist among the file names of the image files recorded on the memory card 4, the process proceeds to a step S214.

At the step S214, the duplication judgment unit 262 judges whether or not the same files as the image files stored in the storage unit 210 exist among the image files recorded on the memory card 4 by comparing the photograph dates and time, and file sizes of the image files judged to have the same file names. That is, the same image files can be considered to have the file names, the photograph dates and time, and the file sizes all of which are mutually the same. Consequently, by comparing the photograph dates and time, and file sizes of the image files recorded on the memory card 4 and the image files stored in the storage unit 210, it is possible to judge whether or not the same files as the image files stored in the storage unit 210 exist among the image files recorded on the memory card 4. Then, at the step S214, if the duplication judgment unit 262 judges that the same files as the image files stored in the storage unit 210 do not exist among the image files recorded on the memory card 4, the duplication judgment unit 269 informs the import unit 263 of the judgement result. Then, the process proceeds to a step S215.

At the step S215, the import unit 263 imports all of the image files recorded on the memory card 4, and supplies the imported image files to the file name creation unit 264. After the completion of the import of the image files, the import unit 263 informs the display control unit 265 of the completion of the import.

At a step S216, the file name creation unit 264 changes the file names of all of the files imported at the step S215 in order not to duplicate with the file names of the image files stored in the storage unit 210. After that, the process proceeds to the step S221.

At the step S214, if the duplication judgment unit 262 judges that the same files as the image files stored in the storage unit 210 exist among the image files recorded on the memory card 4, the process proceeds to a step S217.

At the step S217, the duplication judgment unit 262 judges whether or not there is any duplication of the file names of the image files that are different from each other. That is, if the same image files as those stored in the storage unit 210 exist among the image files recorded on the memory card 4, the PC 1 does not import the same image files, but imports only the image files that are not the same from the memory card 4 (see, for example, FIG. 14). At this time, if there are the image files having the same names as those of the image files stored in the storage unit 210 among the image files imported from the memory card 4, it is necessary to change the file names of the image files to be imported from memory card 4. Accordingly, at the step S217, the duplication judgment unit 262 judges whether or not there is the duplication of the file names among the image files that are not the same. If there is no duplication of the file names, the duplication judgment unit 262 informs the import unit 263 of the judgement result, and the process proceeds to a step S218.

At the step S218, the import unit 263 imports only the image files the same ones as which are not stored in the storage unit 210 among the image files recorded on the memory card 4. After that, the process proceeds to the step S221.

At the step S217, if the duplication judgment unit 262 judges that the duplication of the file names exists among the image files that are not the same, the duplication judgment unit 262 informs the import unit 263 of the judgement result, and the process proceeds to a step S219.

At the step S219, the import unit 263 imports only the image files the same ones as which are stored in the storage unit 210 among the image files recorded on the memory card 4, and supplies the imported image files to the file name creation unit 264. After the completion of the import of the image files, the import unit 263 informs the display control unit 265 of the completion of the import.

At a step S220, the file name creation unit 264 changes the file names of all of the files imported at the step S219 in order not to duplicate with the file names of the image files stored in the storage unit 210. After that, the process proceeds to the step S221.

At the step S221, the import unit 263 (or the file name creation unit 264) supplies the image files to the storage unit 210 to make the storage unit 210 store the image files. After that, the process proceeds to the step S222 of FIG. 21.

Figure 21:
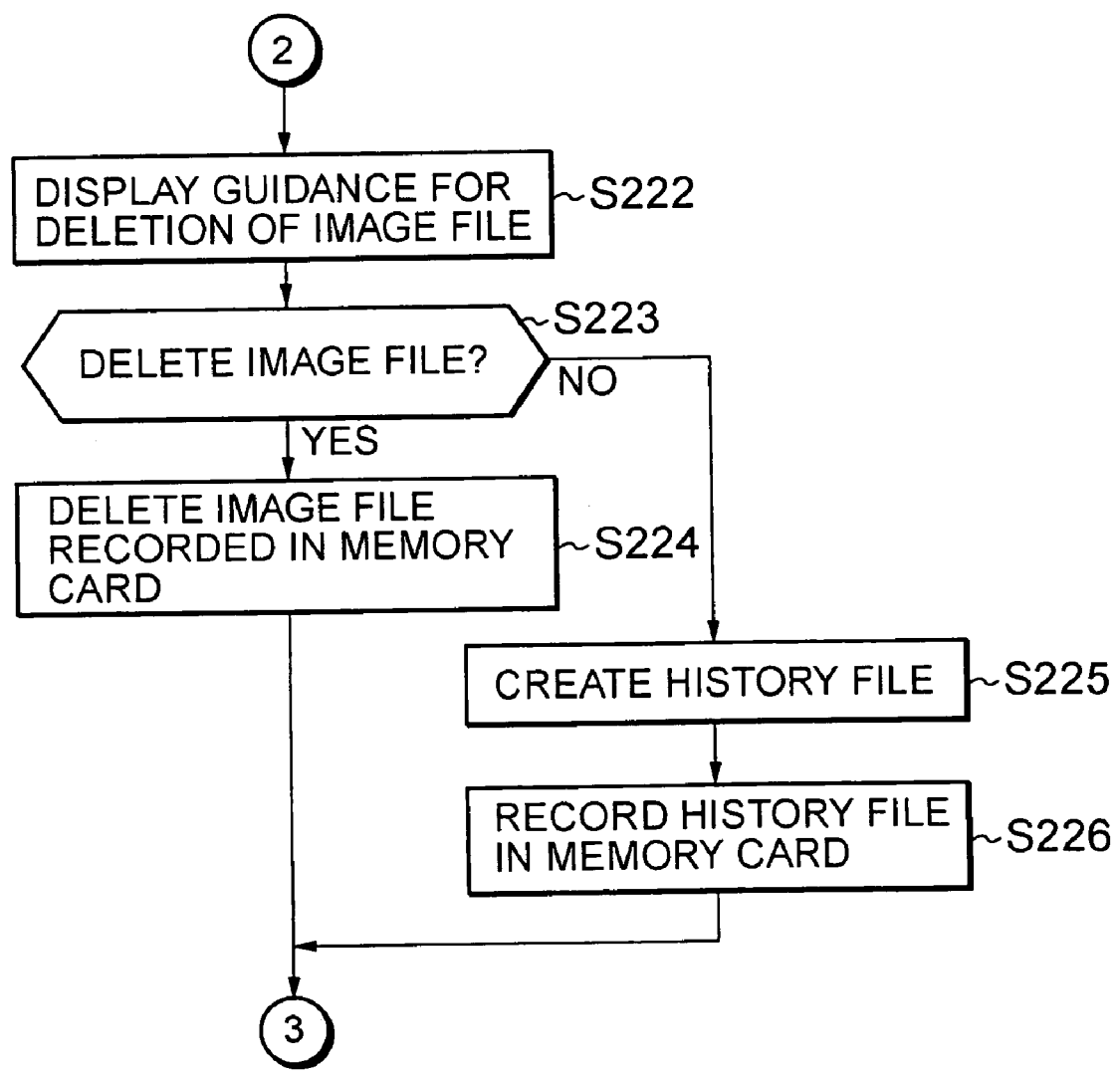
FIG. 21 is a flowchart continued from FIG. 20 for illustrating the import process of a personal computer.

At the step S222 of FIG. 21, the display control unit 265 receives the information of the completion of the import from the import unit 263, and then makes the display unit 208 display the guidance screen 311 shown in FIG. 8.

At a step S223, the post-import process judgment unit 266 judges whether the instruction of the deletion of the image files recorded on the memory card 4 is input (the selection of the OK button 312 in FIG. 8), or whether the instruction of leaving the image files recorded on the memory card 4 without deleting them (the selection of the cancel button 313 of FIG. 8) is input, based on the operation signal from the operation unit 251. If the instruction of the deletion of the image files recorded on the memory card 4 is input, the post-import process judgment unit 266 commands the image deletion unit 267 to delete the image files recorded on the memory card 4. After that, the process proceeds to a step S224.

At the step S224, the image deletion unit 267 collectively deletes all of the image files recorded on the memory card 4. After that, the process returns to the step S201 of FIG. 19, and the above-mentioned processes on and after the step S201 are repeatedly executed.

At the step S223, if the post-import process judgment unit 266 judges that the instruction of leaving the image files recorded on the memory card 4 without deleting them is input, the post-import process judgment unit 266 commands the file generation unit 268 to record a history file on the memory card 4. After that, the process proceeds to a step S225.

At the step S225, the file generation unit 268 creates the history file indicating the import of the image files. At the step S226, the file generation unit 268 records the created history file on the memory card 4. After that, the process returns to the step S201 of FIG. 19, and the above-mentioned processes on and after the step S201 are repeatedly executed.

In the way described above, the import process is executed.

According to the import process described above, because the image files recorded on the memory card 4 are collectively deleted after the import of the image files recorded on the memory card 4 into the PC 1, convenience is further improved. Moreover, it is also possible to leave the image files recorded on the memory card 4 thereon without deleting them after the import of the image files recorded on the memory card 4 into the PC 1. In this case, the history file indicating the completion of the import of the image files recorded on the memory card 4 is recorded on the memory card 4. Accordingly, if the memory card 4 is mounted on the PC 1 next time, it can be easily judged whether any image files which have been imported already exist on the memory card 4 or not.

Moreover, according to the above-mentioned import process, if the names of the image files to be imported from the memory card 4 are the same names as those of the image files which have been already stored in the PC 1, the image files to be imported from the memory card 4 are stored into the PC 1 after their file names have been changed in order not to duplicate with the file names of the originally stored image files in the PC 1. Consequently, it can be prevented that the image files stored in the PC 1 are erroneously deleted.

Moreover, according to the above-mentioned import process, if an image file which has already been imported to the PC 1 exists among the image files recorded on the memory card 4, the image file is not imported into the PC 1, and only the image files which do not exist in the PC 1 are imported from the memory card 4. Consequently, it becomes possible to prevent the duplication of files in the PC 1.

In the above-described import process, the case where the image files recorded on the memory card 4 are imported into the PC 1 is exemplified to be described. However, this case is only one example. The present invention can be applied to, for example, the case where the DSC 2 and the PC 1 are connected to each other with a cable through the connector 113 and the image files are transferred from the DSC 2 to the PC 1 through the cable. Moreover, the present invention can be also applied to recording media other than the memory card 4 (such as an optical disk, a magnetic disc and an magneto-optical disk). Moreover, it is needless to say that the present invention can be also applied to information processing apparatus other than the personal computer (such as electrical devices including a portable terminal apparatus, game machine and the like).

The image files imported into the PC 1 through the above-mentioned import process are managed by a file system such as File Allocation Tables (FAT), New Technology File System (NTFS) and Hierarchical File System (HFS).

Figure 22:
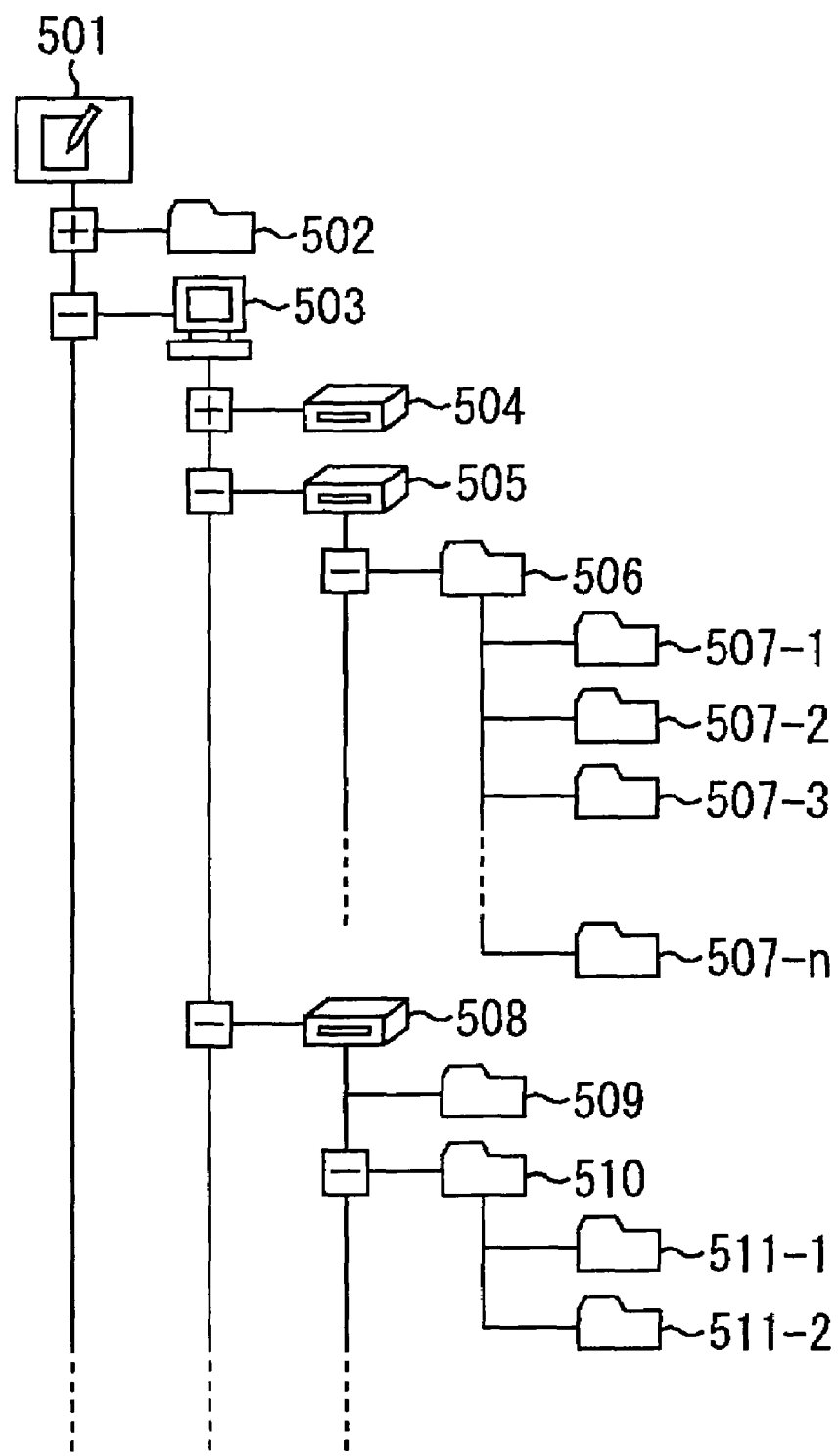
FIG. 22 is a view for illustrating a hierarchical directory structure for storing image files.

In these file system, the image files recorded in the storage unit 210 are managed in a hierarchical directory structure as shown in, for example, FIG. 22.

In FIG. 22, in the low orders of a desk top 501, subdirectories such as my document 502 and my computer 503 exist. In the low orders of my computer 503, subdirectories such as a 3.5-inch FD (A:) 504, a local disk (C:) 505 and a local disk (D:) 508 exist. In the low orders of the local disk (C:) 505, subdirectories such as my picture 506 exist. In the low orders of my picture 506, subdirectories such as pictures 507-1 to 507-n exist.

Figure 23:
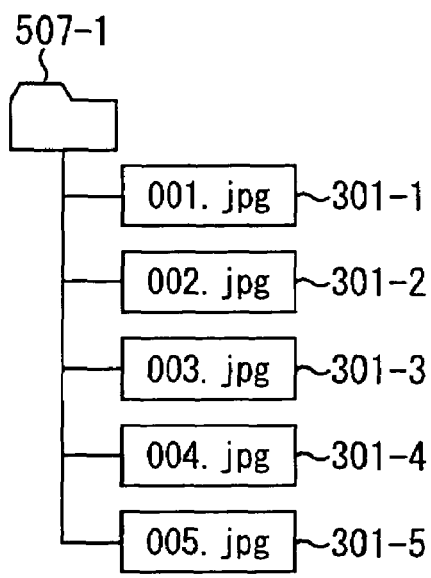
FIG. 23 is another view for illustrating a hierarchical directory structure for storing image files.

FIG. 23 shows a configuration example of the image files stored in a picture folder 507-1. In FIG. 23, the picture folder 507-1 stores the image files 301-1 to 301-5 therein.

Figure 24:
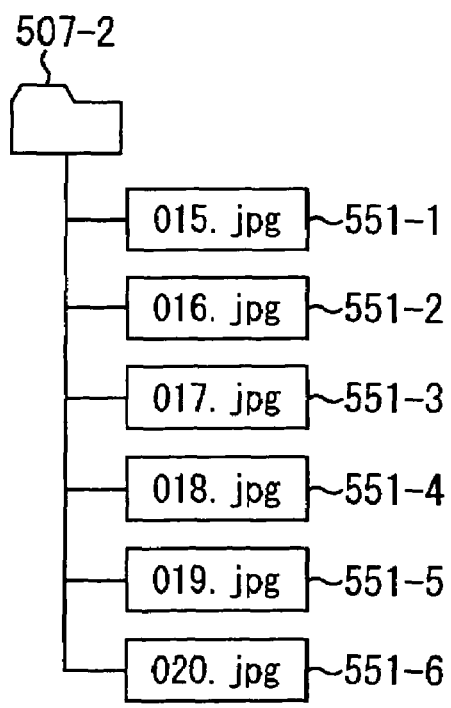
FIG. 24 is a further other view for illustrating a hierarchical directory structure for storing image files.

FIG. 24 shows a configuration example of the image files stored in a picture folder 507-2. In FIG. 24, the picture folder 507-2 stores image files 551-1 to 551-6 therein. The file name of the image file 551-1 is "015.jpg"; the file name of the image file 551-2 is "016.jpg"; the file name of the image file 551-3 is "017.jpg"; the file name of the image file 551-4 is "018.jpg"; the file name of the image file 551-5 is "019.jpg"; the file name of the image file 551-6 is "020.jpg".

Returning to FIG. 22, in the low orders of the local disk (D:) 508, subdirectories such as a picture 509 and a digital camera 510 exist. In the low orders of the digital camera 510, subdirectories such as picture folders 511-1 and 511-2 exist.

Figure 25:
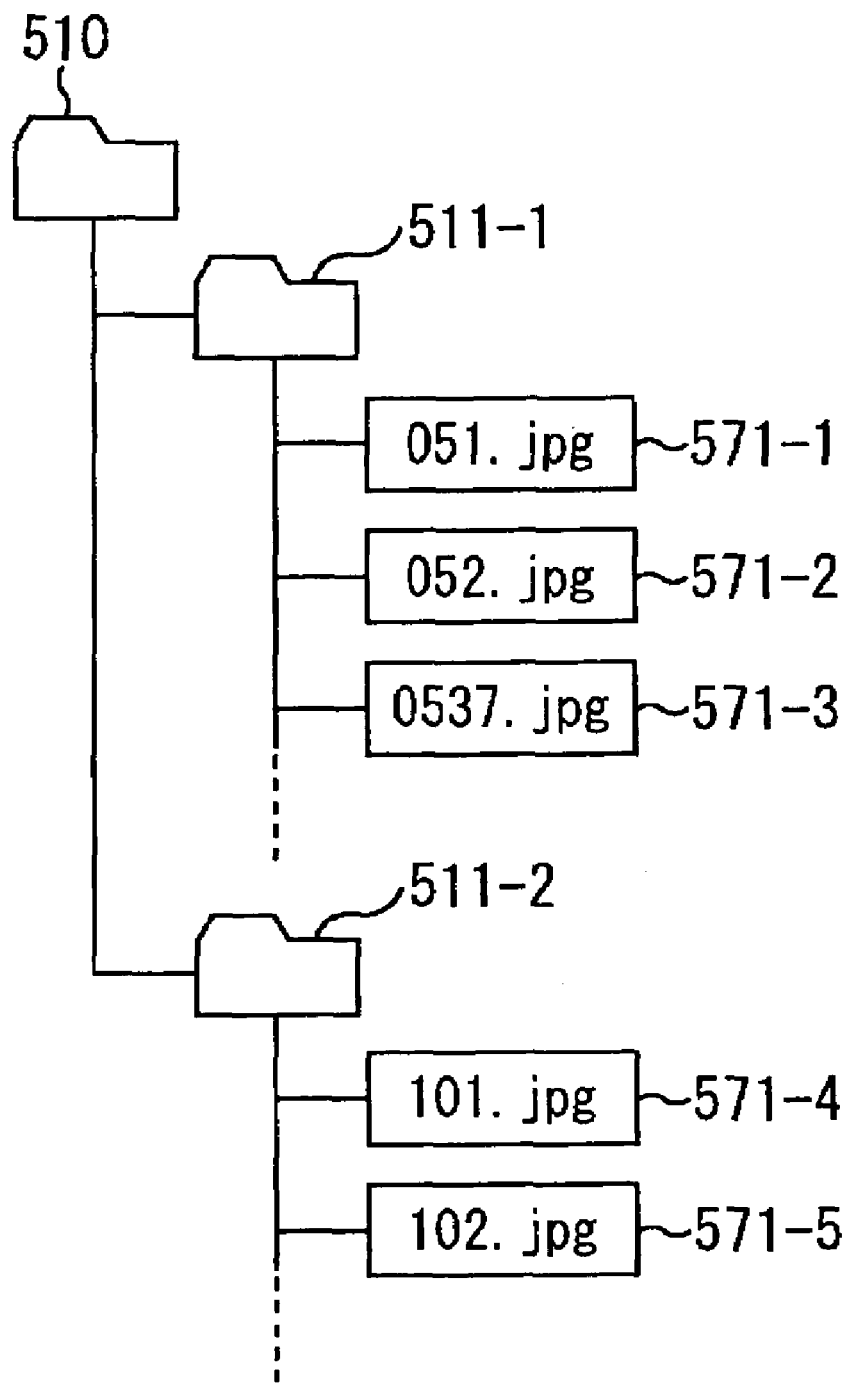
FIG. 25 is a view for illustrating a hierarchical directory structure for storing image files.

FIG. 25 shows a configuration example of the image files saved in the low order directories of the digital camera 510. In FIG. 25, the picture folder 511-1 stores image files 571-1 to 571-3 therein. The file name of the image file 571-1 is "051.jpg"; the filename of the image file 571-2 is "052.jpg"; the file name of the image file 571-3 is "053.jpg". Moreover, in FIG. 25, the picture folder 511-2 stores image files 571-4 and 571-5 therein. The file name of the image file 571-4 is "101.jpg"; the file name of the image file 571-5 is "102.jpg".

As shown in FIGS. 22 to 25, in the case where image files are stored into a plurality of different hierarchical directories (folders), a user cannot browse those image files without specifying their respective directories in the time of browsing the image files.

That is, for example, in case of browsing the image files 301-1 to 301-5 stored in the picture folder 507-1 and the image files 571-4 and 571-5 stored in the picture folder 511-2, the user should trace the directories storing the respective image files severally to find out the desired image files and should perform the clicks of the icons of the found image files with the mouse to display the images.

Consequently, if image files are distributed to be stored in many different hierarchical directories, the user cannot remember all of the directories in which the image files are stored. Consequently, there is a drawback in which the user takes a very long time for finding out an aimed image file.

Moreover, it has been conventionally performed to classify a plurality of image files into several categories (such as "fishing", an "excursion" and a "father"), and to create a folder (directory) to each of the categories for storing the image files in the folders. In such a case, there is the case where one image file can be classified into a plurality of categories. For example, an image of performing fishing with the father can be classified into both of the "fishing" category and the "father" category. In this case, conventionally, the image file is copied to create the same image file one more, and the image files are severally stored into the respective folders ("fishing" and "father"). Consequently, there is a drawback of the duplication of the image files.

Accordingly, for resolving or alleviating such a drawback, the PC 1, to which the present embodiment is applied, in parallel with the file management by means of the hierarchical directory structure, it is supposed that all of the image files exist in the same hierarchy, and the user is requested to classify the image files into every category in the same hierarchy. In such a way, the same hierarchy is virtually set, and the plurality of image files is managed in the hierarchy. Accordingly, the user can easily arrange the plurality of image files.

In the following, the file management different from the directory structure is described with reference to FIGS. 26 to 34.

Figure 26:
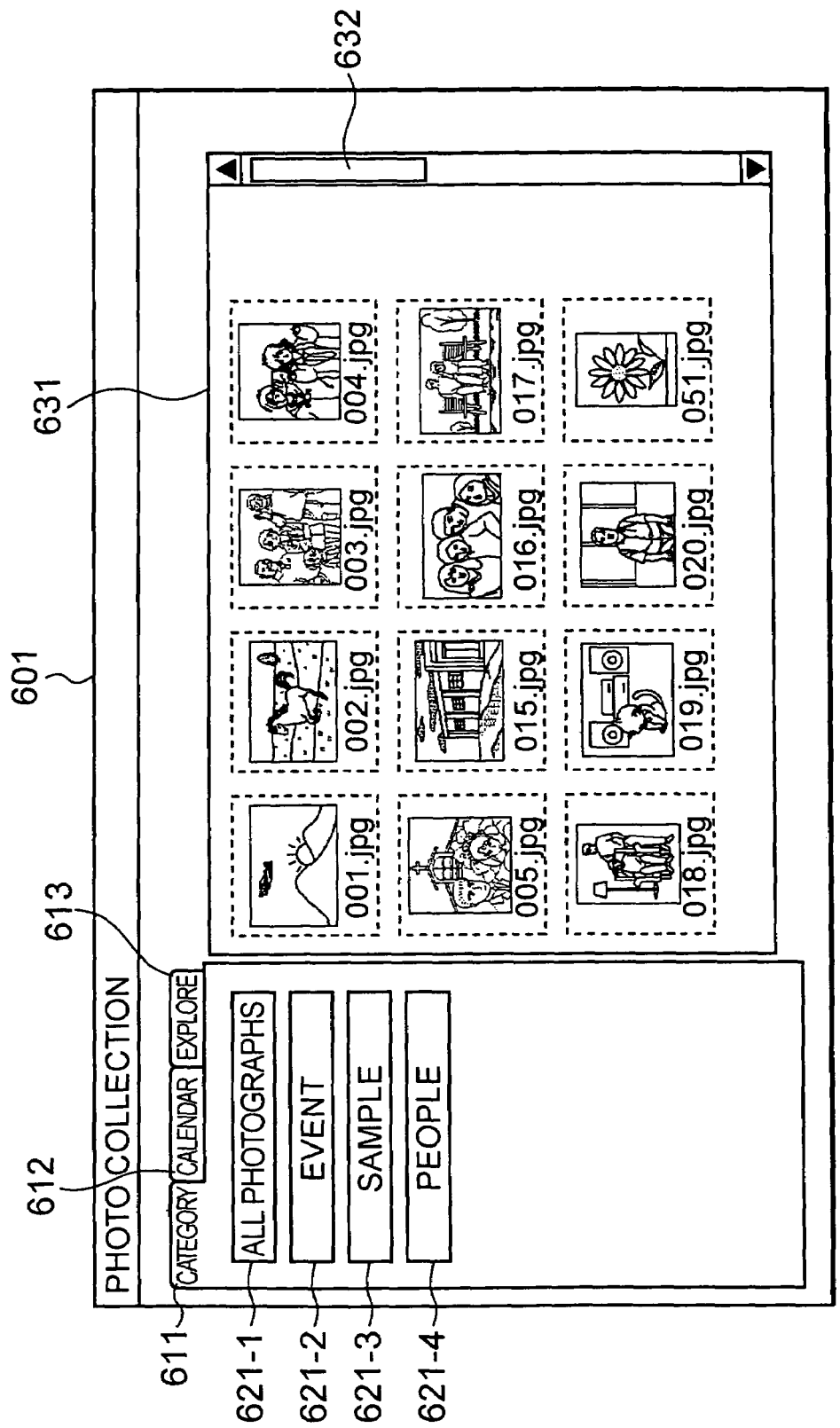
FIG. 26 is a view showing a display example of a photo collection window.

FIG. 26 shows an example of a window to be display on the display unit 208.

On the upper left side of a photo collection window 601 shown in FIG. 26, a category tab 611, a calendar tab 612 and an explorer tab 613 are displayed. The user can select these tabs by operating the mouse 206 or the like.

FIG. 26 shows a display example in the state in which the category tab 611 is selected. Below the category tab 611, category buttons 621-1 to 621-4 are displayed.

The user can select a desired category button among the category buttons 621-1 to 621-4 by operating the mouse 206 or the like. If the user selects the category button 621-1 "all photographs", all images managed by the PC 1 are displayed in a list form in the image display area 631 on the right side of the photo collection window 601. FIG. 26 shows a display example in the sate in which all of the images managed by the PC 1 are displayed in the list.

On the right end of the image display area 631, a scroll bar 632 is displayed. The images which cannot be displayed in the image display area 631 at one time can be displayed by performing scrolling with the scroll bar 632 in the up and down directions.

The category buttons 621-2 to 621-4 correspond to the categories created by the user for classifying the image files. That is, the user can make the PC 1 generate new categories by operating the mouse 206 and the keyboard 207. In the example of FIG. 26, the three categories of "event", "sample" and "people" are generated as the categories. The user can classify the image files into the generated categories.

Figure 27:
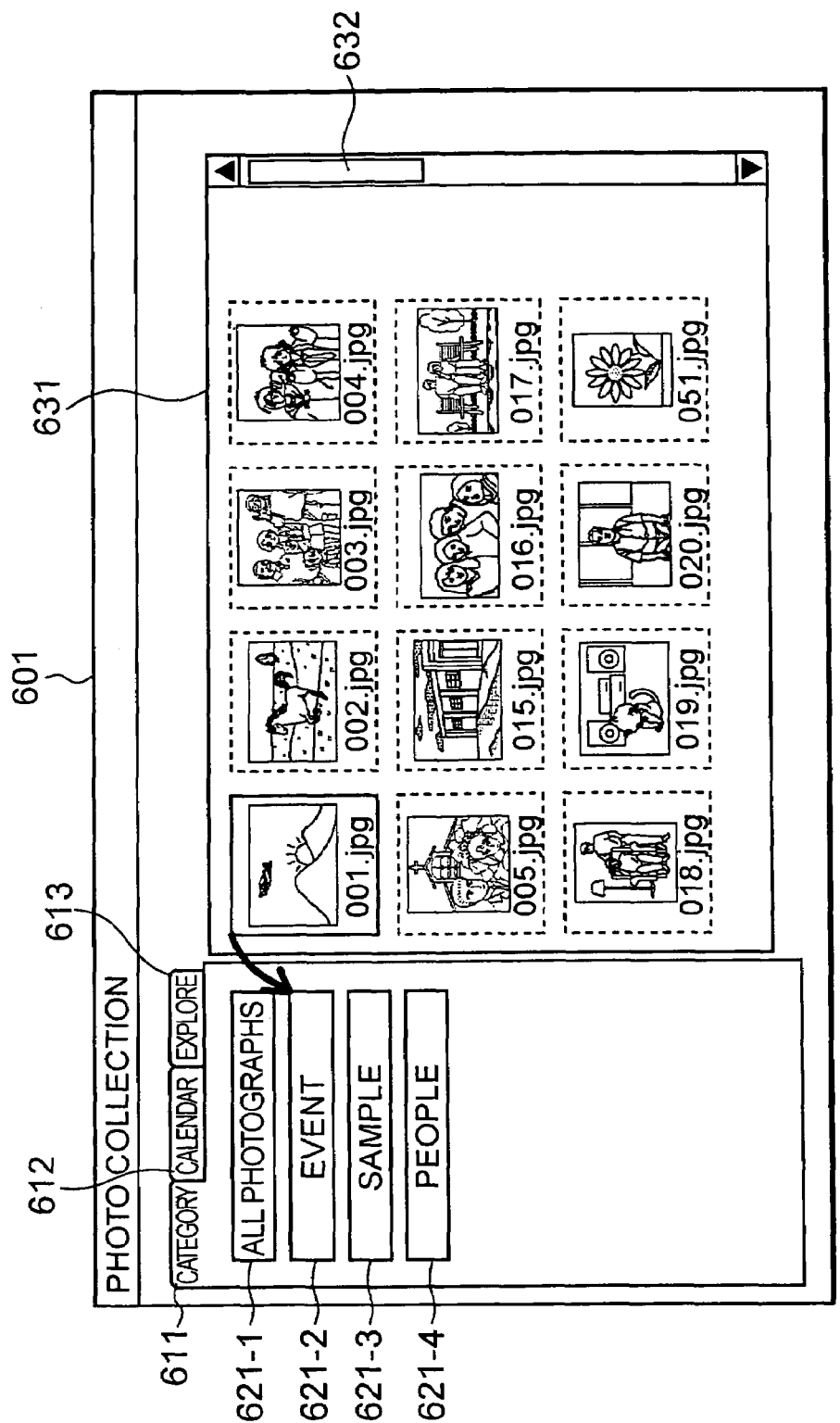
FIG. 27 is another view showing a display example of a photo collection window.

FIG. 27 is a view for illustrating the operation of classifying the image files into the categories. For example, in the case where an image file "001.jpg" on the upper left end of the image display area 631 is classified into the "event" category, the user operates the mouse 206 to perform a drag-and-drop operation of the image file "001.jpg" on the category button 621-2 "event", as shown in FIG. 27. By the operation, the image file "001.jpg" is classified into the "event" category. The image file "001.jpg" is continuously displayed in the image display area 631 without disappearing therefrom after the drag-and-drop operation of the image file "001.jpg" onto the category button 621-2 "event" has been performed.

The other image files can be classified into desired categories by operates similar to the above-mentioned one. That is, if a certain image file is wanted to be classified into a certain category, the user operates the mouse 206 to perform the drag-and-drop operation of the image file onto the desired category button. Accordingly, the image file is classified into the category corresponding to the category button to which the drag-and-drop operation has been performed.

It is also possible to classify one image file into a plurality of categories. For example, it is possible to classify the image file "001.jpg", which has been already classified into the "event" category, into the "sample" category furthermore. In this case, the user can classify the image file "001.jpg" into the "sample" category by performing the operation similar to the above-mentioned way, namely by performing the drag-and-drop operation of the image file "001.jpg" onto the category button 621-3 "sample".

In such a way, the image files which have been classified into the categories can be displayed every category in a list form. For example, if the mouse 206 or the like is operated to select the category button 621-2, the PC 1 displays the images classified into the "event" category in the image display area 631 as a list form. Moreover, for example, if the mouse 206 or the like is operated to select the category button 621-3, the PC 1 displays the images which have been classified into the "sample" category in the image display area 631 as a list form. Moreover, for example, if the mouse 206 or the like is operated to select the category button 621-4, the PC 1 displays the images which have been classified into the "people" category in the image display area 631 as a list form.

For example, as described above, if one image file "001.jpg" is classified into the "event" category and the "sample" category, the image file "001.jpg" is displayed in both of the "event" table and the "sample" table. That is, if one image file is classified into a plurality of categories, the image file is displayed in any of the lists of all of the categories in which the image file is classified.

Figure 28:
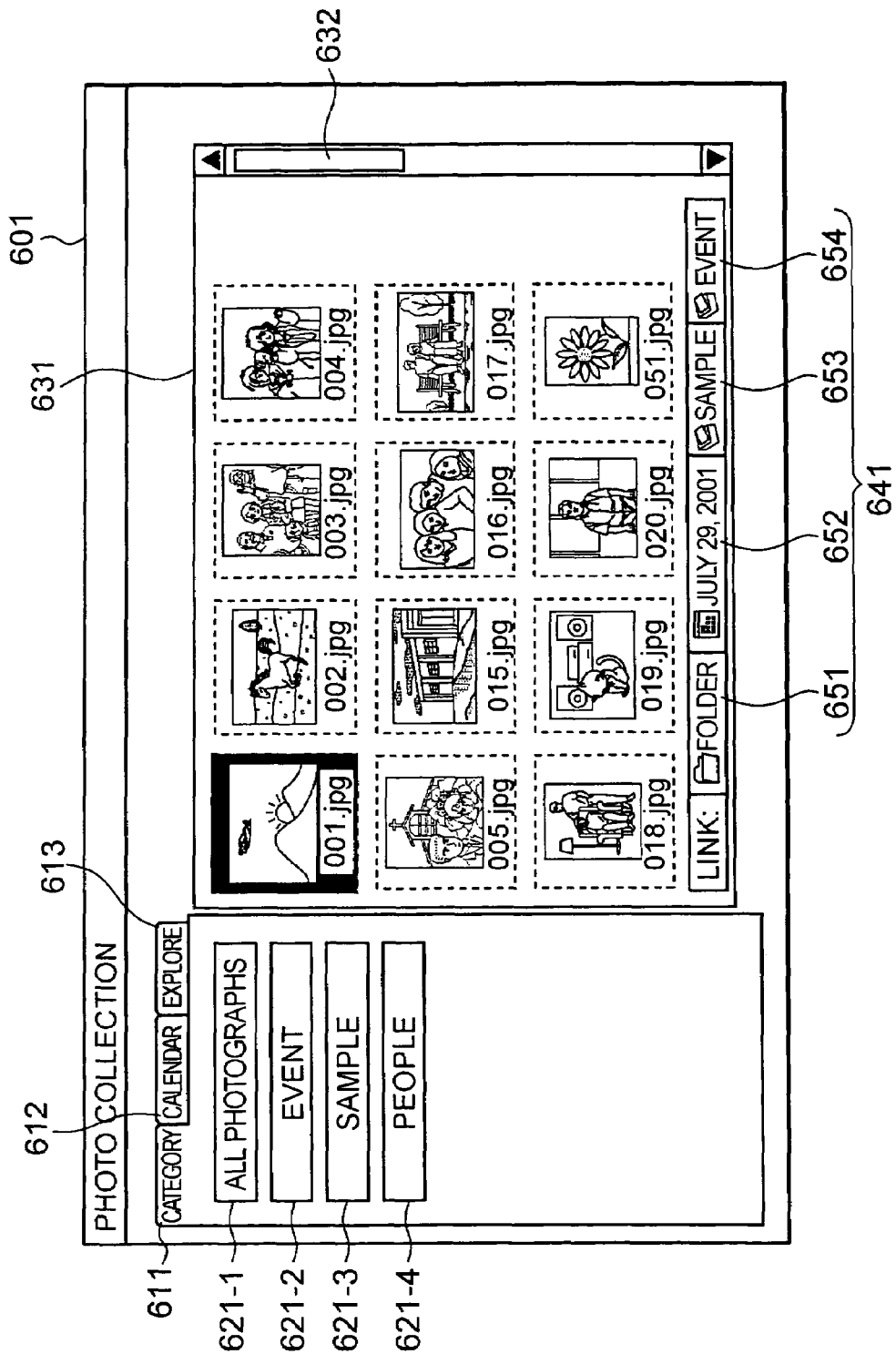
FIG. 28 is a further other view showing a display example of a photo collection window.

The user can select a desired image file by operating the mouse 206 to move the pointer on the desired image file among the image files displayed in the image display area 631, and by clicking the mouse thereat. If a image file is selected by the user, the background color in the nearest region of the selected image file is changed as shown in FIG. 28. FIG. 28 shows an example of the case where the image file "001.jpg" at the right upper end in the image display area 631 is selected. Moreover, if one image file has been selected, a link bar 641 is displayed below the image display area 631.

In FIG. 28, the link bar 641 includes an explorer bar 651, a calendar bar 652, and category bars 653 and 654. The user can select a desired bar by operating the mouse 206 or the like among the explorer bar 651, the calendar bar 652, and the category bars 653 and 654. If a bar is selected, the PC 1 switches the display of the photo collection window 601 correspondingly to the selected bar.

If the explorer bar 651 is selected, the PC 1 displays the directory in which the image file "001.jpg" is stored. If the calendar bar 652 is selected, the PC 1 displays the list of the image files including the images photographed on the same photograph day as that of the image file "001.jpg". If the category bar 653 is selected, the PC 1 displays the list of the image files classified into the "sample" category. If the category bar 654 is selected, the PC 1 displays the list of the image files classified into the "event" category.

The category bars 653 and 654 are displayed correspondingly to the categories in which the selected image file "001.jpg" is classified. That is, if the image file "001.jpg" is classified into the "sample" and the "event", the category bar 653 of the "sample" and the category bar 654 of the "event" are displayed as shown in FIG. 28. For example, if the image file "001.jpg" is classified only into the "people" category, the category bar corresponding to the "people" is displayed in the link bar 641. Moreover, for example, if the image file "001.jpg" is not classified into any categories, no category bars are displayed in the link bar 641.

That is, if an image file is selected in the list of the image files displayed in the image display area 631, the PC 1 displays the link bar corresponding to the selected image file. Then, the category bars corresponding to the categories in which the selected image file is classified are included in the link bar. Moreover, the link bar also includes an explorer bar, which is selected if the directory storing the selected image file is displayed, and a calendar bar, which is selected if the image files of the same photograph day as one of the selected image file is displayed in a list form.

Consequently, the user can browse the list of the image files belonging to the category in which the selected image file is classified after the user has selected a desired image file among the image files displayed in the image display area 631. Moreover, the user can browse the list of the image files including the images photographed on the same photograph day as that of the selected image file. Moreover, the user can also easily specify the directory in which the selected image file is stored.

Figure 29:
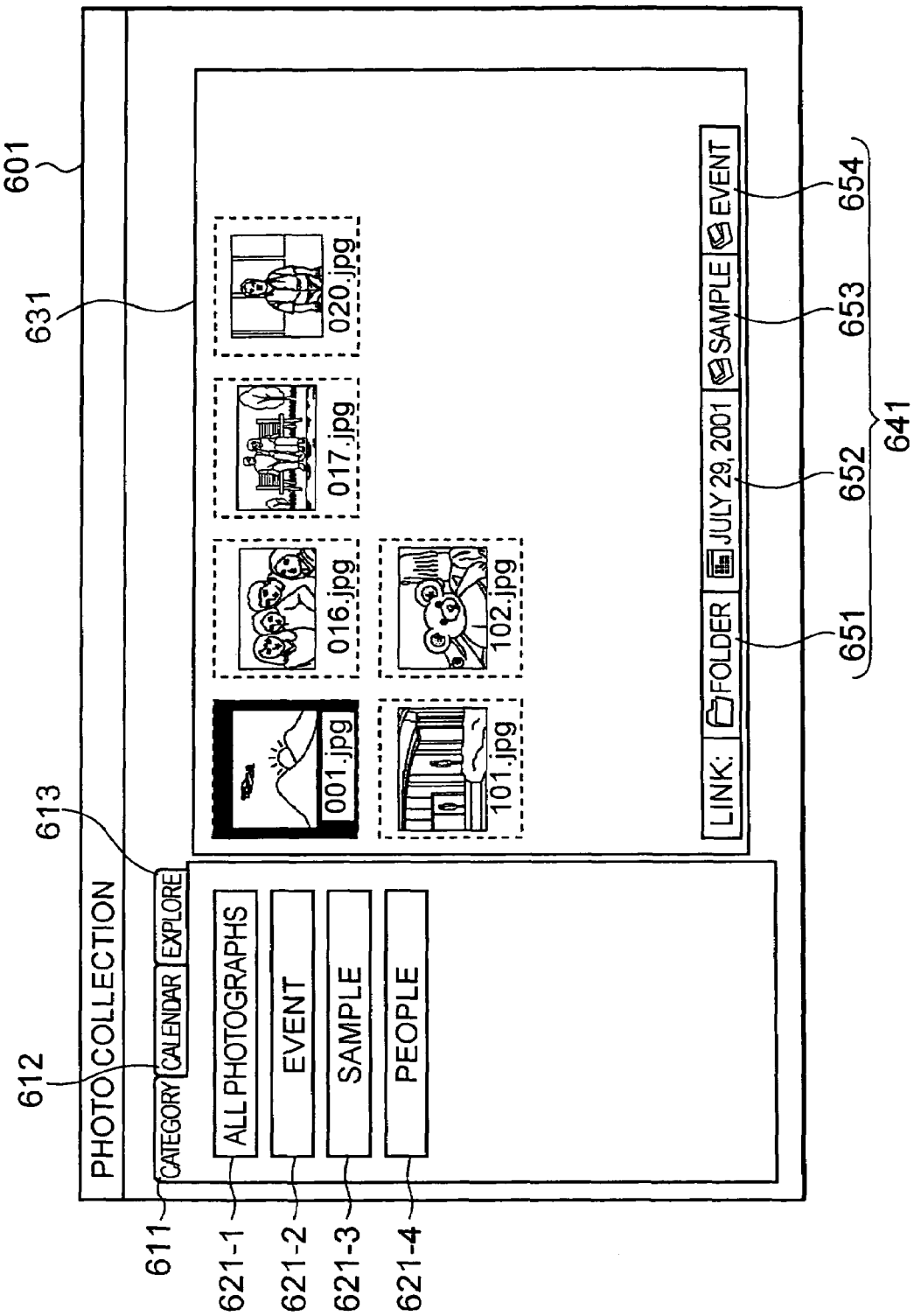
FIG. 29 is a view showing a display example of a photo collection window.

FIG. 29 shows a display example in the case where the category bar 654 "event" is selected in FIG. 28. In FIG. 29, the list of the image files classified in the "event" category is displayed in the image display area 631.

Figure 30:
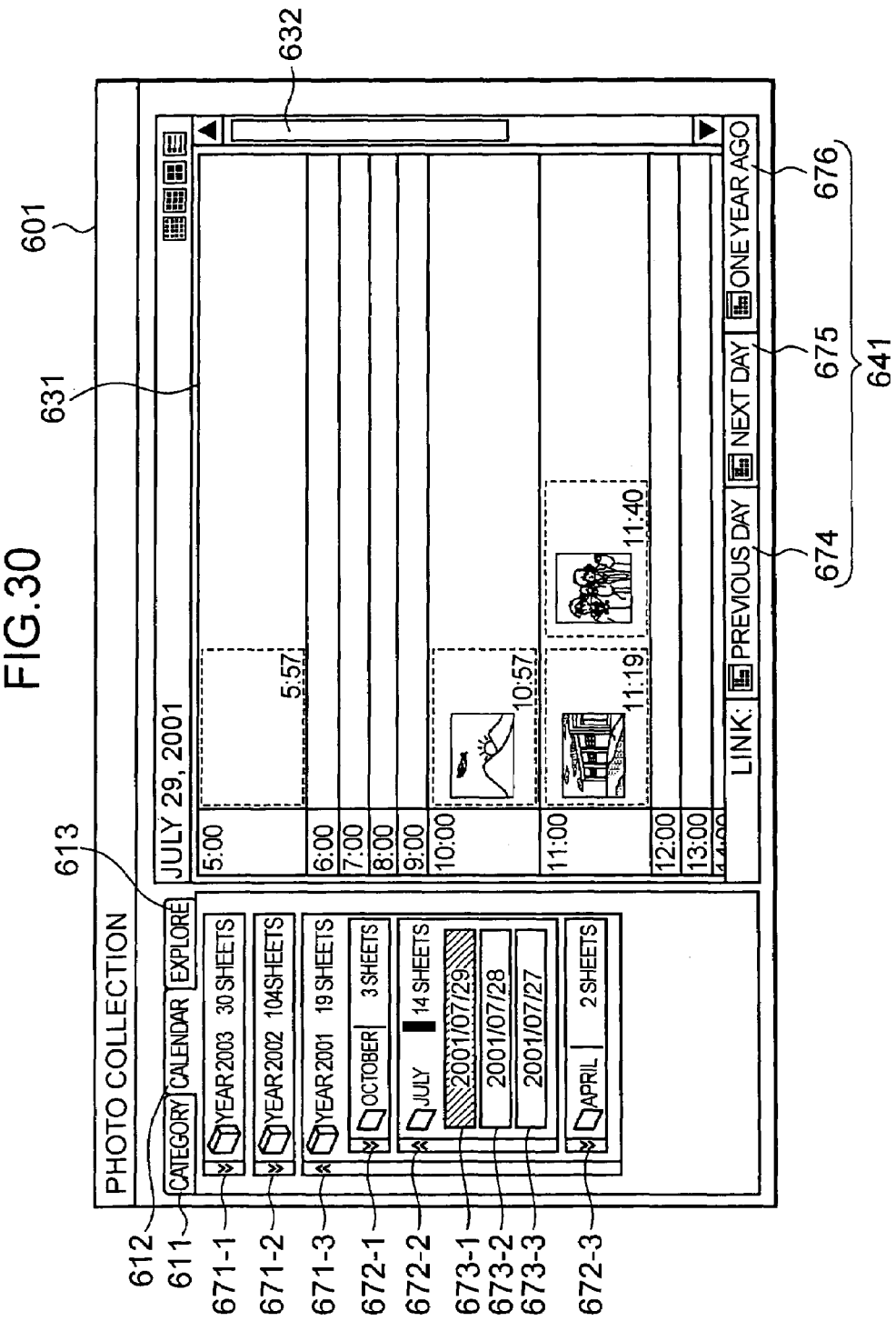
FIG. 30 is another view showing a display example of a photo collection window.

FIG. 30 shows a display example in the case where the calendar bar 652 is selected in FIG. 28. In FIG. 30, in the image display area 631, the images photographed on the same photograph day as that of the image file "001.jpg" are displayed related to photograph time. Although only the time ranging from 5:00 to 13:00 is displayed in FIG. 30, the time at and after 13 can be displayed by performing scrolling by moving the scroll bar 632 downward. Moreover, in the image display area 631 in FIG. 30, background color may be changed every time.

If the calendar bar 652 of FIG. 28 is selected, as shown in FIG. 30, the display on the left side of the photo collection window 601 is changed. That is, in FIG. 28, the state in which the category tab 611 is selected is displayed, but in FIG. 30, the state in which the calendar tab 612 is selected is displayed.

In the state in which the calendar tab 612 is selected, a calendar operating area is displayed in the lower part of the calendar tab 612. In the calendar operating area, year buttons 671-1 to 671-3, month button 672-1 to 672-3, and date-and-time button 673-1 to 673-3 are displayed. The user can change the display in the image display area 631 every year, every month or every day by operating those buttons.

For example, if month button 672-2 is selected, the photo collection window 601 is displayed as shown in FIG. 31. In FIG. 31, in the image display area 613, the image files including the images photographed in the month selected in FIG. 30 are displayed at the rate of one image on every day. In FIG. 31, the images are displayed on days of 2 (Sat.), 3 (Sun.), 6 (Wend.), 7 (Thurs.), 9 (Sat.) and 10 (Sun.), and no image is displayed in columns of the days on which no photographing process has been performed.

Figure 32:
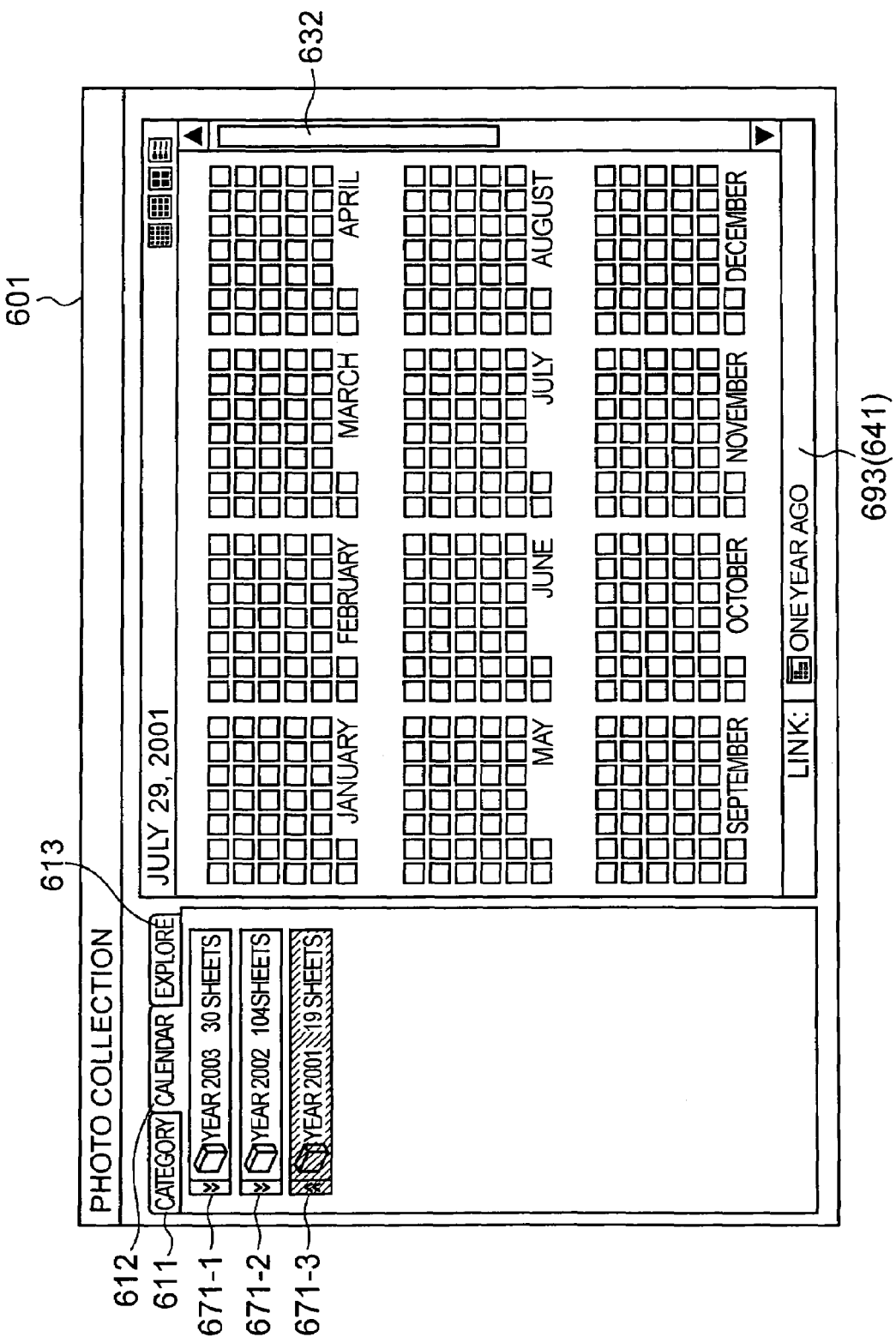
FIG. 32 is a view showing a display example of a photo collection window.

Moreover, if the year button 671-3 is selected, the photo collection window 601 is displayed as shown in FIG. 32. In FIG. 32, in the image display area 613, the image files including the images photographed in the selected year are displayed at the rate of one image on every day. In FIG. 32, the showing of the photographed images is omitted, but actually images are displayed in squares of respective dates.

Returning to FIG. 30, in the link bar 641 at the lower part of the photo collection window 601, a date selecting bar 674 to be operated at the time of displaying the images of the day previous to the presently displayed date in a list form, a date selecting bar 675 to be operated at the time of displaying the images of the day next to the presently displayed date in a list form, and a date selecting bar 676 to be operated at the time of displaying the images on the date after one year from the presently displayed date in a list form are displayed. The user can select these bars by operating the mouse 206 as the need arises.

Moreover, in FIG. 31, in the link bar 641 at the lower part of the photo collection window 601, a month selecting bar 691 to be operated at the time of displaying the images of the moth previous to the presently displayed month in a list form, a month selecting bar 692 to be operated at the time of displaying the images of the moth next to the presently displayed month in a list form, and a month selecting bar 693 to be operated at the time of displaying the images in the month after one year from the presently displayed month in a list form are displayed. The user can select these bars by operating the mouse 206 as the need arises.

Moreover, in FIG. 32, in the link bar 641 at the lower part of the photo collection window 601, a year selecting bar 693 to be operated at the time of displaying the images of the year previous to the presently displayed year in a list form is displayed. The user can select this bar by operating the mouse 206 as the need arises.

Figure 33:
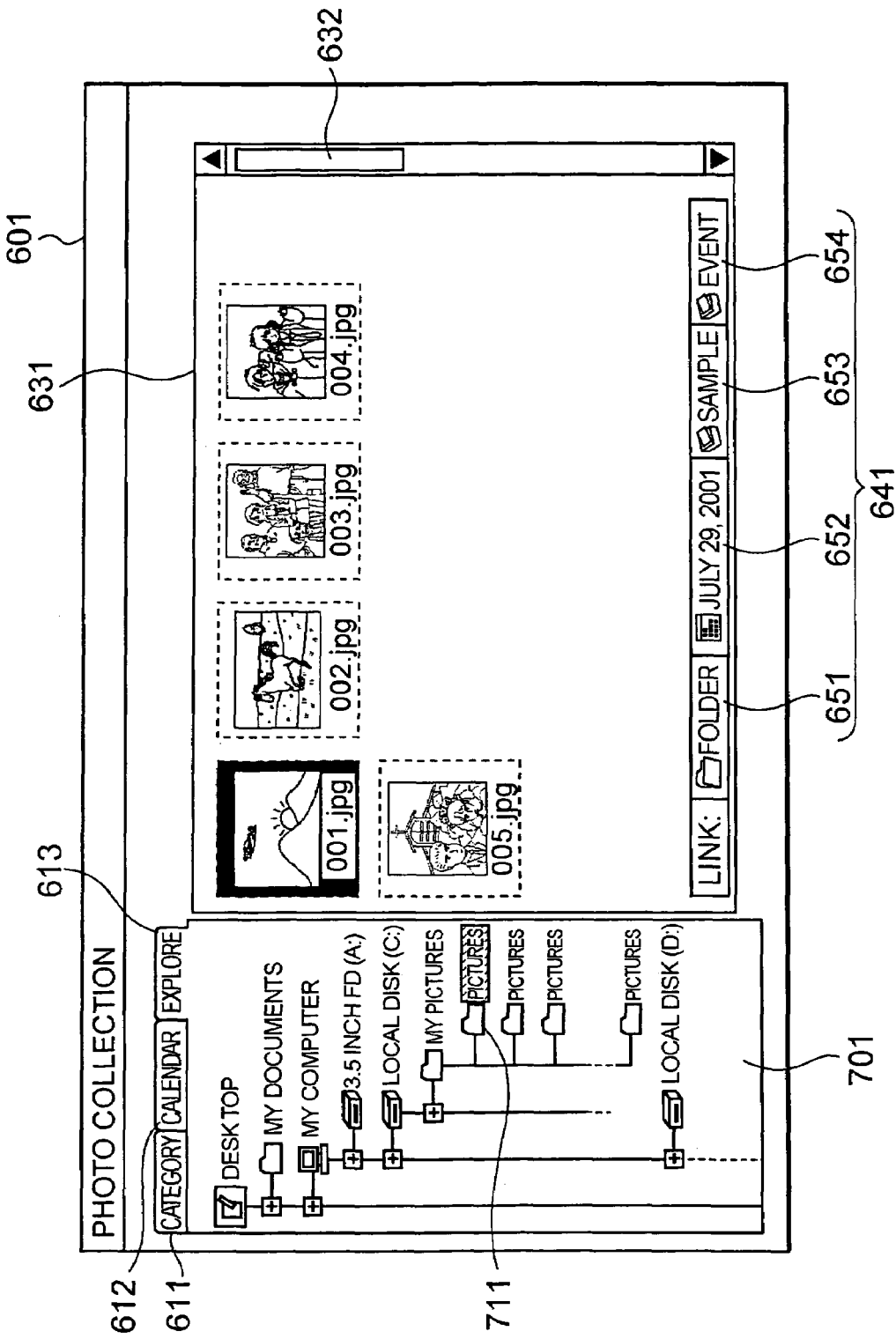
FIG. 33 is another view showing a display example of a photo collection window.

Now, if the explorer bar 651 contained in the link bar 641 at the lower part of the photo collection window 601 shown in FIG. 28 or 29 is selected, the PC 1 displays the photo collection window 601 as shown in FIG. 33.

In FIG. 33, the display on the left side of the photo collection window 601 has been switched. That is, in FIG. 33, the sate in which the explorer tab 613 is selected is displayed.

In the sate in which the explorer tab 613 is selected, below the explorer tab 613, the directory storing the selected image file is displayed distinguishably from the other directories as shown by a sign 711. Accordingly, the user can easily grasp which directory the selected image file is stored in. Moreover, in image display area 631, the image files stored in the same directory as one of the selected image file are displayed in a list form.

As described above, the user can manage the image files by classifying them into a plurality of categories. The concept of the above-mentioned image file managing method is shown in FIG. 34.

Figure 34:
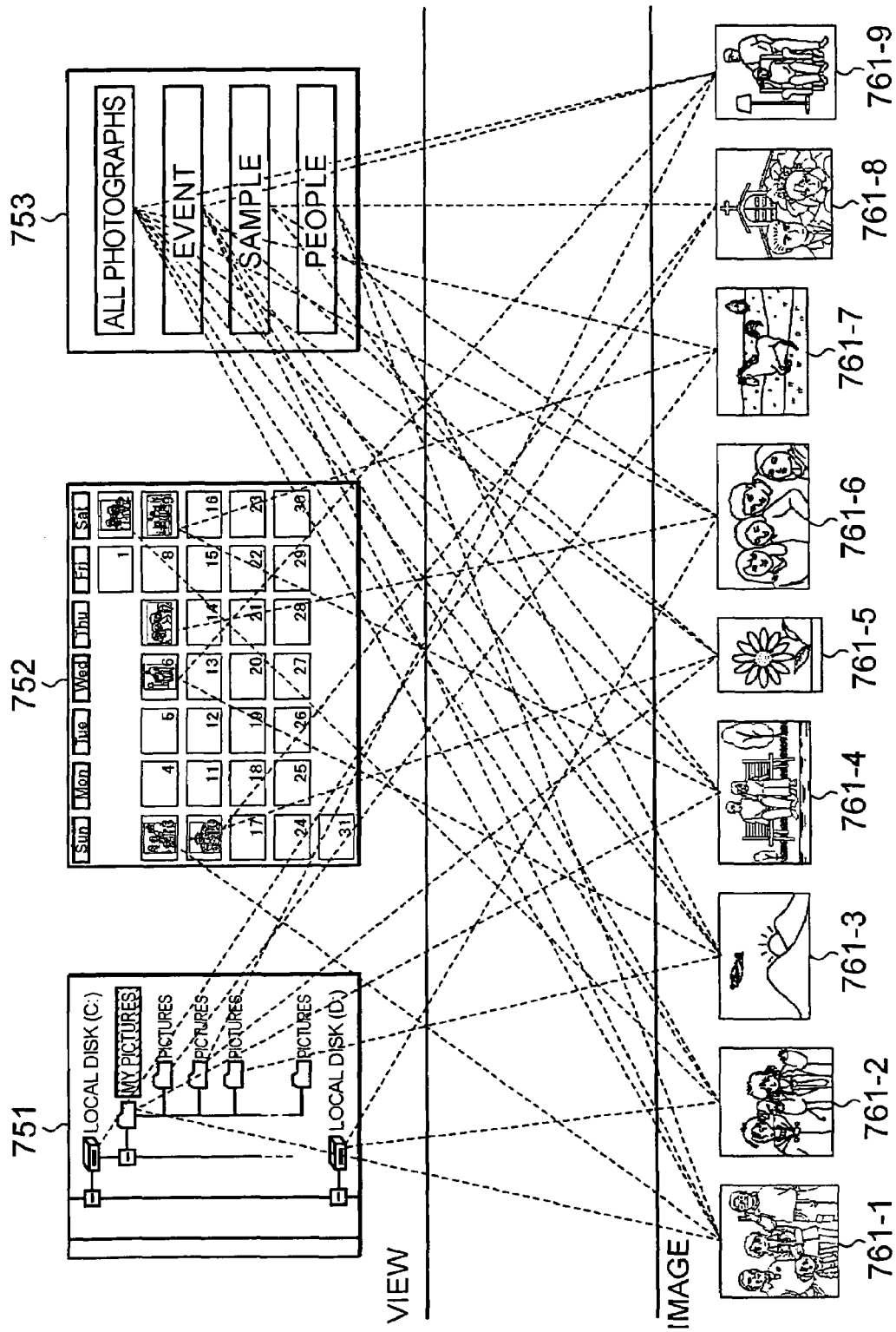
FIG. 34 is a view for conceptually illustrating a management method of image files.

In FIG. 34, on the upper side thereof, an explorer view 751, a calendar view 752 and a category view 753 are shown. The explorer view 751 expresses a screen to be displayed if the explorer bar 651 (or the explorer tab 613) is selected. The calendar view 752 expresses a screen to be displayed if the calendar bar 652 (or the calendar tab 612) is selected. Moreover, the category view 753 corresponds to the category buttons 621-1 to 621-4.

Moreover, on the lower side of FIG. 34, image files 761-1 to 761-9 managed by the PC 1 are shown.

In FIG. 34, the line extending from each of the image files 761-1 to 761-9 to each directory of the explorer view 751 indicates the directory storing each of the image files 761-1 to 761-9. Moreover, the line extending from each of the image files 761-1 to 761-9 to the calendar view 752 indicates the photograph day on which each of the image files 761-1 to 761-9 is classified. Moreover, the line extending from each of the image files 761-1 to 761-9 to the category view 753 indicates the category in which each of the image files 761-1 to 761-9 is classified.

The image files are managed by being stored in the predetermined directories of the hierarchical directory structure. As shown in the calendar view 752 and the category view 753 of FIG. 34, it is also possible to classify the image files based on the categories different from ones based on the directories (for example, photograph dates and time, and the categories such as "all photographs", "event", "sample", "people" and the like). In the following, the conditions for classifying the image files such as the photograph dates and time, and the categories including the "all photographs", the "event", the "sample", the "people" and the like are also called as the attributes of the image files.

The PC 1 classifies the image files into a plurality of categories (including the category of the photograph dates and time) based on the attributes of the image files. As a result, as shown in FIG. 34, net-like links are provided from the image files 761-1 to 761-9 to the explorer view 751, the calendar view 752 and category view 753. By such a managing method, even if a large quantity of image files exists, the user can easily arrange and classify them.

That is, because the PC 1 can classify the image files into user's arbitrary categories with the image files themselves stored in the predetermined directories, for example, even if one image file is classified into a plurality of categories, it is not needed to reproduce the image file.

Such management of the image files is executed in accordance with the file management program 233 shown in FIG. 4.

Figure 35:
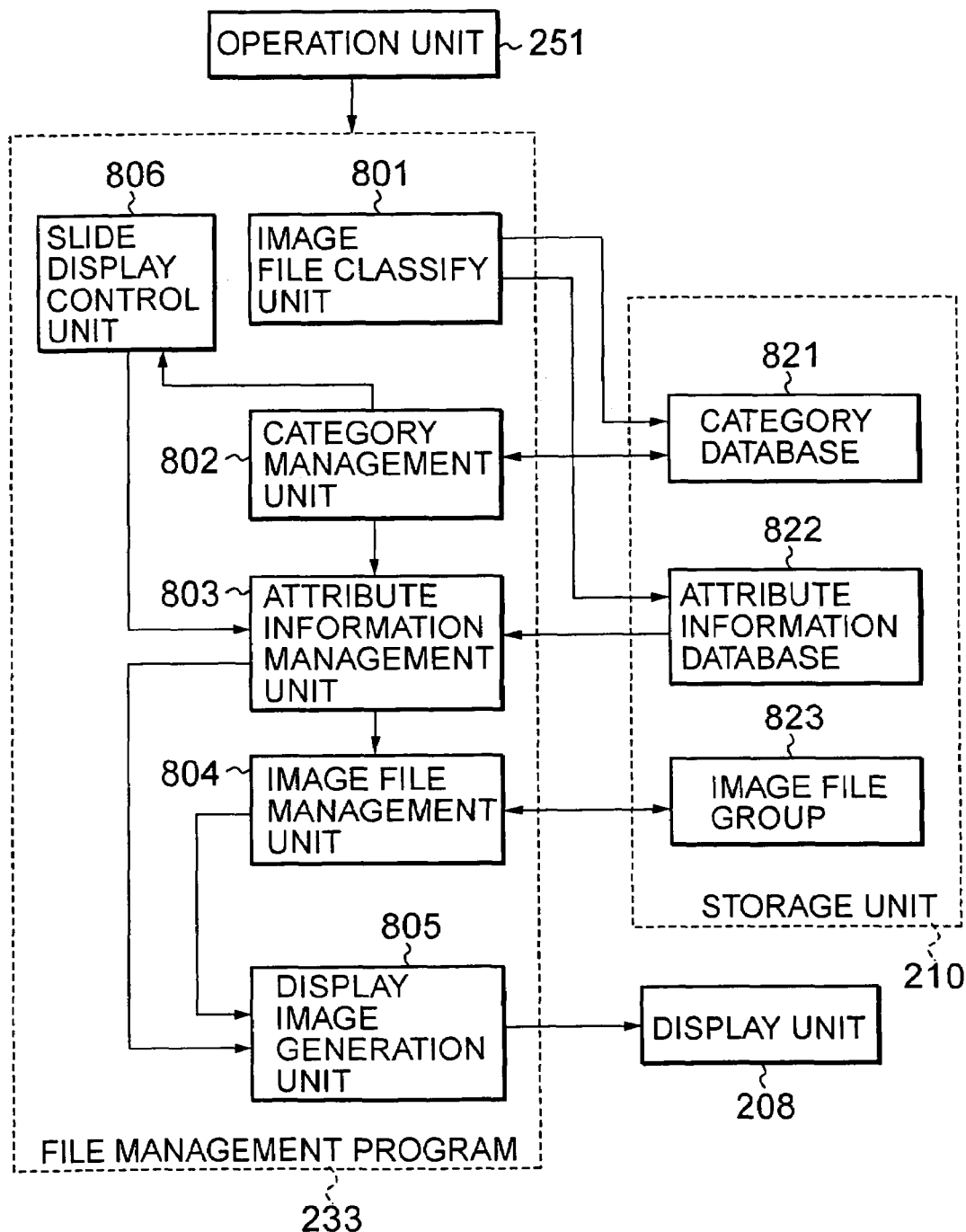
FIG. 35 is a block diagram showing a functional configuration example of a file management program of FIG. 4.

FIG. 35 shows a functional configuration example of the file management program 233 of FIG. 4. The functional configuration shown in FIG. 35 is realized by the execution of the OS 231 and the file management program 233 stored in the storage unit 210 by the CPU 201.

On the right side of FIG. 35, an example of the data stored in the storage unit 210 is shown. In FIG. 35, the storage unit 210 stores a category database 821, an attribute information database 822 and an image file group 823 (the storage unit 210 also stores the other data such as the OS 231, but the illustration of such data is omitted in FIG. 35). The category database 821 is a database for managing the list of the image files included in each category. An example of the category database 821 is shown in FIGS. 36 and 37.

FIG. 36 shows an example of the database of categories of "event", "sample" and "people". In the column on the left side of FIG. 36, the categories are shown in the order of the "event", the "sample" and the "people" from the top. Moreover, in the column on the right side of FIG. 36, a list of the image files classified into each category. That is, in FIG. 36, a total of six image files of "001.jpg", "016.jpg", "017.jpg", "020.jpg", "101.jpg" and "102.jpg" is classified into the "event" category. Moreover, a total of seven image files of "002.jpg" "003.jpg", "004.jpg", "015.jpg", "016.jpg", "017.jpg" and "018.jpg" is classified into the "sample" category. Moreover, a total of five image files of "051.jpg", "052.jpg", "053.jpg", "101.jpg" and "102.jpg" is classified into the "people" category.

For example, if the user has selected the category button 621-2 "event" or the category bar 654 "event" of FIG. 28 and images are displayed based on the category database of FIG. 36, six images based on the total of six image files of the "001.jpg", the "016.jpg", the "017.jpg", the "020.jpg", the "101.jpg" and the "102.jpg" are displayed in the image display area 631.

FIG. 37 shows an example of a category database based on photograph dates and time. On the left side of the list of FIG. 37, photograph dates and time are minutely classified in the order of years, months and days. Moreover, on the right side of the list of FIG. 37, a list of the image files photographed on each date is shown. That is, in FIG. 37, for example, on Jan. 1, 2003, image files such as "201.jpg" and "202.jpg" are classified. Moreover, for example, on Jan. 2, 2003, image files such as "231.jpg", "232.jpg" and "245.jpg" are classified.

For example, if the calendar bar 652 of FIG. 28 is selected by the user and images are displayed based on the category database of FIG. 37, images based on the image files such as the "201.jpg" and the "202.jpg" are displayed in the image display area 631.

The category database 821 records the lists of the image files classified every category by means of both the lists of FIGS. 36 and 37. The database of the categories shown in FIG. 36 is set by the user, and the database of the photograph dates and time shown in FIG. 37 is previously set in the file management program 233.

In FIGS. 36 and 37, classification is performed based on the file names of the image files. However, the information specifying the directories storing the image files may be recorded in the category database together with the file names in addition to the file names. Moreover, the image files may be classified based on the information capable of specifying the image files other than the file names.

Returning to FIG. 35, the attribute information database 822 is a database for managing the attribute information of each image file. An example of the attribute information database 822 is shown in FIG. 38.

In FIG. 38, in the most left side column, file names of image files are shown. In the second column from the left side, directories storing the respective image files are shown. In the third column from the left side, photograph dates and time of the respective image files are shown. In the most right column, categories (ones set by the user) to which the respective image files belong are shown.

For example, in FIG. 38, the image file having the file name "001.jpg" is stored in a directory "¥C¥my picture¥picture", and it is shown that the image file has been photographed at "10:48 on Jul. 29, 2001" and belongs to the categories of "sample" and "event".

For example, the link bar 641 shown in FIG. 28 is displayed based on the attribute information database. That is, the photograph date and time "Jul. 29, 2001" displayed in the calendar bar 652 is displayed based on the attribute of the "photograph date and time" of FIG. 38, and the category bars 653 and 654 are displayed based on the attribute of the "category" of FIG. 38. Moreover, if the explorer bar 651 of FIG. 28 is selected, the directory storing the image file is specified based on the attribute of the "save directory" of FIG. 38, and is displayed like an explorer view 701 of FIG. 33. In the following description, the attribute of the save directory is also called as a directory attribute; the attribute of the photograph date and time is also called as a data attribute; the attribute of the category is also called as a category attribute.

Returning to FIG. 35, the image file group 823 indicates the image files imported into the PC 1 to be stored in the predetermined directories.

The image file classifying unit 801 in the file management program 233 updates the records of the category database 821 and the attribute information database 822 if an instruction for classifying an image file into a category is input from the operation unit 251 including the mouse 206 and the keyboard 207. That is, for example, as shown in FIG. 27, if the drag-and-drop operation of the image file "001.jpg" onto the category button 621-2 "event" is performed, the image file classifying unit 801 adds the image file "001.jpg" to the category "event" of the category database 821, and adds the "event" to the category attribute of the image file "001.jpg" of the attribute information database 822.

If an instruction of table display of the image files classified in a certain category is input from the operation unit 251, namely, for example, anyone of the category buttons 621-1 to 621-4, the calendar bar 652 and the category bars 653 and 654 of FIG. 28 is selected, a category management unit 802 obtains the list of the image files classified into the specified category from the category database 821, and informs an attribute information management unit 803 of the obtained list.

At this time, the attribute information management unit 803 obtains the directory attributes of all of the image files included in the list informed from the category management unit 802 from the attribute information database 822, and informs an image file management unit 804 of the obtained directory attributes. The image file management unit 804 reads all of the image files contained in the list from the image file group 823 based on the directory attributes informed from the attribute information database 822, and supplies the read image files to the display screen generation unit 805. The display screen generation unit 805 displays the list of the images classified into the category in the image display area 631 based on the image files supplied from the image file management unit 804.

Moreover, for example, if the explorer bar 651 of FIG. 28 is selected, the attribute information management unit 803 obtains the directory attribute of the image file which is now selected from the attribute information database 822, and informs the display screen generation unit 805 of the obtained directory attribute. At this time, the display screen generation unit 805 displays, for example, the explorer view 701 as shown in FIG. 33 based on the directory attribute inform from the attribute information management unit 803.

Moreover, for example, if one image file is selected as shown in FIG. 28, the attribute information management unit 803 reads the data attribute and the category attribute of the selected image file, and supplies the read data attribute and the category attribute to the display screen generation unit 805. At this time, the display screen generation unit 805 displays, for example, the link bar 641 as shown in FIG. 28 based on the data attribute and the category attribute supplied from the attribute information management unit 803.

Moreover, if the creation of a new category is instructed through the operation unit 251, the category management unit 802 creates an item corresponding to the new category in the category database 821. Moreover, if the deletion of an existing category is instructed through the operation unit 251, the category management unit 802 deletes the item of the category the deletion of which is instructed from the category database 821. After that, the category management unit 802 requires the attribute information management unit 803 to delete the instructed category. The attribute information management unit 803 deletes all of the instructed categories from the attribute information in accordance with the request by the category management unit 802.

If a list display of the images for a month as shown in FIG. 31 is executed, the slide display control unit 806 executes the process of display by sequentially replacing the image file to be displayed on each date like the so-called slide show.

Now, if image files are imported into the PC 1 by an import process, the file management program 233 executes the process of classifying the imported image files based on photograph days (hereinafter referred to as an image registration process).

Figure 39:
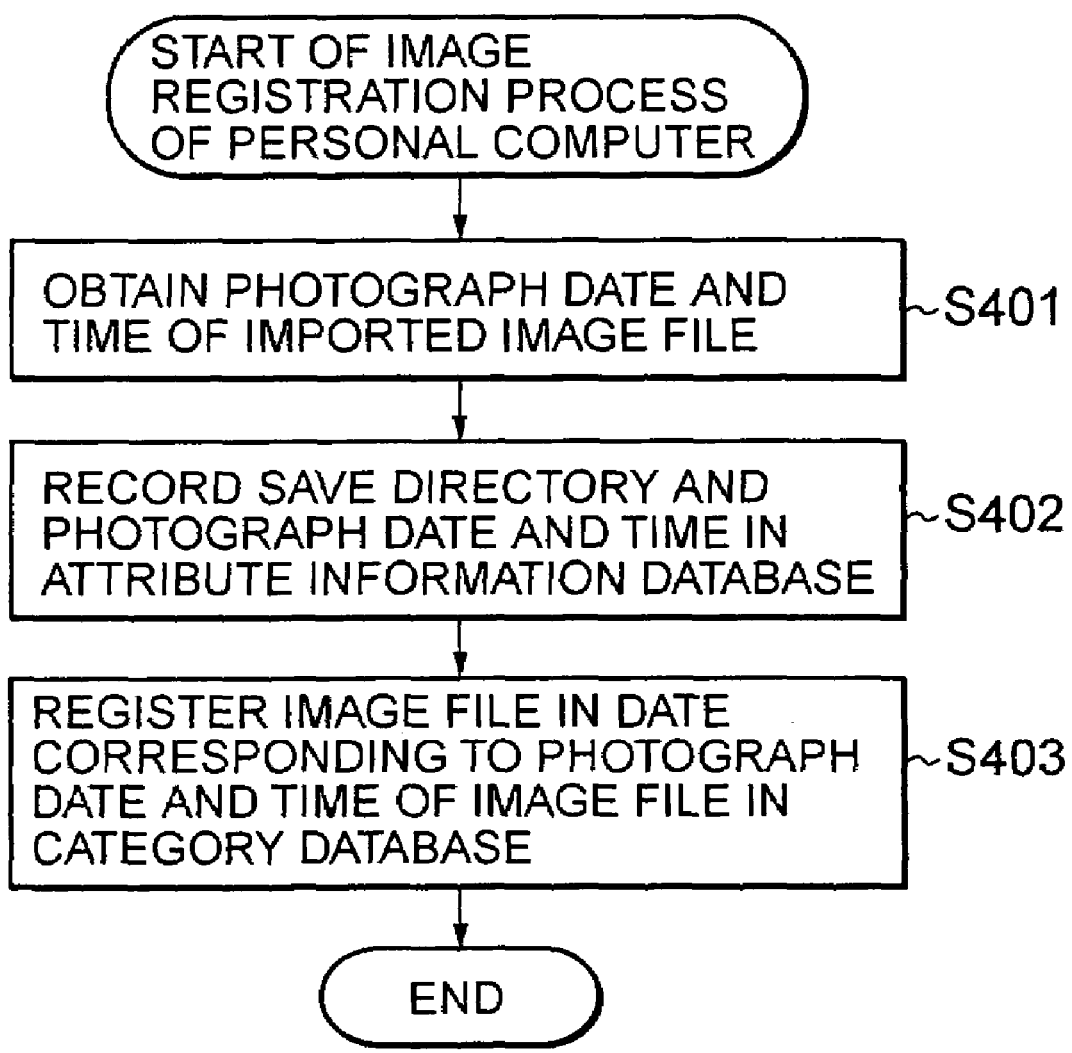
FIG. 39 is a flowchart for illustrating image registration process of a personal computer.

Next, the image registration process of the PC 1 is described with reference to the flowchart of FIG. 39.

At a step S401, the image file classifying unit 801 obtains the photograph dates and time of the imported image file. Since the photograph dates and time are attached to the image files themselves as a result of, for example, the photographing process shown in FIG. 15 (or FIG. 16), the image file classifying unit 801 obtains the photograph dates and time attached to the imported image files.

Figure 20:
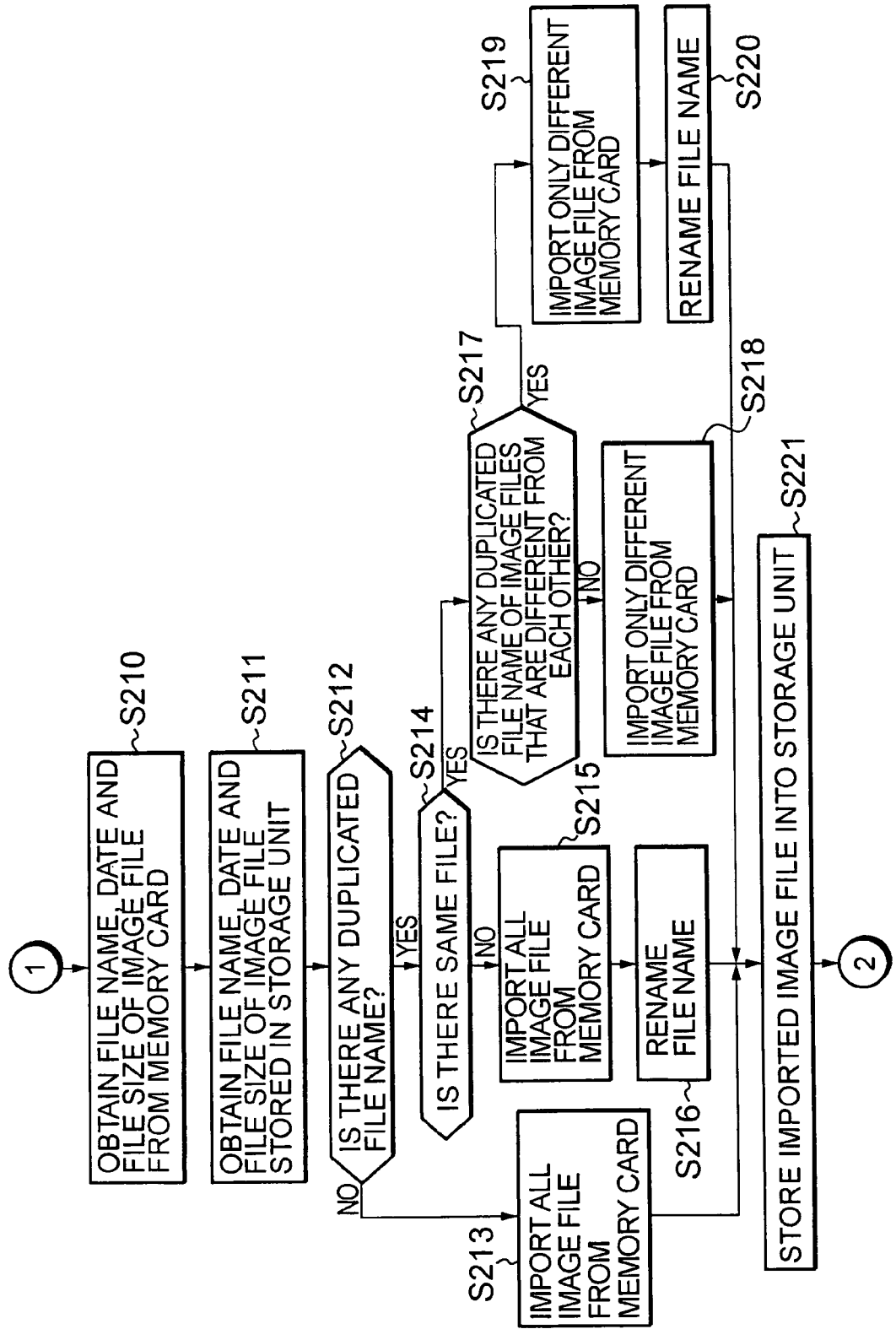
FIG. 20 is a flowchart continued from FIG. 19 for illustrating the import process of a personal computer.

At a step S402, the image file classifying unit 801 specifies the directories of the storing destinations of the image files if the image files are recorded in the storage unit 210 (for example, the step S209 of FIG. 19 or the step S221 of FIG. 20). Then, the image file classifying unit 801 records the specified directories and the photograph dates and time obtained at the step S401 into the attribute information database 822 as the attribute information (directory attributes and data attributes) of the image files.

At the step S403, the image file classifying unit 801 registers the image files on the photograph days obtained at the step S401 in the category database 821 (for example, the database of FIG. 37).

In the way described above, the attribute information of the image files imported by the import process is recorded in the attribute information database 822, and the imported image files are registered in the items corresponding to the photograph days of the image files in the category database 821.

Next, the image management process of the PC 1 is described with reference to the flowcharts of FIGS. 40 to 43.

Figure 40:
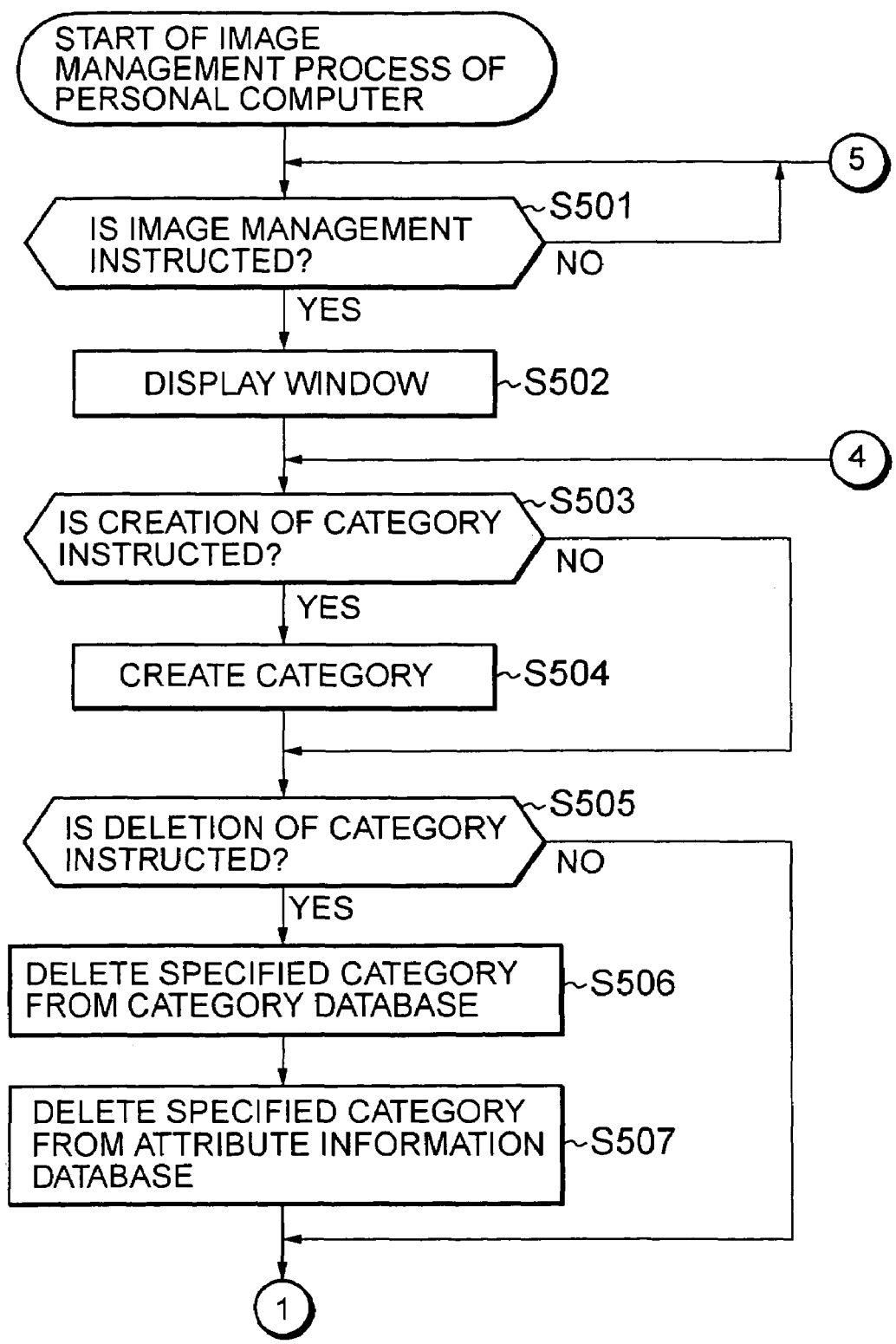
FIG. 40 is a flowchart for illustrating image management process of a personal computer.

At a step S501 of FIG. 40, the file management program 233 judges whether the icon 458 of FIG. 18 is selected and the management of image files is instructed or not, and waits until the management of the image files is instructed. Then, if the icon 458 is selected, the file management program 233 judges that the management of the image files is instructed, and the process proceeds to a step S502.

At the step S502, the display screen generation unit 805 makes the display unit 208 display the photo collection window 601. The photo collection window 601 as shown in FIG. 26 is displayed on the display unit 208. At the beginning of the display of the photo collection window 601, all of the image files contained in the image file group 823 may be displayed in the image display area 631.

The user can instruct the creation of a new category with the operation unit 251. Accordingly, at a step S503, the category management unit 802 judges whether the creation of a new category is instructed or not. If the creation of the category is instructed, the process proceeds to a step S504.

At the step S504, the category management unit 802 adds the new category to the category database 821. For example, if the addition of a category of "Festival of the Weaver" is instructed through the operation unit 251, the category management unit 802 adds the category of the "Festival of the Weaver" below the "event", the "sample" and the "people" of the category database 821 as shown in FIG. 36. After that, the process proceeds to a step S505.

At the step S503, if the category management unit 802 judges that the creation of a new category is not instructed, the process of the step S504 is skipped, and the process proceeds to the step S505.

The user can delete a category with the operation unit 251. Accordingly, at the step S505, the category management unit 802 judges whether the deletion of a category is instructed through the operation unit 251 or not. If the deletion of the category is instructed, the process proceeds to a step S506.

At the step S506, the category management unit 802 deletes the category instructed from the category database 821. For example, if the deletion of the "event" category is commanded, the category management unit 802 deletes the "event" category from the category database 821 shown in FIG. 36. That is, in FIG. 36, all of the "event" and the list of the image files related to the "event" are deleted. After that, the process proceeds to a step S507.

At the step S507, the category management unit 802 requires the attribute information management unit 803 to delete the category deleted at the step S506 from the attribute information database 822. The attribute information management unit 803 deletes the required category from the attribute information database 822 in accordance with the requirement from the category management unit 802. For example, if the attribute information management unit 803 is required to delete the "event" category from the category management unit 802, the attribute information management unit 803 deletes the "event" category from the category attributes of the attribute information database 822 shown in FIG. 38. Consequently, for example, the "event" is deleted between the "sample" and the "event" as the category attributes of the image file "001.jpg", and only the "sample" is left. After the process of the step S507, the process proceeds to a step S508 of FIG. 41.

Figure 41:
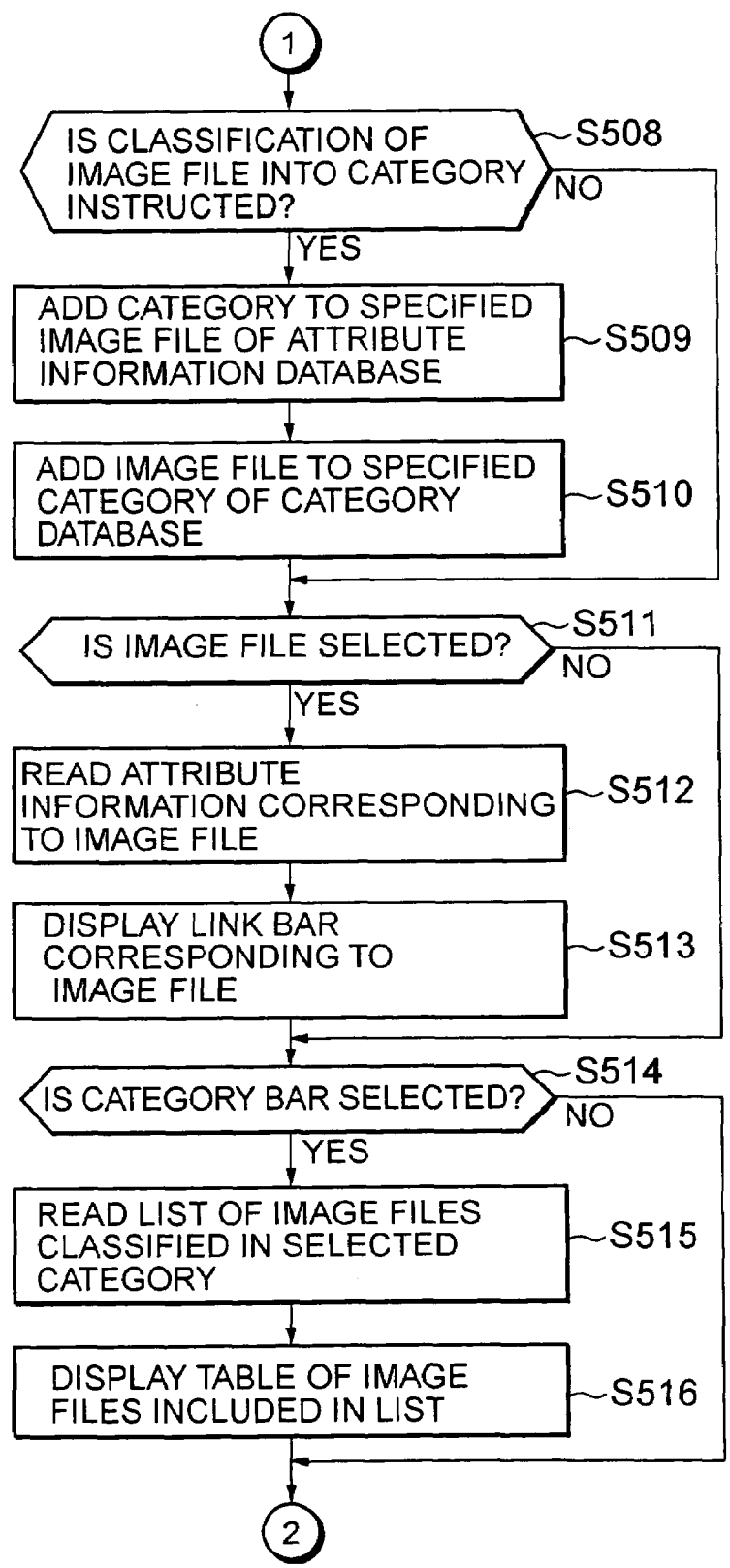
FIG. 41 is a flowchart continued from FIG. 40 for illustrating image management process of a personal computer.

At the step S505, if the category management unit 802 judges that the deletion of a category is not instructed, the processes of the step S506 and the step S507 are skipped, and the process proceeds to the step S508 of FIG. 41.

At the step S508 of FIG. 41, the image file classifying unit 801 judges whether the classification of an image file into a category is instructed through the operation unit 251 or not. If the classification of the image file into the category is instructed, the process proceeds to a step S509.

At the step S509, the image file classifying unit 801 adds a specified category to the category attribute of the specified image file in the attribute information database 822. For example, as shown in FIG. 27, the drag-and-drop operation of the image file "001.jpg" is performed onto the category button 621-2 "event", the image file classifying unit 801 adds the "event" to the category attribute of the image file "001.jpg" of FIG. 38.

At a step S510, the image file classifying unit 801 adds and registers the specified image file to the specified category in the category database 821. For example, as shown in FIG. 27, if the drag-and-drop operation of the image file "001.jpg" is performed onto the category button 621-2 "event", the image file classifying unit 801 adds the image file "001.jpg" to the "event" category of FIG. 36. After that, the process proceeds to a step S511.

At the step S508, if the image file classifying unit 801 judges that the classification of an image file into a category is not instructed, the processes at the step S509 and the step S510 are skipped, and the process proceeds to the step S511.

As the description has been attached by referring to FIG. 28, the user can select a desired image among the images displayed in the image display area 631 with the mouse 206 or the like. Accordingly, at the step S511, the attribute information management unit 803 judges whether an image file is selected with the mouse 206 or the like or not. If the image file is selected, the process proceeds to a step S512.

At the step S512, the attribute information management unit 803 reads the attribute information (the data attribute and the category attribute) corresponding to the image file selected at the step S511 from the attribute information database 822, and supplies the read attribute information to the display screen generation unit 805.

At a step S513, the display screen generation unit 805 displays the link bar 641 in the photo collection window 601 based on the attribute information supplied from the attribute information management unit 803 at the step S512. After that, the process proceeds to a step S514.

At the step S511, if the attribute information management unit 803 judges that no image files are selected, the processes at the step S512 and the step S513 are skipped, and the process proceeds to the step S514.

At the step S514, the category management unit 802 judges whether the category bar (for example, the category bar 653 or 654 of FIG. 28) is selected or not. If the category bar is selected, the process proceeds to a step S515.

At the step S515, the category management unit 802 reads the list of the image files classified into the category selected at the step S514 from the category database 821, and informs the attribute information management unit 803 of the read list. For example, if the category bar 654 "event" of FIG. 28 is selected, at the step S515, the category management unit 802 reads the list of the image files "001.jpg", "016.jpg", "017.jpg", "020.jpg", "101.jpg" and "102.jpg" from the category database 821 of FIG. 36, and informs the attribute information management unit 803 of the read list.

At a step S516, the attribute information management unit 803 reads the directory attributes of all of the image files included in the list informed from the category management unit 802 from the attribute information database 822, and supplies the read directory attributes to the image file management unit 804. The image file management unit 804 reads all of the image files included in the list read at the step S515 among the image file group 823 stored in the storage unit 210 based on the directory attributes of the image files supplied from the attribute information management unit 803, and supplies the read image files to the display screen generation unit 805. The display screen generation unit 805 displays the list of all of the image files supplied from the image file management unit 804 in the image display area 631 of the photo collection window 601.

Figure 42:
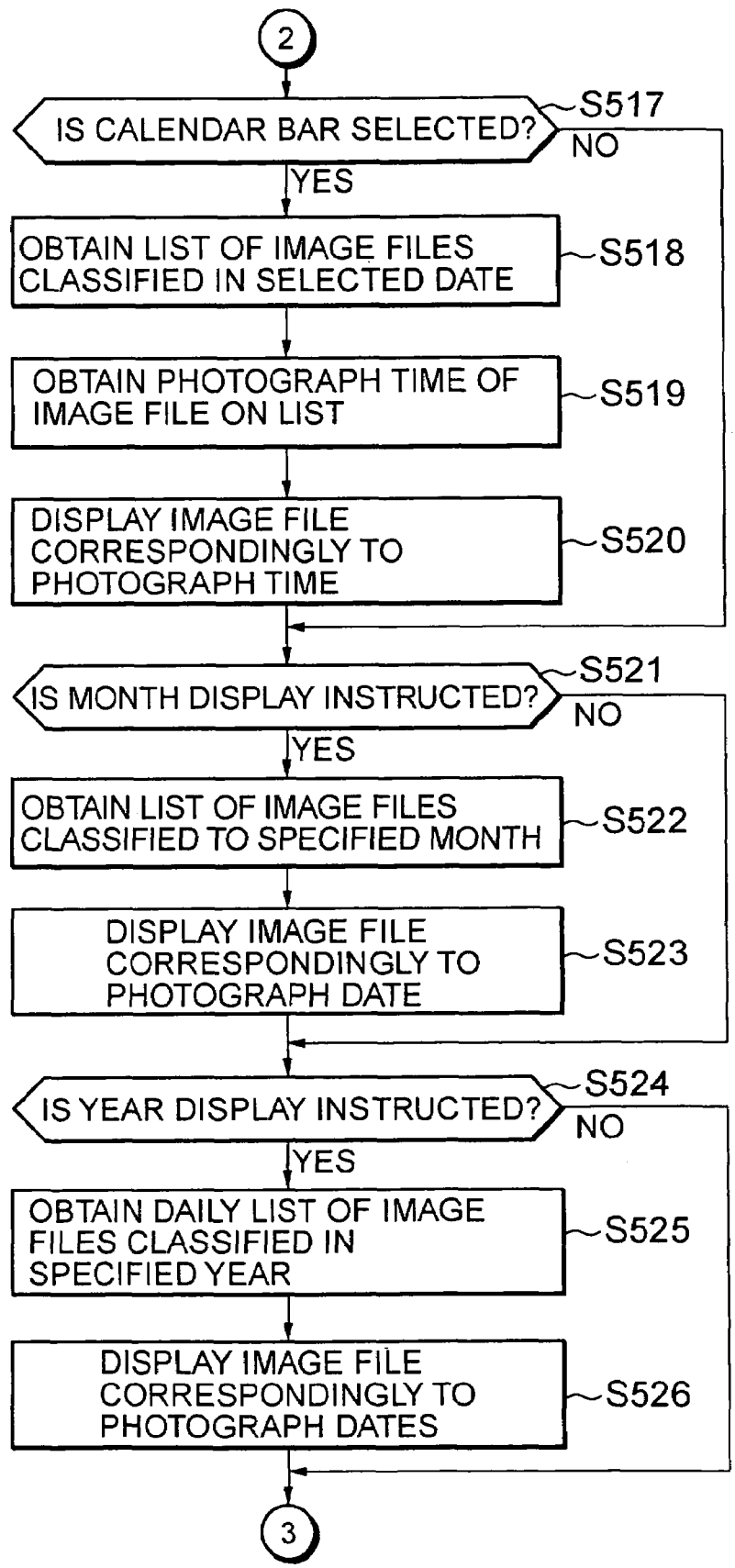
FIG. 42 is a flowchart continued from FIG. 41 for illustrating image management process of a personal computer.

After that, the process proceeds a step S517 of FIG. 42.

At the step S514, if the category management unit 802 judges that the category bar is not selected, the processes at the step S515 and the step S516 are skipped, and the process proceeds to the step S517 of FIG. 42.

At the step S517 of FIG. 42, the category management unit 802 judges whether a calendar bar (for example, the calendar bar 652 of FIG. 28) is selected or not. If the calendar bar is selected, the process proceeds to a step S518.

At the step S518, the category management unit 802 reads the list of the image files classified to the date selected at the step S517 from the category database 821, and informs the attribute information management unit 803 of the read list. For example, if the calendar bar 652 "Jul. 29, 2001" of FIG. 28 is selected, the category management unit 802 reads the list of the image files classified onto the Jul. 29, 2001 from the category database shown in FIG. 37, and informs the attribute information management unit 803 of the read list.

At a step S519, the attribute information management unit 803 reads the photograph time of all of the image files included in the list informed from the category management unit 802 at the step S518 from the attribute information database 822, and supplies the read photograph time to the display screen generation unit 805. Furthermore, the attribute information management unit 803 reads the directory attributes of all of the image files, and supplies the read directory attributes to the image file management unit 804. The image file management unit 804 reads all of the image files included in the list read at the step S518 among the image file group 823 stored in the storage unit 210 based on the directory attributes of the image files supplied from the attribute information management unit 803, and supplies the reads image files to the display screen generation unit 805.

At a step S520, the display screen generation unit 805 displays all image files supplied from the image file management unit 804 in the image display area 631 of the photo collection window 601, for example, as shown in FIG. 30, based on the photograph time supplied from the attribute information management unit 803 at the step S519. After that, the process proceeds to a step S521.

At the step S517, if the category management unit 802 judges that the calendar bar is not selected, the processes at the step S518 and the step S519 are skipped, and the process proceeds to the step S521.

At the step S521, the category management unit 802 judges whether a month button (for example, any one of the month buttons 672-1 to 672-3 of FIG. 30) is selected or not. If a month button is selected, the process proceeds to a step S522.

At the step S522, the category management unit 802 reads the list of the image files on the dates included in the month instructed at the step S521 from, for example, the category database 821 shown in FIG. 37, and supplies the read list to the attribute information management unit 803.

At the step S523, the attribute information management unit 803 reads the directory attributes of all of the image files included in the list informed from the category management unit 802 from the attribute information database 822, and supplies the read directory attributes to the image file management unit 804. The image file management unit 804 reads all of the image files included in the list read at the step S522 among the image file group 823 stored in the storage unit 210 based on the directory attributes of the image files supplied from the attribute information management unit 803, and supplies the read image files to the display screen generation unit 805. The display screen generation unit 805 displays all of the image files supplied from the image file management unit 804 in the image display area 631 of the photo collection window 601 as shown in FIG. 31. After that, the process proceeds to a step S524. In the following description, as shown in FIG. 31, a list display of the images included in one month is also called as a month display.

At the step S521, if the category management unit 802 judges that no month buttons are selected, the processes at the step S522 and the step S523 are skipped, and the process proceeds to the step S524.

At the step S524, the category management unit 802 judges whether a year button (for example, any one of the year buttons 671-1 to 671-3 of FIG. 30) is selected or not. If a year button is selected, the process proceeds to a step S525.

At the step S525, the category management unit 802 reads the list of the image files on the dates included in the year instructed at the step S524 from, for example, the category database 821 shown in FIG. 37, and supplies the read list to the attribute information management unit 803.

At the step S526, the attribute information management unit 803 reads the directory attributes of all of the image files included in the list informed from the category management unit 802 from the attribute information database 822, and supplies the read directory attributes to the image file management unit 804. The image file management unit 804 reads all of the image files included in the list read at the step S525 among the image file group 823 stored in the storage unit 210 based on the directory attributes of the image files supplied from the attribute information management unit 803, and supplies the read image files to the display screen generation unit 805. The display screen generation unit 805 displays all of the image files supplied from the image file management unit 804 in the image display area 631 of the photo collection window 601 as shown in FIG. 32. After that, the process proceeds to a step S527 of FIG. 43. In the following description, as shown in FIG. 32, a a list display of the images included in one month is also called as a year display. Moreover, the month display shown in FIG. 31 and the year display shown in FIG. 32 are also collectively called as a calendar display.

Figures 43, 44:
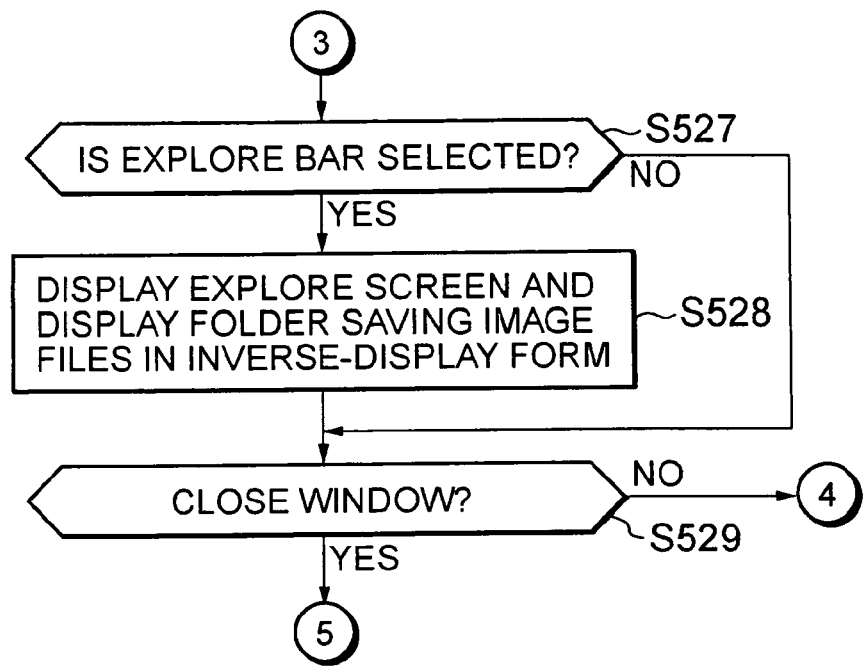
FIG. 43 is a flowchart continued from FIG. 42 for illustrating image management process of a personal computer.
FIG. 44 is a view showing an example of a category database.

At the step S524, if the category management unit 802 judges that no year buttons are selected, the processes at the step S525 and the step S526 are skipped, and the process proceeds to the step S527 of FIG. 43.

At the step S527 of FIG. 43, the attribute information management unit 803 judges whether an explorer bar (for example, the explorer bar 651 of FIG. 28) is selected or not. If the explorer bar is selected, the process proceeds to a step S528.

At the step S528, the attribute information management unit 803 reads the directory attribute of the image file which is being selected from the attribute information database 822, and supplies the read directory attribute to the display screen generation unit 805. The display screen generation unit 805 displays the explorer view 701 as shown in FIG. 33 based on the directory attribute supplied from the attribute information management unit 803, displaying the directory in which the image file is stored in an inverse display form as denoted by a sign 711. After that, the process proceeds to a step S529.

At the step S527, if the attribute information management unit 803 judges that the explorer bar is not selected, the process at the step S528 is skipped, and the process proceeds to the step S529.

At the step S529, the display screen generation unit 805 judges whether an instruction of the deletion of the photo collection window 601 from the display unit 208 is input or not. If the instruction of the deletion of the photo collection window 601 is not input, the process returns to the step S503 of FIG. 40, and the above-mentioned processes on and after the step S503 are repeatedly executed.

At the step S529, if the display screen generation unit 805 judged that the instruction of the deletion of the photo collection window 601 is input, the process returns to the step S501 of FIG. 40, and the above-mentioned processes on and after the step S501 are repeatedly executed.

In the way described above, the image management process is executed.

As described above, the image files themselves are managed in a hierarchical directory structure, and the image files and the categories are mutually linked for the user's arrangement and classification of the image files separately from the hierarchical directory structure. Consequently, the user can manage the image files more easily. Moreover, because an image file can be classified into a category only by one operation of the drag-and-drop operation of the image file onto a category button, the convenience is improved. Moreover, according to the above-mentioned image management process, it is possible to classify one image file into a plurality of categories without reproducing the image file. It is of course possible that the management method of the image files described above can be applied to the images other than the ones photographed with a digital still camera.

Now, if a plurality of image files exists to one date in case of, for example, the month display as shown in FIG. 31, the PC 1, to which the present embodiment is applied, can sequentially change the image file to be displayed.

For example, in the month display shown in FIG. 31, it is supposed that eleven image files, each having a photograph day 2 (Sat.), are stored in the storage unit 210; twenty-four image files, each having a photograph day 3 (Sun.), are stored in the storage unit 210; three image files, each having a photograph day 6 (Wends.), are stored in the storage unit 210; one image file having a photograph day 7 (Thurs.), are stored in the storage unit 210; six image files, each having a photograph day 9 (Sun.), are stored in the storage unit 210; fourteen image files, each having a photograph day 10 (Sun.), are stored in the storage unit 210.

At this time, it is supposed that image files are registered in the category database as shown in FIG. 44. In FIG. 44, a total of eleven image files of image files A1 to A11 is registered in "Day 2"; a total of twenty-four image files of image files B1 to B24 is registered in "Day 3"; a total of three image files of image files C1 to C3 is registered in "Day 6"; a total of one image file of an image file D1 is registered in "Day 7"; a total of six image files of image files E1 to E6 is registered in "Day 9"; a total of fourteen image files of image files F1 to F14 is registered in "Day 10".

Figure 45:
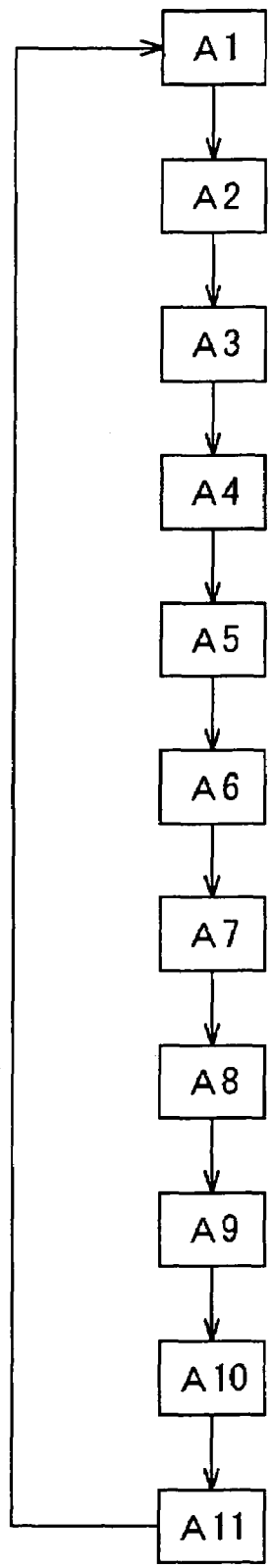
FIG. 45 is a view showing an example of the order of images to be displayed in case of a month display.

At this time, the slide display control unit 806 of the file management program 233 displays, for example, the image files A1 to A11 in order in the column of "Day 2" of FIG. 31. FIG. 45 shows an example of the order of displaying the image files. In FIG. 45, in the column of "Day 2", first image file A1 is displayed; A2 is displayed next to the A1; A3 is displayed next to the A2; A4 is displayed next to the A3; A5 is displayed next to the A4; A6 is displayed next to the A5; A7 is displayed next to the A6; A8 is displayed next to the A7; A9 is displayed next to the A8; A10 is displayed next to the A9; A11 is displayed next to the A10; and the A1 is again displayed after the A11. After that, the changes of display are repeated in a similar method described above.

In the other dates, the images to be displayed in the squares of the dates are sequentially changed similarly.

Accordingly, the user can confirm a plurality of images included in each date even in the month display.

Figure 46:
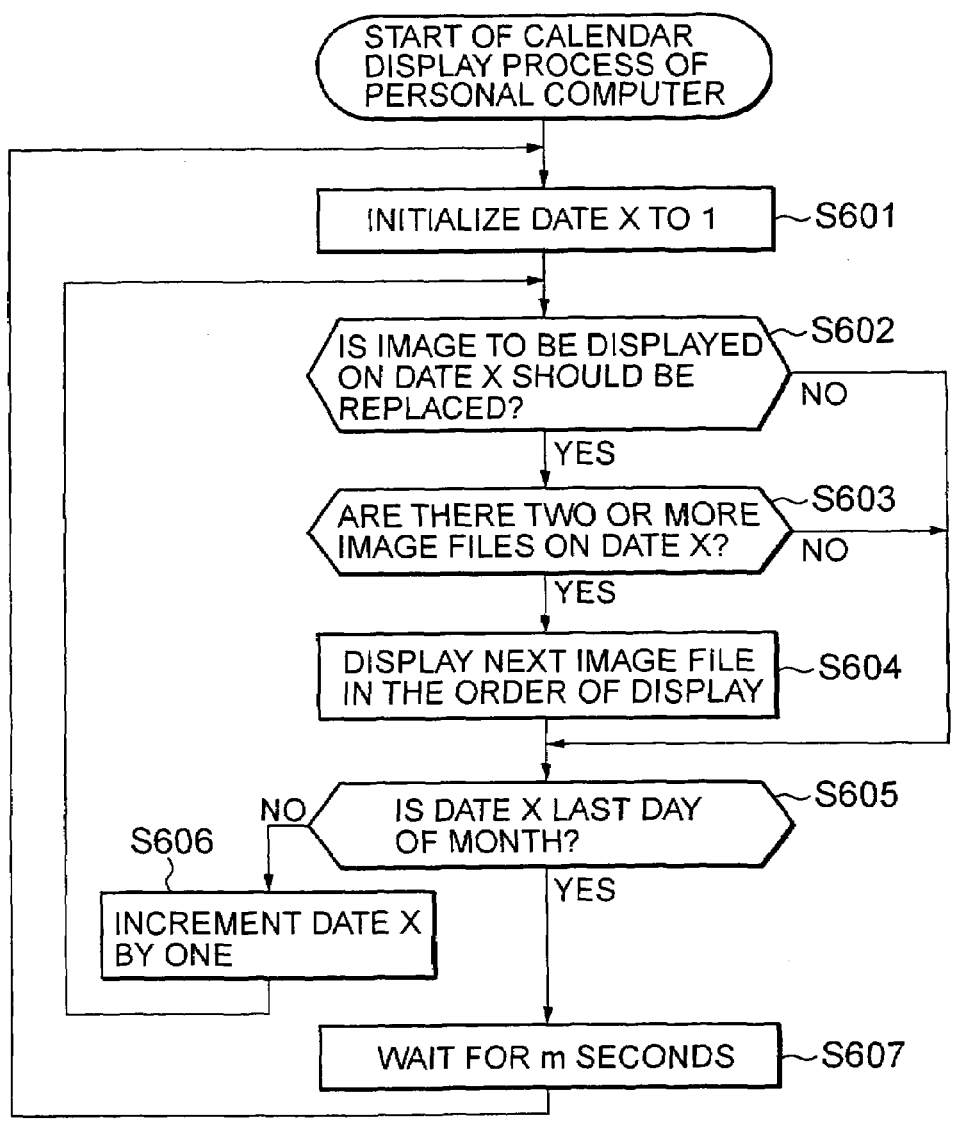
FIG. 46 is a flowchart for illustrating calendar display process of the personal computer.

Next, with reference to the flowchart of FIG. 46, the calendar display process of the PC 1, namely the process of changing the display of the images on each date in the month display, is described. The slide display control unit 806 has previously obtained the list of the image files of the dates included in a month to be displayed from the category management unit 802.

At a step S601, the slide display control unit 806 initializes a date X to X=1.

At the step S602, the slide display control unit 806 judges whether the image to be displayed on the date X is replaced or not. At the judgment step, the slide display control unit 806 judges that the image is replaced at the probability of one sixteenth, and judges that the image is not replaced at the probability of fifteen sixteenths. At the step S602, if it is judged that the image is replaced, the process proceeds to a step S603.

At the step S603, the slide display control unit 806 judges whether two or more image files exist on the date X or not. That is, if only none or one image file exists on the date X, there are no needs to change the image to be displayed. Accordingly, the slide display control unit 806 judges whether two or more image files exist on the date X or not. If two or more image files exist on the date X, the process proceeds to the step S604.

At the step S604, the slide display control unit 806 requires the attribute information management unit 803 to display the image file at the next display order. The attribute information management unit 803 reads the directory attribute of the image file the display of which has been requested from the slide display control unit 806 from the attribute information database 822, and supplies the read directory attribute to the image file management unit 804. The image file management unit 804 read an image file based on the directory attribute supplied from the attribute information management unit 803, and supplies the read image file to the display screen generation unit 805. The display screen generation unit 805 displays the image based on the image file supplied from the image file management unit 804 in the square of the date X of the month display. At this time, the image which has been displayed until the time is deleted.

After that, the process proceeds to a step S605.

At the step S602, if the slide display control unit 806 judges that the image to be displayed on the date X is not replaced, the processes at the step S603 and the step S604 are skipped, and the process proceeds to the step S605.

Moreover, at the step S603, if the slide display control unit 806 judges that two or more image files do not exist on the date X (none or one image file exists on the date X), the process at the step S604 is skipped, and the process proceeds to the step S605.

At the step S605, the slide display control unit 806 judges whether the date X is the last day of a month (for example, thirty-first day in case of January) or not. If the date X is not the last day of the month, the process proceeds to a step S606.

At the step S606, the slide display control unit 806 increments the date X by one. After that, the process returns to the step S602, and the above-mentioned processes on and after the step S602 are repeatedly executed.

At the step S605, if the slide display control unit 806 judges that the date X is the last day of the month, the process proceeds to a step S607.

At the step S607, the slide display control unit 806 waits for m seconds (m is, for example, 0.5 second). After that, the process returns to the step S601, and the above-mentioned processes on and after the step S601 are repeatedly executed.

In the way described above, in the month display, a plurality of images included in each date is sequentially changed to be displayed. A loop from the step S602 to the step S606 is repeated, for example, about 30 times for a second. Consequently, it is judged once for about a second whether the image display is changed or not to all of the date.

Figures 47, 48:
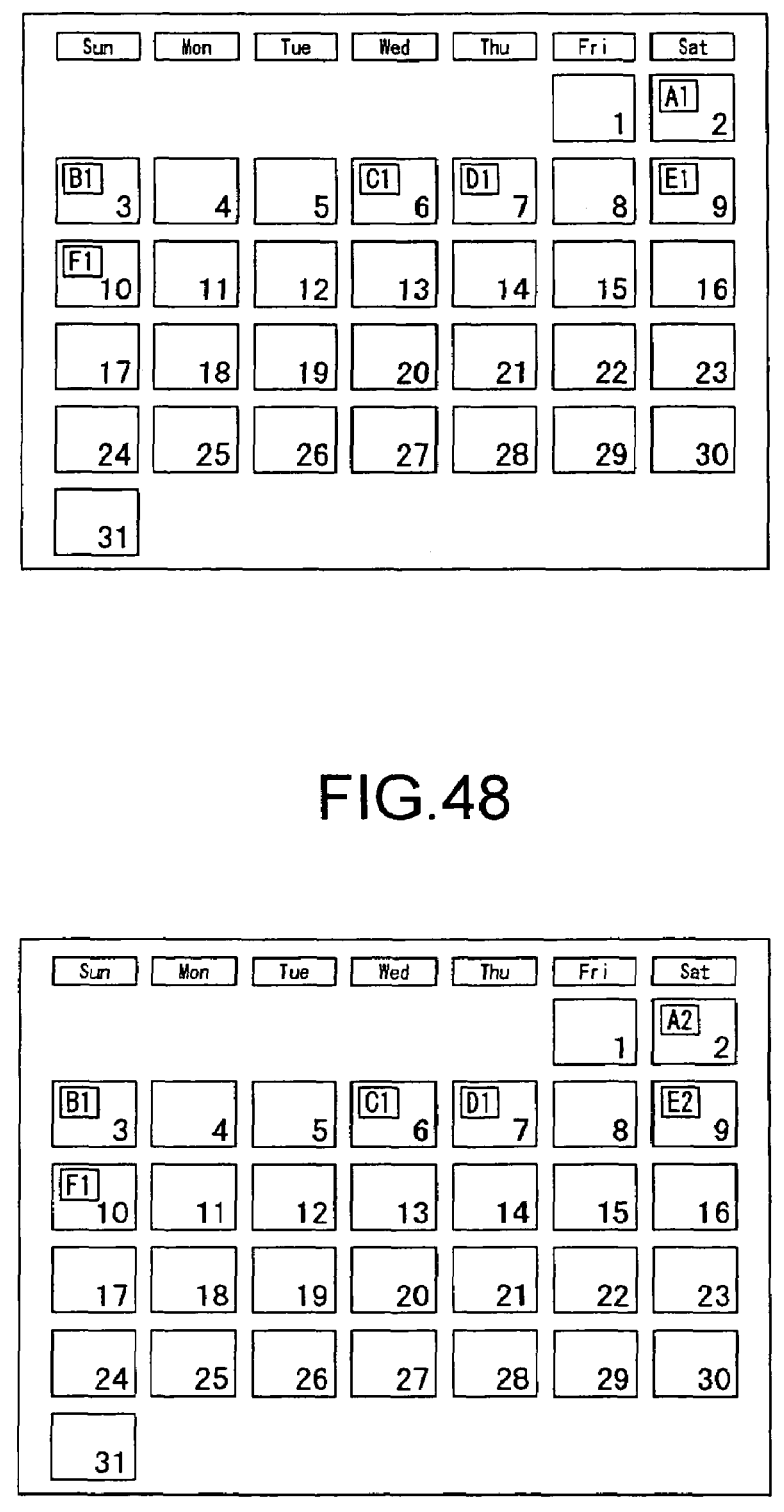

For example, it is supposed that images are displayed as shown in FIG. 47 at the beginning. In FIG. 47, on the second day, an image A1 is displayed; on the third day, an image B1 is displayed; on the sixth day, an image C1 is displayed; on the seventh day, an image D1 is displayed; on the ninth day, an image E1 is displayed; on the tenth day, an image F1 is displayed. On the other dates, no images are displayed.

In accordance with the calendar display process of FIG. 46, first the date X is initialized to X=1 (i.e. the first day) (step S601). Next, it is judged whether the image to be displayed on the first day is replaced or not (step S602). If the judgment is resulted for replacing of the image, it is judged whether a plurality of images to be displayed on the first day exist or not (step S603). Because none of images exists, the process at the step S604 is skipped. Moreover, if the judgment at the step S602 results in not replacing the image, the step S603 and the step S604 are skipped. After that, it is judged whether the first day is the last day (the thirty-first day in FIG. 47) of the month or not (step S605). Because the first day is not the last day of the month, the process proceeds to the step S606, and the date X is incremented by one to be the second day.

After that, the process returns to the step S602, and it is judged whether the image to be display on the second day is replaced or not. If the judgment result in replacing the image, it is judged whether a plurality of images to be displayed on the second day exists or not (step S603). Because eleven images exist, an image A2 at the next display order is displayed in the square of the date of the second day. After that, it is judged whether the second day is the last day of the month or not (step S605). Because the second day is not the last day of the month, the process proceeds to the step S606, and the date X is incremented by one to be the third day.

In the following, similarly, the processes from the step S602 to the step S606 are repeated from the third day to the thirty-first day. On the date X=31 (i.e. on the thirty-first day), at the step S605, the date X is judged to be the last day of the month, and the process proceeds to the step S607.

At the step S607, the slide display control unit 806 waits for m seconds. After that, the processes on and after the step S601 are again repeated.

Figures 49, 50:
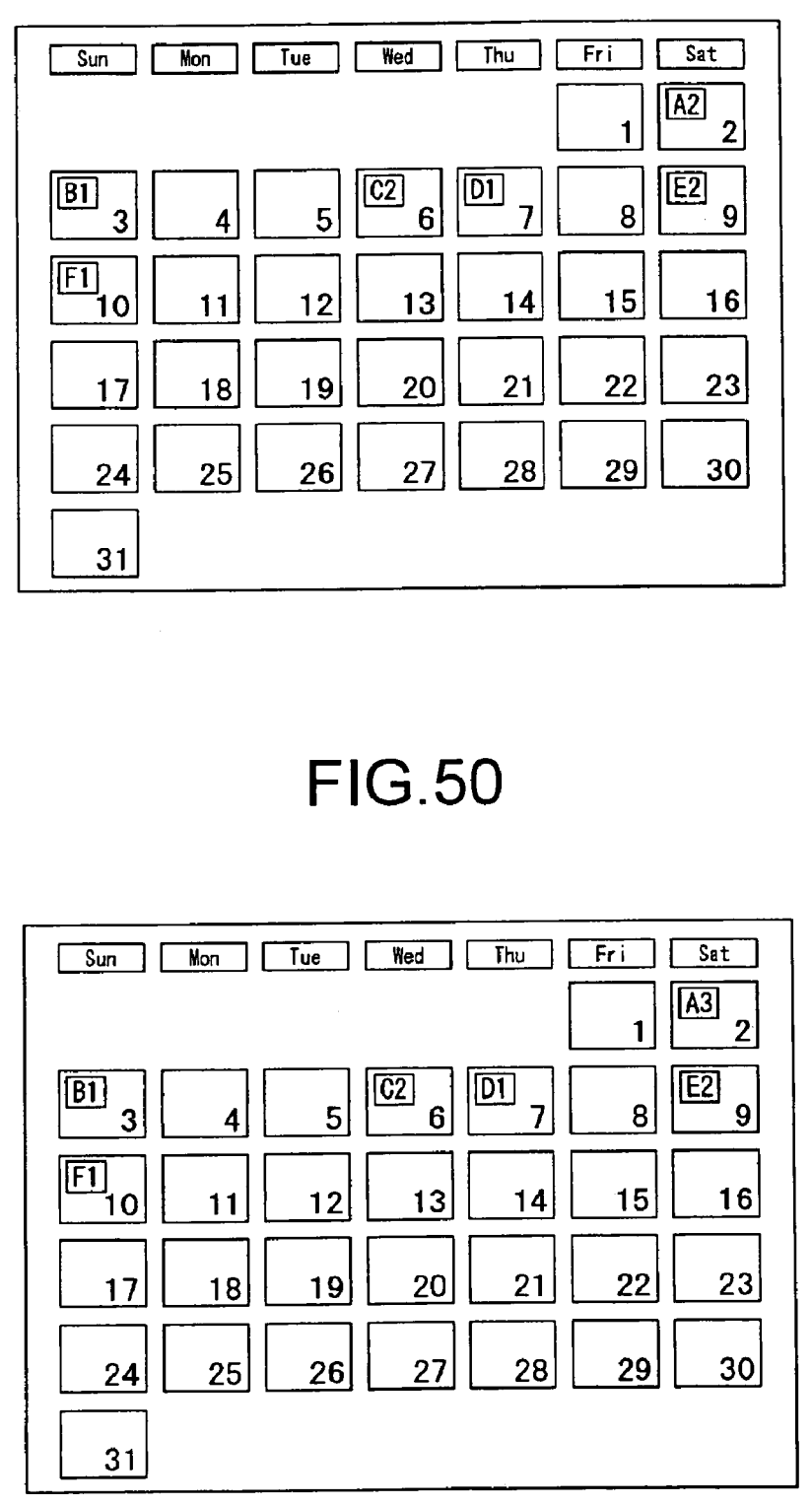

FIG. 48 shows an example in the case where the image displays on the second day and the ninth day have been replaced by the above-mentioned process. Moreover, FIG. 49 shows an example in the case where the image display of the sixth day has been replaced in addition to the sate of FIG. 48. Moreover, FIG. 50 shows an example in the case where the image display of the second day has been further replaced in addition to the state of FIG. 49.

In such a way, by judging the replacement of images in a probabilistic way at the step S602, the image of each date is replaced at random. Accordingly, entertainingness can be further improved. It should be noted that the above-mentioned calendar display process can be applied to the images other than those photographed with a digital still camera. Moreover, the calendar display process can be applied to the case where the images included in a plurality of categories are displayed in a list form in addition to the case of the calendar display.

Although the above-mentioned series of processes can be executed by hardware, the processes can be also executed by software. If the series of processes are executed by software, the programs constituting the software are installed onto a computer incorporated into dedicated hardware, or, for example, general purpose personal computer capable of executing various functions by installing various programs form a network or a recording medium.

The recording medium includes a package medium, which is distributed to a user for supplying a program separately from the apparatus main body as shown in FIG. 4, and on which package medium the program is recoded, such as the magnetic disk 221 (including a flexible disk), the optical disk 222 (including a compact disk-read only memory (CD-ROM) and a digital versatile disk (DVD)), the magneto-optical disk 223 (including a mini-disk (MD)), or the semiconductor memory 224. In addition to the package medium, the recording medium also includes the ROM 202, which is supplied to a user in the state being incorporate into the apparatus main body, and on which program is recorded, and the hard disk included in the storage unit 210.

In the present specification, the steps describing a program to be recorded on the recording medium may be of course a process to be executed in time series along a described order, but the steps should not necessarily be processed in time series. The steps include the processes to be executed in parallel or individually.

Moreover, in the present specification, the system indicates the whole apparatus including a plurality of devices.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   importing means for importing a plurality of images from an external apparatus;

means for controlling said importing means such that said importing means does not import images previously imported;

a first classifying means for classifying a first group of at least two of the plurality of images by a predetermined time unit based on time information attached to the images;

a second classifying means for classifying a second group of at least two of said plurality of images into a predetermined category;

display means including a first display area for simultaneously displaying at least two input bars and a second display area for displaying images, said display means displaying a third input bar including a first time unit when a first input bar of said at least two input bars is selected;

input means for selecting one of said input bars displayed on said display means;

display control means for controlling said display means to display the images classified into time units smaller than said first time unit by the first classifying means on said second display area of the display means when the third input bar is selected by said input means, and for controlling said display means to display images classified into said category when the other of said two input bars is selected by said input means.

2. The information processing apparatus according to claim 1, further comprising:

selection means for selecting a plurality of images classified into the same time unit for displaying each of the plurality of images one by one in the corresponding display region if the plurality of images are classified into the same time unit by the first classifying means.

3. The information processing apparatus according to claim 2, wherein the selection means is configured to judge whether the image to be displayed in the display region is switched or not, and to select an image different from the image displayed in the display region as the image to be displayed in the display region if the selection means judges to switch the image to be displayed in the display region.

4. An information processing method comprising:

importing a plurality of images from an external apparatus;

controlling with a processor said importing such that said importing does not import images previously imported;

classifying into a first group at least two of the plurality of images based on a predetermined time unit based on time information attached to the images;

classifying into a second group at least two of the plurality of images based on a predetermined category;

simultaneously displaying a first and a second input bar in a first area of a display screen;

receiving a selection of the first input bar or the second input bar;

displaying a third input bar including a first time unit if the first input bar is selected;

displaying the first group of images classified into time units smaller than said first time unit in a second area of the display screen if the third input bar is selected; and displaying the second group of images in the second area of the display screen if the second input bar is selected.

5. A computer readable medium including computer executable instructions, wherein the instructions, when executed by a processor, cause the processor to perform a method comprising:

importing a plurality of images from an external apparatus;

controlling with the processor said importing such that said importing does not import images previously imported;

classifying into a first group at least two of the plurality of images based on a predetermined time unit based on time information attached to the images;

classifying into a second group at least two of the plurality of images based on a predetermined category;

simultaneously displaying a first and a second input bar in a first area of a display screen;

receiving a selection of the first input bar or the second input bar;

displaying a third input bar including a first time unit if the first input bar is selected;

displaying the first group of images classified into time units smaller than said first time unit in a second area of the display screen if the third input bar is selected; and displaying the second group of images in the second area of the display screen if the second input bar is selected.

6. The information processing apparatus according to claim 3, wherein the selection means determine, at a predetermined time interval, whether the image to be displayed in the display region is switched or not.

7. The information processing apparatus according to claim 1, wherein the other of the at least two input bars includes text describing the predetermined category.

8. The information processing apparatus according to claim 1, wherein the other of the at least two input bars indicates that the predetermined category includes all images, and the display control means controls the display means to display all images if the other of the least to input bars is selected by the input means.

9. The information processing apparatus according to claim 1, wherein the second classifying means classifies an image in the second group based on user input.

10. The information processing apparatus according to claim 1, wherein the second classifying means classifies an image in the second group based on a user dragging and dropping the image onto one of the input bars using a mouse.

11. The information processing method according to claim 4, further comprising:

selecting a plurality of images classified into the same time unit for displaying each of the plurality of images one by one in the corresponding display region if the plurality of images are classified into the same time unit.

12. The information processing method according to claim 4, further comprising:

displaying the second input bar including text describing the predetermined category.

13. The information processing method according to claim 4, further comprising:

displaying the second input bar including text describing that the predetermined category includes all images; and displaying all images if the second input bar is selected by the input means.

14. The information processing method according to claim 4, wherein the classifying into the second group includes classifying the image into the second group based on user input.

15. The information processing apparatus according to claim 4, wherein the classifying into the second group includes classifying the image in the second group based on a user dragging and dropping the image onto one of the input bars using a mouse.

16. An information processing apparatus comprising:

an importing unit configured to import a plurality of images from an external apparatus;

a controller configured to control said importing unit such that said importing unit does not import images previously imported;

a first classifying unit configured to classifying a first group of at least two of the plurality of images by a predetermined time unit based on time information attached to the images;

a second classifying unit configured to classifying a second group of at least two of said plurality of images into a predetermined category;

a display including a first display area configured to simultaneously display a first and a second input bar and a second display area configured to display images, said display further configured to display a third input bar including a first time unit when a first input bar of said at least two input bars is selected;

an input unit configured to select one of said input bars displayed on said display;

a display controller configured to control said display to display the images in the first group classified into time units smaller than said first time unit on said second display area of the display when the third input bar is selected by said input unit, and to control said display to display images in the second group when the second input bar is selected by said input unit.

17. The information processing apparatus according to claim 16, further comprising:

a selection unit configured to select a plurality of images classified into the same time unit and to display each of the plurality of images one by one in the corresponding display region if the plurality of images are classified into the same time unit by the first classifying unit.

18. The information processing apparatus according to claim 17, wherein the selection unit is configured to judge whether the image to be displayed in the display region is switched or not, and to select an image different from the image displayed in the display region as the image to be displayed in the display region if the selection unit judges to switch the image to be displayed in the display region.

19. The information processing apparatus according to claim 18, wherein the selection unit is configured to determine, at a predetermined time interval, whether the image to be displayed in the display region is switched or not.

20. The information processing apparatus according to claim 16, wherein the second input bar includes text describing the predetermined category.

21. The information processing apparatus according to claim 16, wherein the second input bar indicates that the predetermined category includes all images, and the display controller is configured to control the display to display all images if the other of the least to input bars is selected by the input unit.

22. The information processing apparatus according to claim 16, wherein the second classifying unit is configured to classify an image in the second group based on user input.

23. The information processing apparatus according to claim 16, wherein the second classifying unit is configured to classify an image in the second group based on a user dragging and dropping the image onto one of the input bars using a mouse.

24. The information processing apparatus according to claim 20, wherein said input unit is configured to receive a text label describing the predetermined category from a user, said text label displayed by said display on the second input bar.

25. The information processing apparatus according to claim 16, further comprising:

an automatic deletion unit configured to automatically delete imported images from the external apparatus.

\* \* \* \* \*